US012290483B2

(12) United States Patent
Mayer et al.

(10) Patent No.: US 12,290,483 B2
(45) Date of Patent: May 6, 2025

(54) COVER DEVICE FOR DECUBITUS ULCER PREVENTION

(71) Applicant: Cloud 9 Care LLC, Eugene, OR (US)

(72) Inventors: Suzanne F. Mayer, Eugene, OR (US); William Dieter, Portland, OR (US)

(73) Assignee: Cloud 9 Care LLC, Eugene, OR (US)

( * ) Notice: Subject to any disclaimer, the term of this patent is extended or adjusted under 35 U.S.C. 154(b) by 0 days.

(21) Appl. No.: 17/944,926

(22) Filed: Sep. 14, 2022

(65) Prior Publication Data

US 2023/0018683 A1 Jan. 19, 2023

Related U.S. Application Data

(63) Continuation of application No. 17/076,627, filed on Oct. 21, 2020.

(Continued)

(51) Int. Cl.
*A61G 7/057* (2006.01)
*A47C 20/02* (2006.01)

(Continued)

(52) U.S. Cl.
CPC ..... *A61G 7/05715* (2013.01); *A61G 7/05723* (2013.01); *A61G 7/05738* (2013.01);

(Continued)

(58) Field of Classification Search
CPC .......... A47G 9/10; A47G 9/0207; A47G 9/02; A47G 9/0246; A47G 9/0238; A47G 9/023;

(Continued)

(56) References Cited

U.S. PATENT DOCUMENTS 1,045,228 A * 11/1912 Weltmer .............. A47C 31/105
5/500
2,284,778 A * 6/1942 Treiber ................ A47C 21/022
297/224

(Continued)

FOREIGN PATENT DOCUMENTS

CN 201542862 8/2010
CN 107411428 12/2017

OTHER PUBLICATIONS

Non-Final Office Action for U.S. Appl. No. 17/076,627, mailed Jun. 7, 2023, 14 pages.

(Continued)

*Primary Examiner* — Justin C Mikowski
*Assistant Examiner* — Morgan J McClure
(74) *Attorney, Agent, or Firm* — Ganz Law, P.C.

(57) ABSTRACT

Disclosed herein are systems and methods for supporting a patient, for example, for preventing or ameliorating pressure injuries or supporting a resting posture of a patient. The system can include a first layer comprising a sheet having a sheet length, a sheet width, and a vertical center line extending along the longitudinal axis of the sheet; a second layer affixed to the first layer, and longitudinally aligned with the vertical center line; and means for securing the first layer to a mattress and tensioning the second layer. The first layer and the second layer form a plurality of pockets disposed over the vertical center line, each respective pocket comprising at least one opening and configured to receive a pressure redistributing insert or a repositioning insert.

11 Claims, 49 Drawing Sheets

Related U.S. Application Data

(60) Provisional application No. 62/924,097, filed on Oct. 21, 2019.

(51) Int. Cl.

| | |
|---|---|
| ***A47G 9/10*** | (2006.01) |
| ***A61G 7/05*** | (2006.01) |
| ***A61G 7/07*** | (2006.01) |
| ***A61G 7/075*** | (2006.01) |
| ***A61G 13/12*** | (2006.01) |

(52) U.S. Cl.
CPC ................ *A47C 20/02* (2013.01); *A47G 9/10* (2013.01); *A61G 7/0525* (2013.01); *A61G 7/07* (2013.01); *A61G 7/075* (2013.01); *A61G 13/121* (2013.01)

(58) Field of Classification Search
CPC .. A47G 9/0253; A47G 9/0223; A47G 9/0261; A47G 9/1045; A61G 13/121; A61G 13/122; A61G 13/1225; A61G 13/123; A61G 13/1235; A61G 13/124; A61G 13/1245; A61G 13/125; A61G 13/1255; A61G 13/1205; A61G 13/12; A61G 7/05715; A61G 7/05723; A61G 7/05738; A61G 7/0525; A61G 7/065; A61G 7/07; A61G 7/075; A61G 7/0755; A47C 20/02; A47C 20/021; A47C 20/022; A47C 20/023; A47C 20/025; A47C 20/026; A47C 20/027
See application file for complete search history.

(56) References Cited

U.S. PATENT DOCUMENTS

| | | | | | |
|---|---|---|---|---|---|
| 3,092,848 | A | * | 6/1963 | Gronvold | A47C 21/022 24/72.5 |
| 3,146,469 | A | * | 9/1964 | Slade | A47C 27/15 5/699 |
| 3,765,040 | A | * | 10/1973 | Holstein | A47G 9/0246 5/487 |
| 3,924,282 | A | * | 12/1975 | Bond | A47C 20/027 5/632 |
| 4,199,830 | A | * | 4/1980 | Ogata | A47C 21/022 24/72.5 |
| 4,506,398 | A | * | 3/1985 | Hruban | A47C 27/085 5/498 |
| 4,607,402 | A | | 8/1986 | Pollard | |
| 4,686,726 | A | * | 8/1987 | Dunfee | A47C 27/085 5/498 |
| 4,698,880 | A | * | 10/1987 | Hamm | A47C 21/022 24/72.5 |
| 4,736,478 | A | * | 4/1988 | Dangerously | A47C 27/085 5/497 |
| 4,777,894 | A | * | 10/1988 | Joyce | A47G 9/0246 112/475.08 |
| 4,791,687 | A | * | 12/1988 | Iwase | A47C 27/081 5/944 |
| 4,873,734 | A | * | 10/1989 | Pollard | A47D 15/008 5/946 |
| 4,937,904 | A | * | 7/1990 | Ross | A47G 9/0246 24/72.5 |
| 5,072,470 | A | * | 12/1991 | Lysiak | A47C 21/022 5/498 |
| 5,097,847 | A | * | 3/1992 | Mikhail | A61G 13/12 128/853 |
| 5,146,641 | A | * | 9/1992 | Zwickey | A47G 9/1009 5/628 |
| 5,173,979 | A | * | 12/1992 | Nennhaus | A61G 7/0755 5/490 |
| 5,179,743 | A | * | 1/1993 | Lanman | A47C 27/085 24/465 |
| 5,245,717 | A | * | 9/1993 | Rudy | A47B 23/007 5/507.1 |
| 5,375,280 | A | * | 12/1994 | O'Sullivan | A47G 9/0246 5/81.1 R |
| 5,428,852 | A | * | 7/1995 | Tenuta | A47C 31/105 5/738 |
| 5,651,153 | A | * | 7/1997 | Goodrich | A47C 21/022 24/72.5 |
| 5,732,424 | A | * | 3/1998 | Bond | A47G 9/02 5/498 |
| 5,890,487 | A | * | 4/1999 | Kimmel | A61G 7/05738 5/951 |
| 5,970,544 | A | * | 10/1999 | Kardell | A47G 9/0246 5/500 |
| 5,991,946 | A | | 11/1999 | Harris | |
| 6,163,907 | A | * | 12/2000 | Larson | A47C 21/048 5/691 |
| 6,185,766 | B1 | * | 2/2001 | Farrugia | A47G 9/0238 24/72.5 |
| 6,415,466 | B1 | * | 7/2002 | Laiso | A47G 9/02 5/624 |
| 6,848,130 | B1 | | 2/2005 | Wilson | |
| 6,848,137 | B1 | | 2/2005 | Barnes | |
| 6,957,465 | B1 | * | 10/2005 | Oprandi | A47C 27/001 5/691 |
| 7,089,617 | B1 | * | 8/2006 | Lauro | A47G 9/0253 5/636 |
| D546,613 | S | | 7/2007 | Oconnor | |
| 7,240,384 | B2 | | 7/2007 | DuDonis | |
| 7,360,266 | B2 | | 4/2008 | Kasatshko | |
| 7,367,073 | B2 | | 5/2008 | Boyd | |
| 7,584,515 | B2 | * | 9/2009 | Jones | A47G 9/02 2/69.5 |
| 7,904,977 | B1 | * | 3/2011 | Singh | A47G 9/0246 5/497 |
| 7,971,292 | B1 | * | 7/2011 | Sithian | A61G 7/075 5/632 |
| 8,347,429 | B1 | | 1/2013 | Hawkins | |
| 8,689,374 | B2 | * | 4/2014 | Rudd | A47C 21/022 24/72.5 |
| 8,707,482 | B1 | * | 4/2014 | Ramthun | A47C 31/105 5/500 |
| 8,745,780 | B2 | | 6/2014 | Su | |
| 8,984,681 | B2 | * | 3/2015 | Ponsi | A61G 7/1026 5/81.1 R |
| 9,237,977 | B2 | | 1/2016 | Sithian | |
| 9,414,698 | B2 | * | 8/2016 | Sheeler-Johnson | A47G 9/10 |
| D786,577 | S | | 5/2017 | Czach et al. | |
| 9,750,655 | B2 | * | 9/2017 | Bhat | A61G 7/05769 |
| 9,844,276 | B1 | * | 12/2017 | Phillips | A47C 21/022 |
| 9,918,572 | B1 | * | 3/2018 | Bernick | A47G 9/04 |
| 10,149,551 | B2 | | 12/2018 | Long | |
| 10,201,235 | B2 | | 2/2019 | Long | |
| 10,448,746 | B2 | * | 10/2019 | Galloway | A47C 20/027 |
| 10,517,412 | B1 | * | 12/2019 | Nekhala | A47G 9/0246 |
| 10,729,605 | B1 | * | 8/2020 | Chinake | A61G 7/001 |
| 11,045,010 | B2 | | 6/2021 | Anderson | |
| 11,109,698 | B1 | * | 9/2021 | Ogden | A47G 9/0253 |
| 11,122,911 | B2 | * | 9/2021 | Dorfman | A47C 21/046 |
| 11,141,009 | B1 | * | 10/2021 | Rane | A47G 9/10 |
| 2005/0060808 | A1 | * | 3/2005 | Shaw | A61G 7/057 5/648 |
| 2005/0166328 | A1 | | 8/2005 | Ben-Levi | |
| 2005/0229316 | A1 | * | 10/2005 | Liao | A47G 9/1045 5/915 |
| 2006/0112487 | A1 | * | 6/2006 | Taylor | A47G 9/0253 5/490 |
| 2011/0302716 | A1 | * | 12/2011 | Battaglia | A47G 9/02 5/493 |
| 2014/0310870 | A1 | | 10/2014 | Czach et al. | |
| 2015/0074903 | A1 | * | 3/2015 | Berg | A47G 9/0238 5/83.1 |
| 2015/0283014 | A1 | * | 10/2015 | Sithian | A61G 7/057 5/636 |
| 2015/0283015 | A1 | * | 10/2015 | Sithian | A61G 7/05715 5/648 |

(56) References Cited

U.S. PATENT DOCUMENTS

| | | | | |
|---|---|---|---|---|
| 2016/0007774 | A1* | 1/2016 | Kakabeeke | A47G 9/0246 5/496 |
| 2017/0027243 | A1* | 2/2017 | Dimotsantos | A47D 5/006 |
| 2017/0055734 | A1* | 3/2017 | Duck | A61G 1/048 |
| 2017/0238734 | A1* | 8/2017 | Pastor | A47G 9/083 |
| 2018/0038043 | A1* | 2/2018 | Johnson | A47G 9/1045 |
| 2018/0110583 | A1 | 4/2018 | Gibbs | |
| 2018/0168361 | A1 | 6/2018 | Patmore et al. | |
| 2018/0303256 | A1* | 10/2018 | Sturgeon | A47C 21/022 |
| 2018/0352967 | A1* | 12/2018 | Galloway | A47G 9/02 |
| 2019/0335927 | A1* | 11/2019 | Fischenich | A47C 7/383 |
| 2020/0253386 | A1* | 8/2020 | Anderson | A47G 9/0253 |
| 2020/0260886 | A1* | 8/2020 | Chen | A47C 21/022 |
| 2021/0212481 | A1* | 7/2021 | Anderson | A47G 9/0238 |
| 2021/0322201 | A1* | 10/2021 | Tate | A61G 7/07 |
| 2021/0345789 | A1* | 11/2021 | Rubio | A61G 7/0525 |
| 2022/0031097 | A1* | 2/2022 | Martin | A47G 9/0246 |
| 2022/0347426 | A1* | 11/2022 | Knox | A47G 9/0207 |

OTHER PUBLICATIONS

Final Office Action for U.S. Appl. No. 17/076,627, mailed Nov. 21, 2023, 22 pages.

Non-Final Office Action in U.S. Appl. No. 17/076,627, mailed Jun. 4, 2024, 15 pages.

Final Office Action in U.S. Appl. No. 17/076,627, mailed Sep. 5, 2024, 13 pages.

* cited by examiner

COVER DEVICE FOR DECUBITUS ULCER PREVENTION

CROSS-REFERENCE TO RELATED APPLICATIONS

The present application claims the benefit under 35 U.S.C. § 119(e) to U.S. Provisional Application No. 62/924,097, filed on Oct. 21, 2019, and is a continuation in-part of U.S. application Ser. No. 17/076,627, filed Oct. 21, 2020, the disclosures of which are incorporated by reference herein in their entirety and made a part of the present specification.

BACKGROUND

Pressure injuries, once referred to as "bed sores" and sometimes manifesting as decubitus ulcers, are a common yet dangerous side effect of decreased mobility. Many patients in hospitals and extended care facilities are at risk due to a plethora of causes. This problem is a great physical stress and cost to the patient, sometimes even causing death from infected wounds. The financial repercussions of this preventable injury can be tremendous to both patient and the facility. Because it is recognized as a trauma occurring in the hospital, most often the costs incurred will be its responsibility.

Once such an injury has begun, caregivers must work quickly and attentively to prevent further breakdown. Reversing the initial injury is the ultimate goal, but very difficult to attain while the patient remains immobile. Most of them are caused by decreased circulation to an area of the body that is experiencing high pressure due to gravity over bony prominences. In order to achieve the goal of "Zero Harm", many hospitals and facilities enforce more caregiver tasks of skin surveillance and frequent position changes. This can be quite resource-intensive, and lead to increased costs to the facility in terms of nursing and caregiver hours.

It can be highly desirable to help prevent these injuries from occurring in the first place, and help patients by helping caregivers to achieve this goal. There is a need for embodiments that will not add to caregiver duties, but help to simplify them and make patient care more efficient. In other words, this can help buy time for achieving the goal of "Zero Harm", supporting an optimal standard of care.

SUMMARY

In some embodiments, disclosed herein are sheet-type devices including but not limited to fitted or non-fitted, e.g., flat, or bottom sheets. A sheet can include one, two, or more pockets or sleeves. A sheet can also include pads including gel, foam, or combinations thereof. Multi-zoned surfaces/systems and methods as disclosed herein involve easy-to-use and inexpensive measures that can be taken to prevent pressure injuries in immobilized patients. These sheets can simply replace current hospital or care-facility bottom sheets for high-risk patients, or be an overlay to existing sheets.

In some embodiments, the specialized fabric and construction can advantageously perform one or more of the following: decrease friction and sheer; increase wicking of moisture; and/or maintain circulation to pressure areas.

Some embodiments can include means for securing the sheet system to a mattress or other bedding device. The embodiments can also include means for tensioning the fabric to reduce wrinkles, folds, and bunching in the fabric, to reduce friction and other sources of pressure against a patient's body.

Some embodiments advantageously can include an all-in-one purposing combination of bed clothing with therapy. Specialized silicone gel and/or foam pads covered with padded wicking fabric can be made to fit in the pockets of the sheet as desired. Some sheets can be easily placed and exchanged as needed, easily removed for laundering, easy to clean, and/or reusable for same patient use.

Certain materials, such as, for example, gel or gel-like materials and foam can delay pressure injury formation. The sleeves, which can be vertically oriented in some cases, can make changing patient positions easy and efficient and be unexpectedly advantageous in combination with the gel/foam.

Such systems and methods can be win-win-win situations for patients-caregivers-hospitals in helping caregivers to deliver higher quality care, thereby preventing costly injuries.

In one possible embodiment, the inventive subject matter is directed to a patient care system, that has a first layer comprising a sheet having a sheet length, a sheet width, and a vertical center line extending along the longitudinal axis of the sheet. The patient care system has a second layer affixed to the first layer, and longitudinally aligned with the vertical center line; and means for securing the first layer to a mattress and tensioning the second layer. The first layer and the second layer form a plurality of pockets disposed over the vertical center line, and each respective pocket comprises at least one opening. When the system is arranged over the surface of a mattress, the first layer lies between the surface of the mattress and the second layer such that the at least one opening is above the first layer and wherein the plurality of pockets is not spaced apart along the longitudinal axis. Each of the plurality of pockets is configured to receive at least one of a pressure redistributing insert or a repositioning insert through the at least one opening. A positioning of the plurality of pockets relative to the first layer is configured such that, when the system is arranged over the surface of a mattress and fitted with inserts in the pockets, the pockets are configured to contact first selected areas of anatomy of an intended patient so as to decrease pressure on the first selected areas of anatomy or on a second area of anatomy adjacent to the contacted first selected areas of anatomy, or are configured so as to reposition the anatomy of the patient relative to the mattress. The first selected areas are selected from the group of head occiput, scapulae, lumbar, sacrum, knees, and the calcaneus.

The means for securing the first layer to a mattress and tensioning the second layer may include the first layer having dimensions larger than a top surface area of the mattress; a channel formed on an outer perimeter of the first layer, the channel having at least one opening; and a drawstring disposed within the channel and extending through the at least one opening. When the first layer is placed over a top surface of the mattress, the channel is configured to lie under a bottom surface of the mattress, and the drawstring is configured to tension the first and second layers when tightened in the channel through the at least one opening.

The means for securing the first layer to a mattress and tensioning the second layer may include a first pair of straps and a second pair of straps; where each of the first pair of straps is affixed by one end to a first longitudinal side of the first layer and by an opposing end to an opposing longitudinal side of the first layer, and each of the second pair of straps is affixed by one end to a first lateral side of the first layer and by a second opposing end to an opposing lateral side of the first layer. The first and second pairs of straps are configured to wrap from one respective side of the mattress, under the mattress bottom, to an opposing side of the mattress, and each strap comprises means for tensioning the first layer. The means for tensioning the first layer may include an elastic strap material configured to apply elastic tension to the first layer when placed around the mattress.

The at least one strap may include two sections that are removably fixable to each other by a fastener, and the means for tensioning the first layer may comprise fastening the two sections together when placed around the mattress. The first layer may have dimensions about the same as the dimensions of a top surface of the mattress.

The means for securing the first layer to a mattress and tensioning the second layer may include the first layer having dimensions larger than a top surface area of the mattress and a plurality of handles affixed along a perimeter of the first layer; a separate bottom layer having dimensions larger than a bottom surface area of the mattress and a plurality of tying elements affixed along a perimeter of the bottom layer, each respective tying element configured to removably attach to a respective handle. When the plurality of tying elements is attached to the plurality of handles, tension is applied to the first layer.

The means for securing the first layer to a mattress and tensioning the second layer may include at least two sleeves affixed to the first layer, each sleeve configured to removably receive and hold a batten, wherein the first layer is tensioned when each sleeve holds a batten. The at least two sleeves may extend longitudinally along the first layer and be disposed away from the vertical center line. The at least two sleeves may define an intermediate zone for a patient to lie on.

In some cases, each pocket opening may be defined by at least one seam attaching the second layer to the first layer, wherein the at least one seam extends across a width of the second layer by less than half of the width of the second layer. The second layer may comprise a stitch-free middle zone configured to contact the patient.

The patient care system may further include the pressure redistributing insert. The patient care system may further include the repositioning insert, the repositioning insert comprising a repositioning wedge.

In some cases, each pocket may comprise two openings.

In some cases, the second layer may comprise a single sheet of material.

A method for caring for a patient may include providing a system for patient care as described herein, and inserting a pressure redistributing insert or a repositioning insert into at least one of the plurality of pockets.

In another possible embodiment, a patient care system may include a first layer comprising a sheet having a sheet length, a sheet width, and a vertical center line extending along the longitudinal axis of the sheet; and a second layer comprising a single continuous sheet, affixed to the first layer, and longitudinally aligned with the vertical center line. The system may further include means for securing the first layer to a mattress and tensioning the second layer. The first layer and the second layer may form at least one pocket, the at least one pocket comprising at least one lateral opening spaced apart from the vertical center line. When the system is arranged over the surface of a mattress, the first layer lies between the surface of the mattress and the second layer such that the at least one lateral opening is above the first layer. The at least one pocket may be configured to receive at least one of a pressure redistributing insert or a repositioning insert through the at least one opening. A positioning of the at least one pocket relative to the first layer is configured such that, when the system is arranged over the surface of a mattress and fitted with inserts in the at least one pocket, the at least one pocket is configured to contact first selected areas of anatomy of an intended patient so as to decrease pressure on the first selected areas of anatomy or on a second area of anatomy adjacent to the contacted first selected areas of anatomy, or are configured so as to reposition the anatomy of the patient relative to the mattress, wherein the first selected areas are selected from the group of head occiput, scapulae, lumbar, sacrum, knees, and the calcaneus.

The means for securing the first layer to a mattress and tensioning the second layer may include the first layer having dimensions larger than a surface area of the mattress; a channel formed on an outer perimeter of the first layer, the channel having at least one opening; and a drawstring disposed within the channel and extending through the at least one opening. When the first layer is placed over a top surface of the mattress, the channel is configured to lie under a bottom surface of the mattress, and wherein the drawstring is configured to tension the first and second layers when tightened in the channel through the at least one opening.

The means for securing the first layer to a mattress and tensioning the second layer may include a first pair of straps and a second pair of straps, where each of the first pair of straps is affixed by one end to a first longitudinal side of the first layer and by an opposing end to an opposing longitudinal side of the first layer, and where each of the second pair of straps is affixed by one end to a first lateral side of the first layer and by a second opposing end to an opposing lateral side of the first layer. The first and second pairs of straps are configured to wrap from one respective side of the mattress, under the mattress bottom, to an opposing side of the mattress, and wherein each strap comprises means for tensioning the first layer.

The means for securing the first layer to a mattress and tensioning the second layer may include the first layer having dimensions larger than a top surface of the mattress and a plurality of handles affixed along a perimeter of the first layer; and a separate bottom layer having dimensions larger than a bottom surface of the mattress and a plurality of tying elements affixed along a perimeter of the bottom layer. Each respective tying element may be configured to removably attach to a respective handle such that when the plurality of tying elements is attached to the plurality of handles, tension is applied to the first layer.

The means for securing the first layer to a mattress and tensioning the second layer may include at least two sleeves affixed to the first layer, each sleeve configured to removably receive and hold a batten, wherein the first layer is tensioned when each sleeve holds a batten.

In another possible embodiment, a patient care system may include a first layer comprising a sheet having a sheet length, a sheet width, and a vertical center line extending along the longitudinal axis of the sheet; a second layer affixed to the first layer, and longitudinally aligned with the vertical center line; and a tensioning system configured to hold the second layer taut. The first layer and the second layer may form a plurality of pockets disposed over the vertical center line, each respective pocket comprising at least one opening. When the system is arranged over the surface of a mattress, the first layer lies between the surface of the mattress and the second layer such that the at least one opening is above the first layer and wherein the plurality of pockets is not spaced apart along the longitudinal axis. Each of the plurality of pockets is configured to receive at least one of a pressure redistributing insert or a repositioning insert through the at least one opening. A positioning of the plurality of pockets relative to the first layer is configured such that, when the system is arranged over the surface of a mattress and fitted with inserts in the pockets, the pockets are configured to contact first selected areas of anatomy of an intended patient so as to decrease pressure on the first selected areas of anatomy or on a second area of anatomy adjacent to the contacted first selected areas of anatomy, or are configured so as to reposition the anatomy of the patient relative to the mattress, wherein the first selected areas are selected from the group of head occiput, scapulae, lumbar, sacrum, knees, and the calcaneus.

The tensioning system may include at least one tensioning strap.

DETAILED DESCRIPTION

Figure 1:
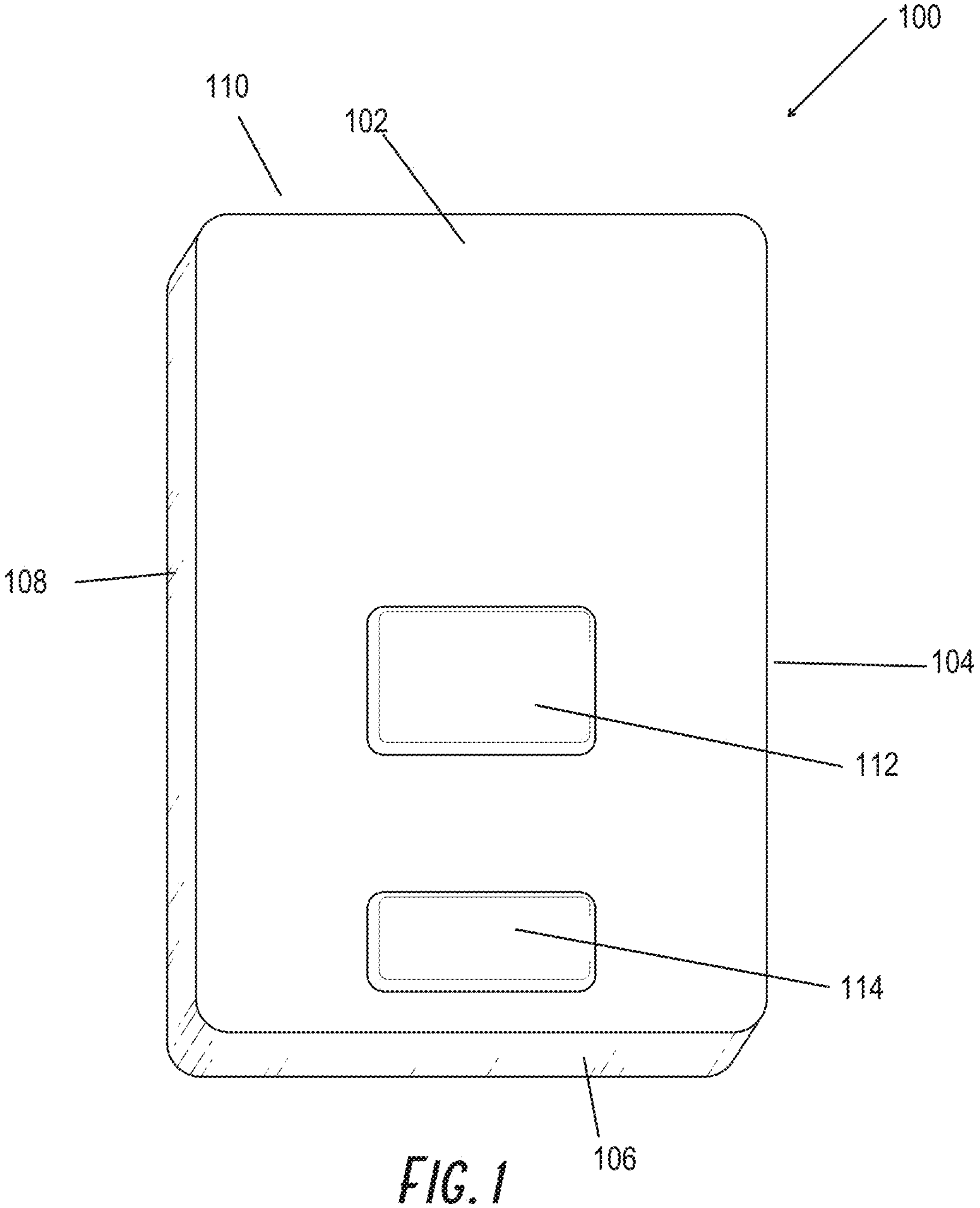
FIG. 1 illustrates an embodiment of a bed sheet comprising a front surface and peripheral edge surfaces bounding the front surfaces.

The following disclosure pertains to bedding systems that allow for inserts such as pillows, wedges, or other cushioning or supportive structures to be inserted into pockets in the bedding to support and/or change the position of a person lying on the bedding. The bedding system may relieve pressure on areas of the anatomy that are prone to pressure injuries. The bedding system may reposition parts of the anatomy with respect to the surface of the bed, for example, to relieve joint pain, allow for stretching or decompression of the spine, or to apply a gentle pressure to a sore area. The repositioning may include, without limitation, elevating, rotating, or supporting an area of anatomy at an angle to the surface of the bed.

In some embodiments, a sheet can be made of woven or knit micro-fiber material configured to keep the patient's skin contacting the sheet as dry as possible. In other embodiments, a sheet may be made of a non-woven material. A sheet can also be made from any suitable materials, or combinations of materials, e.g., synthetic polyester, cotton, wool, silk, microfiber, flannelette and/or even water retentive materials dependent on application. Any color combinations can be provided. The materials can be machine washable, or made as throw-away products dependent on application.

In some embodiments, a sheet can be a fitted sheet, and/or a flat sheet. The sheet can be configured to match a variety of bed sizes, including clinical bed sizes. The bed sizes can include, for example, twin, full, queen, king, California king, and other sizes. A twin-sized sheet may be sized for a patient between about 4 feet and 6 feet tall. Full-, queen-, twin XL-, and king-sized sheets may be sized for a patient between about 4 feet and 6.5 feet tall. A California king-sized sheet may be sized for a patient between about 4 feet and 7 feet tall. A crib-sized sheet may be configured for infants and toddlers less than 4 feet tall. The flat sheet can be made to be taut to the mattress with a variety of means, including but not limited to, sewn-in sleeves for batten-like plastic strips (which can be tucked under the mattress), after market devices, e.g., Bed Scrunchie, SheetLock Pro, elastic bed sheet fasteners or straps, or other sheet securing elastic and other devices. These all help to create smooth contours of the bed, thereby decreasing friction.

A sheet can include, for example, one, two, three, four, five, six or more spaced-apart pockets or sleeves. The pockets or sleeves can be, for example, axially spaced apart along the longitudinal axis of the sheet, or offset in some embodiments. The pockets or sleeves can have proximal, distal, and/or lateral openings. The pockets or sleeves can be made of a stretchable, moisture wicking material. The pockets can be made of stretchable fabric that is non-wicking. The stretch creates a smooth contour of the bed, decreasing friction.

In some embodiments, the sheets can include various axial lengths and configured to fit various patient heights, including adult, pediatric, and neonatal sizes. For example, a small adult sheet could, for example, be for patients having a height from about 4' 10" to about 5'5"; a medium adult sheet could, for example, be for patients having a height from about 5'6" to about 6'0"; and a large adult sheet could, for example, be for patients having a height from about 6'0" and greater. Smaller sized sheets can be utilized for neonatal or pediatric patients, including heights of less than about 5', 4.5', 4', 3.5', 3', 2.5' 2', or ranges including any two of the foregoing values.

In some embodiments, the pockets or sleeves can include anti-microbial properties, including one or more anti-microbial agents. An antimicrobial agent can include, for example, an antibiotic, an antifungal agent, an antiparasitic agent, and an antiviral agent. Some metals that may have antimicrobial properties include, for example, silver, platinum, gold, zinc, copper, cerium, gallium, osmium, and combinations thereof.

The pockets can be configured to fit an insert, such as a gel, or gel-like pad insert, or foam wedge insert (including but not limited to memory foam). The gel or gel-like pads can be, for example, silicone and foam bead mix with or without an overlay of wicking pad (e.g., pads used for biking or other sports activities), although any gas and/or liquid media, and/or solid materials can be utilized as insert material. The gel pads can be soft, malleable, and inserted then spread and flattened for cushioning or formed to be supportive to one, two, three, or more anatomical locations. These inserts can be either cooled or warmed as indicated for desired therapeutic effect. After-market inserts designed to reduce pressure can be inserted and held in the pockets, including but not limited to, cervical pillows, or pressure redistributing devices such as Molnlycke Z-Flo, for example. These inserts can be either cooled or warmed as indicated for desired therapeutic effect. Inserts can be made of any appropriate material, including but not limited to gel, gel-like materials, foam, latex, down, or other materials.

The pockets and gel pads can be placed in body areas most at risk for pressure sores, such as the sacrum and calcaneus, among others. The pockets can be of uniform size, or different sizes in some embodiments. A sheet can include, for example, about, at least about, or no more than about 1, 2, 3, 4, 5, 6, 7, 8, 9, 10, or more or less pockets, or ranges including any two of the foregoing values. In some embodiments, a top or uppermost pocket can have a dimension, such as a width that is larger than that of other pockets, such as all remaining pockets. Such a pocket can be configured to fit a standard twin pillow for additional head occiput support, for example.

FIG. 1 illustrates an embodiment of a bed sheet 100 comprising a front surface 102 and peripheral edge surfaces 104, 106, 108, 110 bounding the front surface 102. The peripheral edge surfaces 104, 106, 108, 110 can be fitted or flat. The front surface 102 can include a plurality of sleeves or pockets 112, 114, such as two pockets as illustrated. The pockets 112, 114 can be axially and/or laterally spaced apart and toward the distal half of the front surface, or at other locations. The pockets 112, 114 can be configured to hold pads, e.g., gel pads for decreased pressure inserting into the sleeve opening. The pockets 112, 114 can be sized and configured to generally contact the sacrum and calcaneus of a patient.

Figure 2:
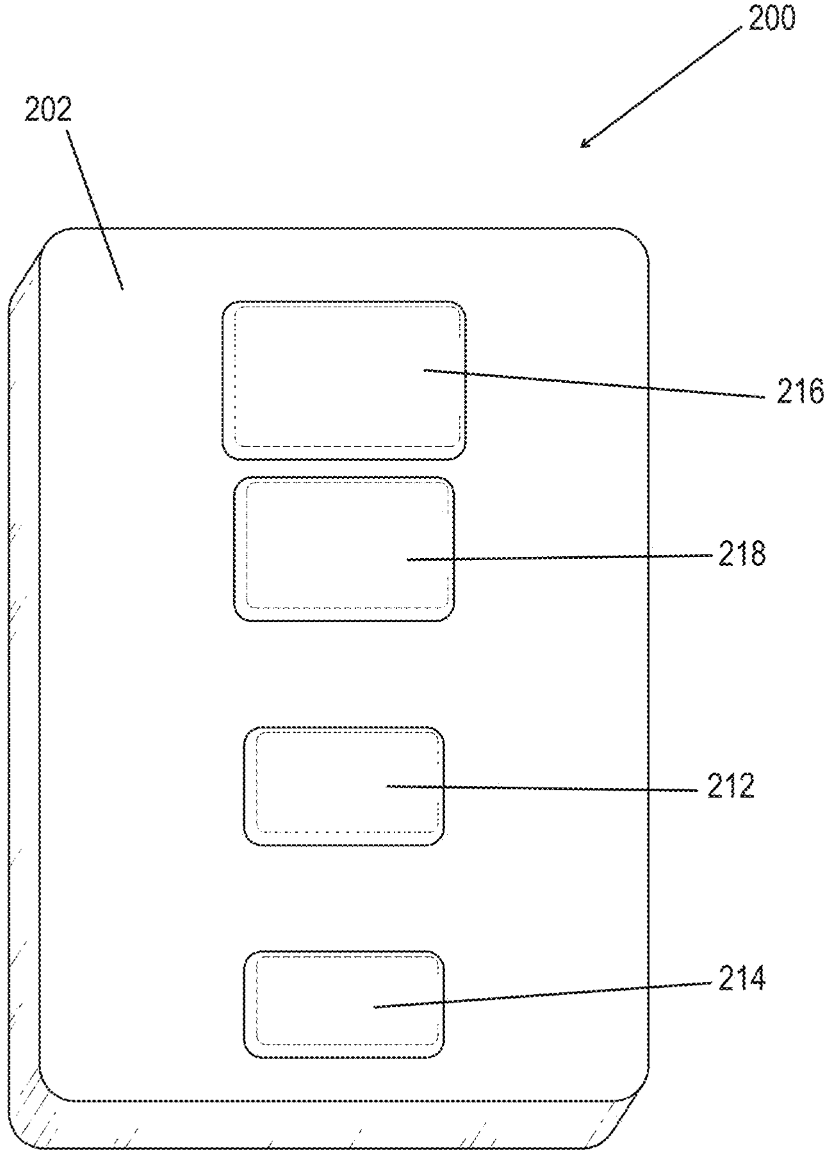
FIG. 2 illustrates an embodiment of a bed sheet similar to that of FIG. 1, except including four pockets.

FIG. 2 illustrates an embodiment of a bed sheet 200 similar to that of FIG. 1, except including four pockets 212, 214, 216, 218. The pockets can be axially spaced apart and toward the proximal and/or distal half of the front surface, or at other locations. The pockets can be configured to have minimal or no external (e.g., front-facing) stitching to minimize friction to sensitive skin and such that the pockets 212, 214, 216, 218 are flush or substantially flush with the front surface of the sheet. In some embodiments, pocket openings can be, for example, about or no more than about 50%, 45%, 40%, 35%, 33%, 30%, 25%, or less of the length of a lateral edge of the pocket (or ranges including any two of the foregoing values), with stitching above and below opening to contain same size gel pad. The sheet 200 can include two pockets 216, 218 generally toward the proximal half of the front surface 202, and two pockets 212, 214 generally toward the distal half of the front surface 202. The pockets can be sized and configured to generally contact the head occiput, scapulae, sacrum, and/or calcaneus and the device is configured to provide additional protection to the occiput and scapulae, and other bony prominences at risk.

In some embodiments, a pocket can include a plurality of openings, one each per lateral side. As such, caregivers can change the inserted cushion from either side of the bed.

Figure 3A:
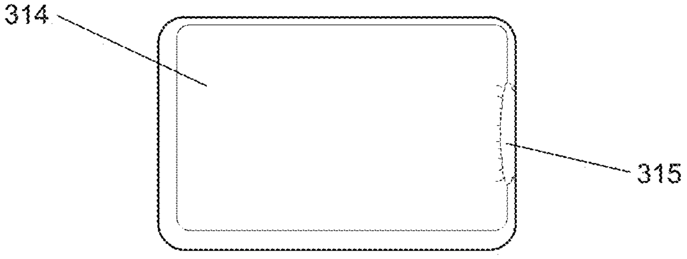
FIGS. 3A to 3C schematically illustrate various non-limiting types of pocket closures, according to some embodiments.
Figure 3B:
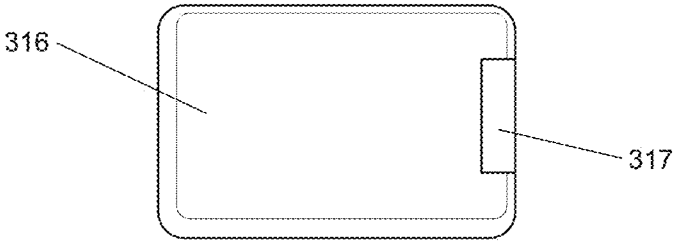
Figure 3C:
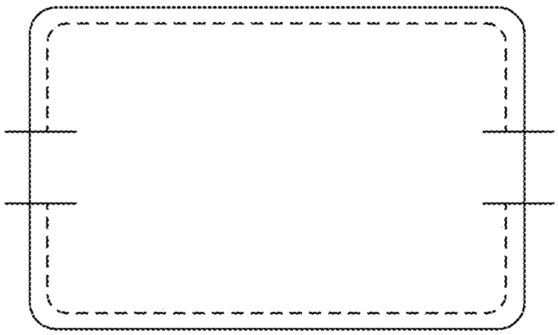

FIGS. 3A to 3C schematically illustrate various non-limiting types of pocket closures, according to some embodiments. FIG. 3A illustrates a pocket 314 including an elastic band 315 stitched onto opening of top layer of pocket fabric, in such a way as to pucker (or shorten) the opening between the top and bottom stitching on pocket (similar to that of a drawstring closure), thereby creating even more of a retainer for the gel pad. FIG. 3B illustrates a pocket 316 including hook-and-loop fastener strips 317 stitched on the top and bottom layer of pocket at the opening to close the pocket. Other closure mechanisms such as zippers, buttons, snap locks, and other closure mechanisms can also be utilized in some embodiments. In some embodiments, closure mechanisms can include magnetic closure mechanisms. FIG. 3C illustrates simple retainer of inserts with stitching along approximately one-third of upper and lower lateral edge of pocket, leaving an opening in which to place inserts. The stitching can hold an insert of same or slightly smaller size as pocket. In some embodiments, stitching is along the one-third upper part of the pocket and along the one-third lower part. This leaves an opening in the center of pocket to place the pads or gel pads. The stitching serves as retainers for pads.

Figure 4:
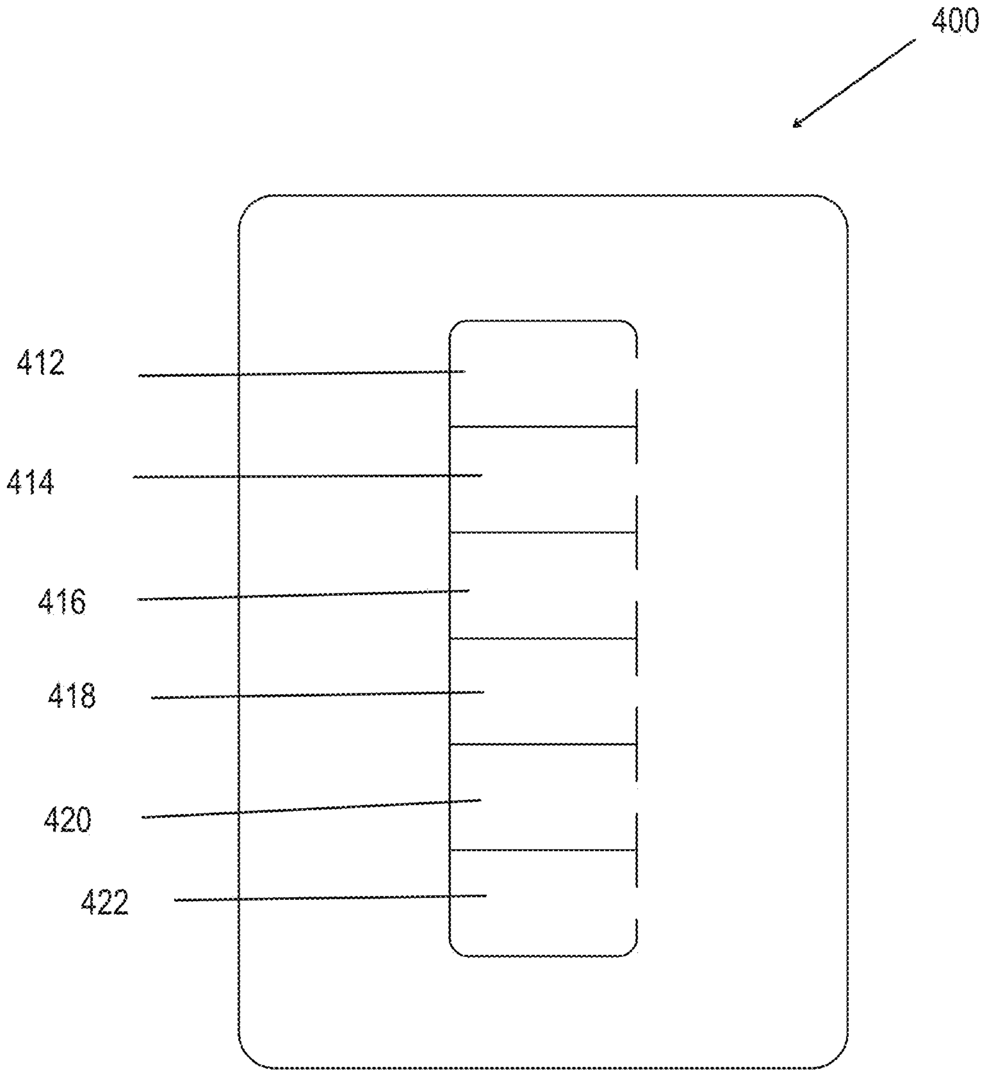
FIG. 4 illustrates an embodiment of a bed sheet similar to that of FIGS. 1-2, except including six pockets.

FIG. 4 illustrates an embodiment of a bed sheet 400 similar to that of FIGS. 1-2, except including six pockets 412, 414, 416, 418, 420, 422. The pockets can be axially spaced apart as previously described, or alternatively be touching each other as illustrated, and made of one continuous fabric with stitching to create pockets as opposed to separate pieces of fabric. Such configurations can advantageously minimize friction and shear, while still allowing placement of pads for protection and support of all body parts at risk. The pockets can be sized and configured to generally contact the head occiput, scapulae, lumbar support, sacrum, knees, and/or calcaneus (heels) and the device is configured to provide additional protection to the occiput and scapulae.

Figure 5:
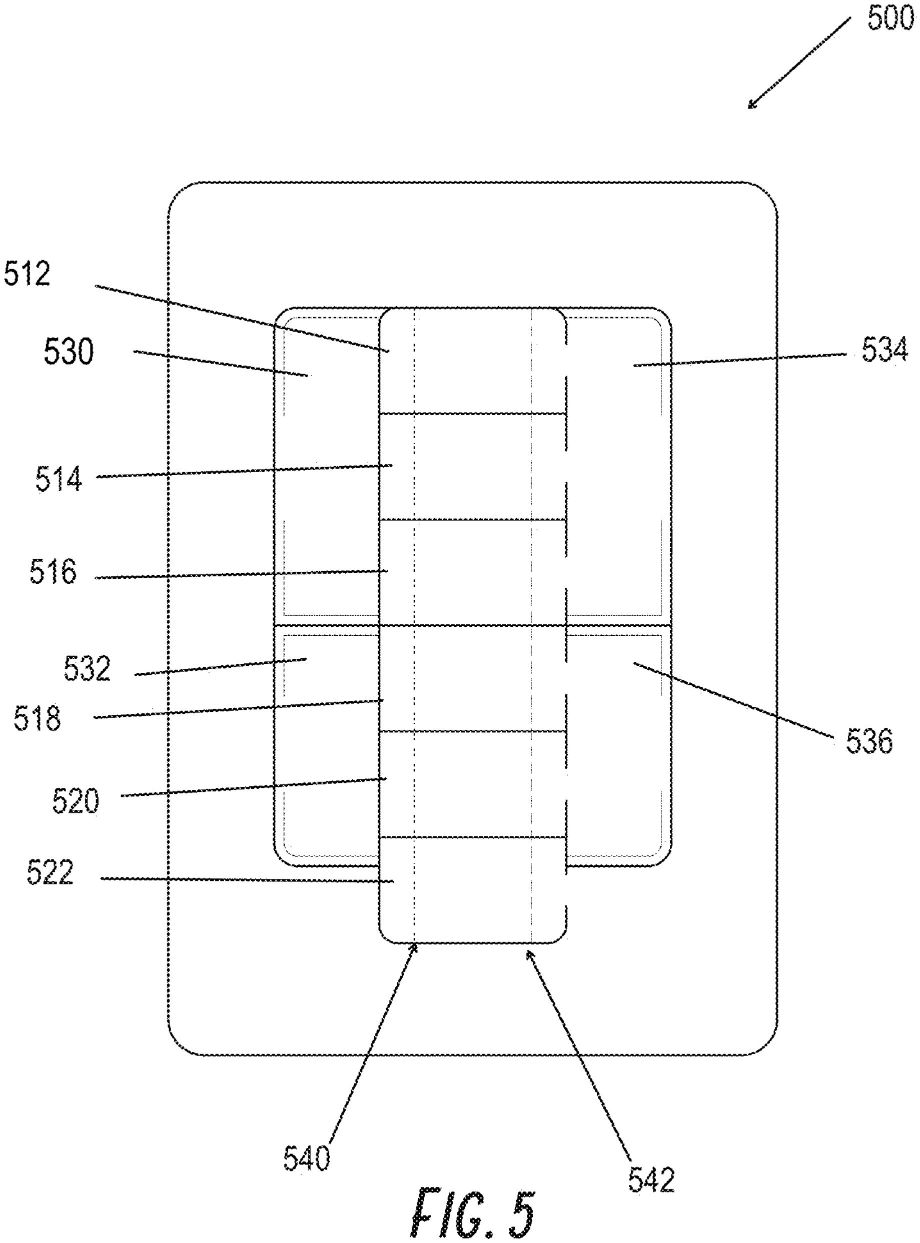
FIG. 5 illustrates an embodiment of a bed sheet similar to that of FIG. 4, and additionally including a plurality of vertically oriented pockets (four as shown) spaced apart from the longitudinal axis from the sheet.

FIG. 5 illustrates an embodiment of a bed sheet 500 similar to that of FIG. 4, and additionally including a plurality of vertically oriented pockets (four as shown) 530, 532, 534, 536 spaced apart from the longitudinal axis from the sheet. The vertically oriented 530, 532, 534, 536 as well as horizontally oriented pockets 512, 514, 516, 518, 520, 522 (six as shown) can in some embodiments be touching each other as illustrated, and made of one continuous fabric with stitching to create pockets as opposed to separate pieces of fabric. Such configurations can advantageously minimize friction and shear, while still allowing placement of pads for protection and support of all body parts at risk. The pockets can be sized and configured to generally contact the head occiput, scapulae, lumbar support, sacrum, knees, and/or calcaneus (heels) and the device is configured to provide additional protection to the occiput and scapulae. One, two, or more vertical serging stitches 540, 542 can be used to create a flush and durable hold. The vertically oriented pockets can be configured to be positioned adjacent to the patient allowing for insertion of foam wedges for support inside to side change of position (minimizing pressure). Wedges can also be used to elevate one or both knees for knee support and/or to provide comfort to the back, because they can allow for more elevation than gel pads.

In some embodiments, any of the pockets can be omitted while maintaining any other pockets. For example, some embodiments of sheets may exclude any combination of head occiput, scapulae, lumbar support, sacrum, knees, and/or calcaneus (heels) or other horizontal and/or vertically oriented pockets while any other number of pockets can remain present.

Figure 6A:
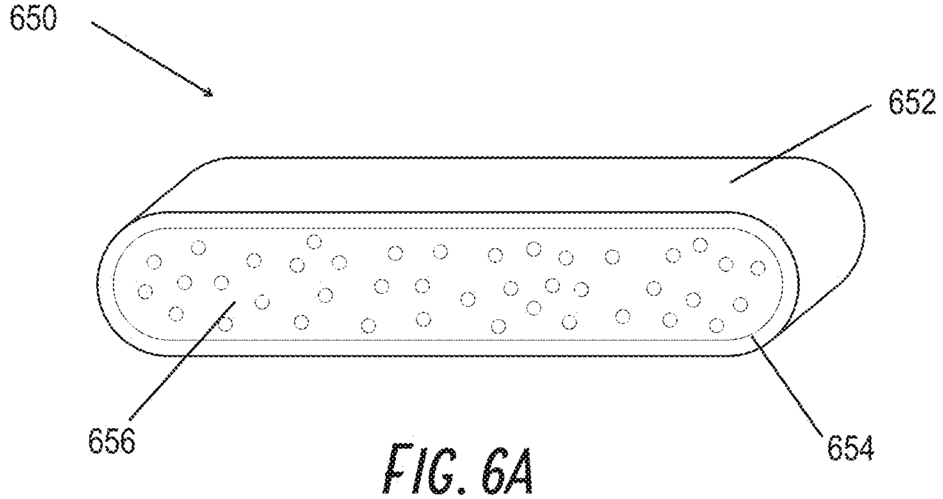
FIGS. 6A-6D illustrate non-limiting examples of inserts for pockets.
Figure 6B:
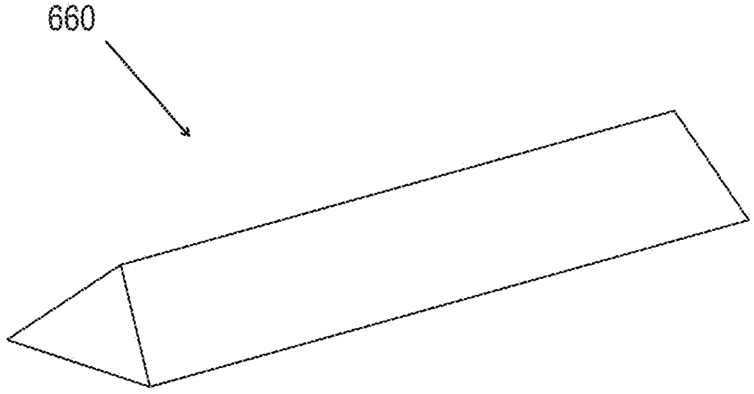
Figure 6C:
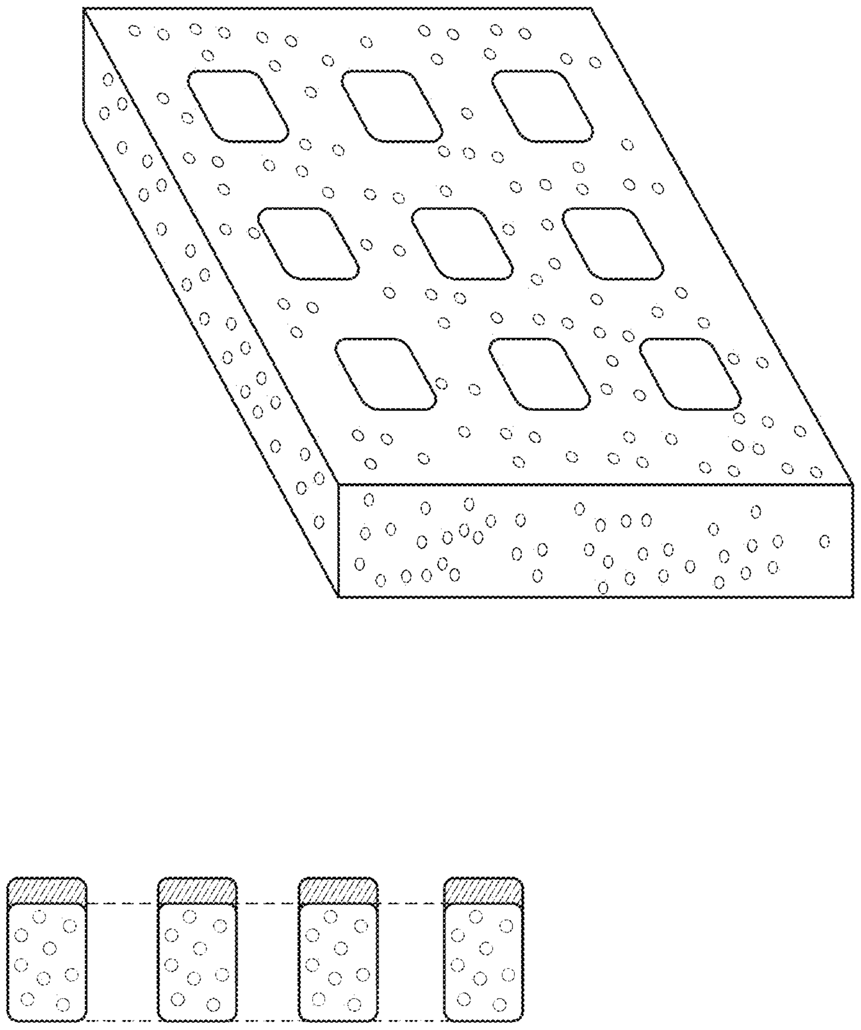
Figure 6D:
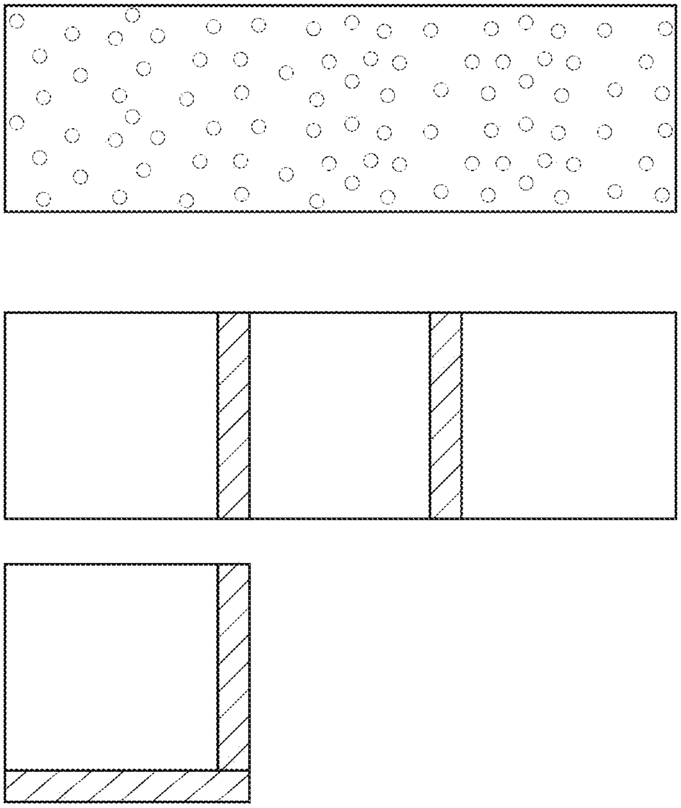

FIGS. 6A-6D illustrate non-limiting examples of inserts for pockets. In some embodiments, as shown in FIG. 6A, horizontal pockets can be configured to house gel foam pads 650. Each pad can include an outer layer 652 of padded material configured to serve as a wicking cushion (similar to pads in bike shorts), a casing layer 654 (e.g., made of durable soft plastic or other materials) configured to enclose an inner fill layer 656 of silicone gel and/or foam beads. The casing layer may be sealed, and optionally include a valve or other conduit to add or remove fill materials. Inserts can be made to be same size as pocket. FIG. 6C also demonstrates that inserts can be made in different smaller sizes, as well as varying thicknesses or composition. There can be up to nine smaller squares gel foam pads to which Velcro can be adhered, thus giving the caregiver the ability and option to create personalized pads for patient need and comfort to target high-risk areas thus minimizing risk of patient injury. The larger inserts can measure the width of the center pockets, which can be 20-22 inches, or more, or less, depending upon patient size. There can be three of them per pocket. The length can also be the length of the pocket, approximately 22 inches, more or less depending upon patient size. The pads can be made smaller so that they will measure one-third the width. These can also be covered with padding (such as that protective padding in bike or sporting wear) if helpful.

As shown in FIG. 6B, vertical pockets can be configured to house foam wedges. These wedges can be simple triangular shapes 660 made from soft but sturdy gel foam pads that are cut to create a sturdy yet comfortable and skin-friendly support. These wedges easily flex to be inserted into accommodating vertical sleeves that are adjacent to the body, allowing easy repositioning of the patient. In some embodiment, each wedge can be from about 6 inches to about 12 inches in height (e.g., about 8 inches in height), and between about 18 inches and about 30 inches in length (e.g., about 24 inches in length). However, some sleeves or pockets can include a plurality of thinner and/or shorter wedges. There can be two lateral sleeves/wedges on either side of bed for ease of handling, or more or less depending on the desired clinical result. The device can have soft curved edges. The device can include a casing. The dimensions can be, for example, 12 inches by 12 inches with a height of 1.5 inches. The device can include many foam beads interspersed in gel. There is an option for a wicking pod. There can be nine holes, or other numbers of holes as disclosed herein, for example.

Figure 7:
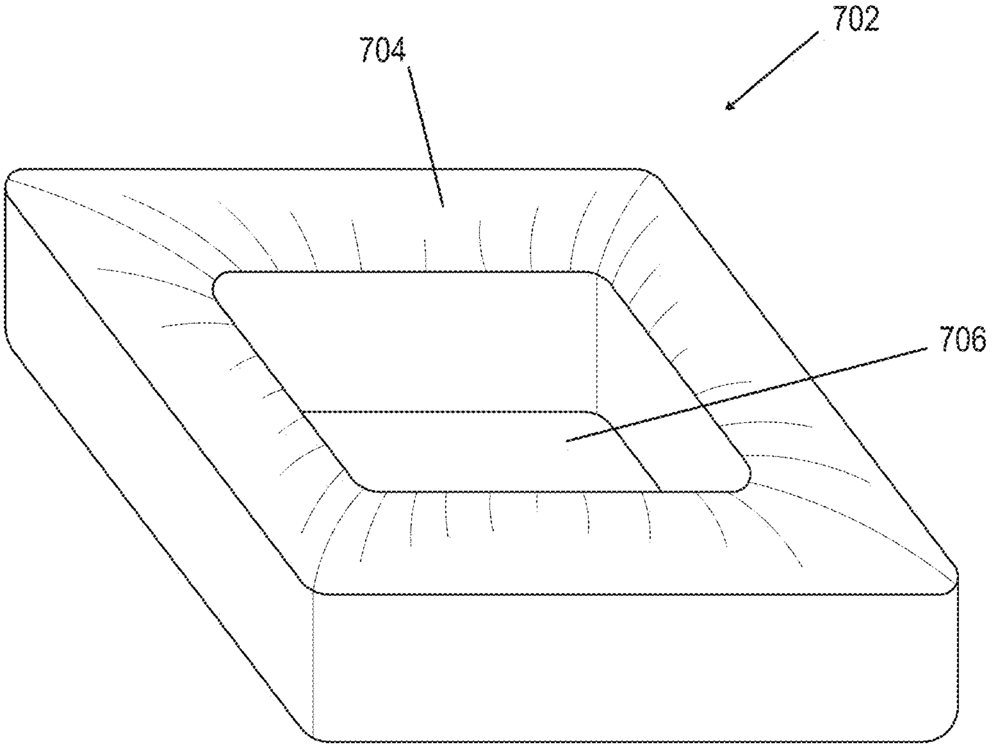
FIGS. 7-7E illustrate another embodiment of an insert for pockets.

FIG. 7 illustrates another embodiment of an insert 702 for pockets. The insert 702 can include an outer perimeter 704 with an inner void region 706 somewhat similar to a “donut.” However, some embodiments do not include a “donut” or inner void region. The outer perimeter 704 can be rectangular, oval, square, or other geometries, and can be inserted into pockets of high-risk areas. The outer perimeter 704 can be made of a soft foam or other material. The center (void region) 706 can be placed at most compromised areas to provide least amount of pressure to skin. In some embodiments, the center (void region) 706 has a surface area or volume that is at least about 30%, 40%, 50%, 60%, 70%, 80%, or more or less of the surface area or volume bounded by the outer perimeter 704 (including the center void region 706), or ranges including any two of the foregoing values. In some embodiments, the insert 702 can have a height of between about 1 cm and about 5 cm, such as about 1 cm, 2 cm, 3 cm, 4 cm, or 5 cm. The outer perimeter 704 can include rounded edges for improved comfort.

Figure 7A:
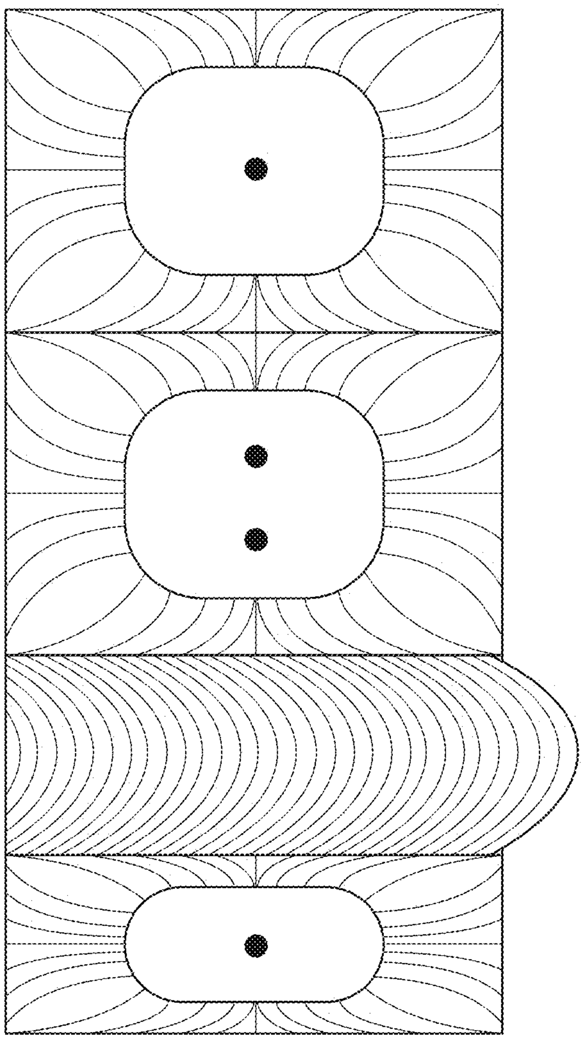
Figure 7B:
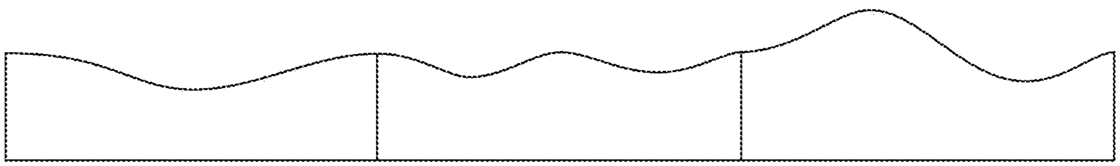

FIG. 7A-7B illustrate other embodiments of inserts that can correlate to anatomical position in relation to pockets. These are made for a sheet that has only 3 pockets down center (see FIG. 11A-B). For example, the top insert can be created to fit into the top (possibly head and shoulders) portion of sheet. This insert can be made of gel, foam, latex, or other pressure-reducing materials, and shaped to support structures, such as the neck, and decrease pressure on the occiput, providing alignment of body for comfort and minimal pressure. For example, the center insert can be created to contain the torso and sacrum, with above-described materials, minimizing pressure to high-risk bony prominences. The bottom, third and lower pocket, could house an insert as described, and shaped to elevate knees, and to decrease pressure on calcaneus (another high-risk area for pressure injury) by creating a depression in the pad at this point. There can be, for example, three inserts for three pockets. The inserts can correlate to a preselected body part associated with each pocket. There can be different shaped pillow/inserts. FIG. 7A shows a cervical and shoulder embodiment with a depression for the occiput (top). FIG. 7A shows a spine and sacrum embodiment with a depression for the shoulder, spine, and coccyx (middle). FIG. 7A shows a lower extremity embodiment with a knee elevation and a depression for heels (bottom). FIG. 7B shows a side or cross-section of pads which correlate with areas of the body. In some embodiments, the embodiments alleviate pressure in at-risk areas.

Figure 7C:
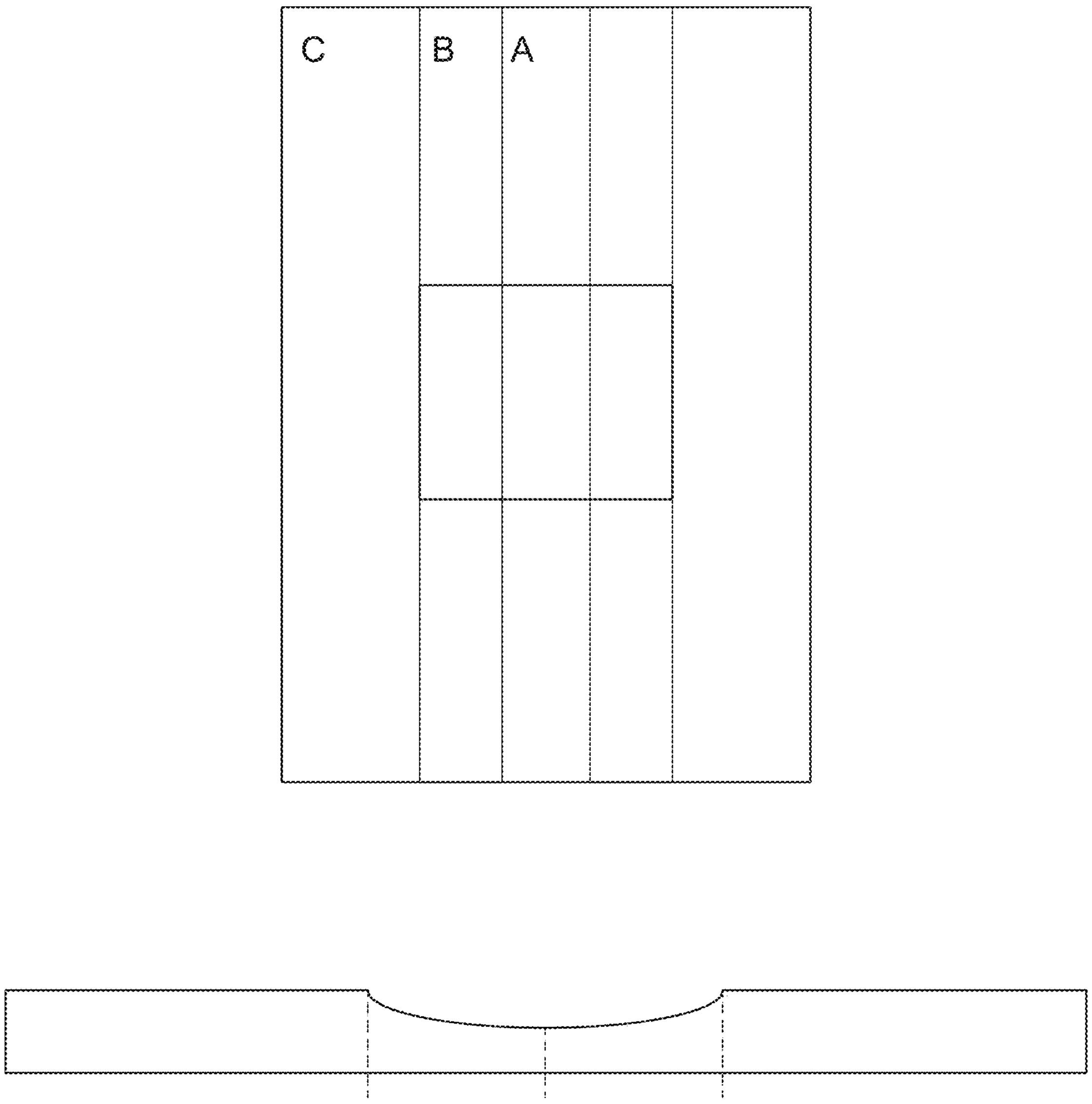

FIG. 7C illustrates inserts which can be placed into lateral pockets for pressure redistribution. There can be a cushioning layer, such as gel infused foam, or memory foam for examples which can be 1.5"-2" thick to fit in the sleeve measuring 15" wide×22"-26" long, depending on patient size. A slight wedge can be created at center of the mattress/sheet can be helpful in both containing patient and also allowing room for inserts in sleeve A. Six of the cushioning layer wedges (FIG. 7C) should be required remaining with product for pressure reduction. There can be embodiments for inserts into side pockets. The pockets can be made to be next to the patient. There can be a protective layer of fabric such as CoolMax® fabric and a gel-foam to redistribute pressure. The pockets can be designed to hold a cushioning layer as well as repositioning wedges. The cushioning layer can be a gel foam or a similar pressure redistributing layer. The layer can be, for example, between about 1.5 and about 2 inches thick to fit in the sleeve. The layer can be, for example, about 15 inches wide and between about 22 and about 26 inches long. A slight wedge can be created at the center of mattress. This has been found to be helpful in not only containing the patient but also allowing room for center pillows. FIG. 7C shown a cross-sectional view. The repositioning wedges measure same base dimensions as above, about 15 inches wide and between about 22 and about 26 inches long. The wedges can be made of sturdier foam designed to hold the patient in rotated position, e.g., to one side, taking pressure off the back.

Figure 7D:
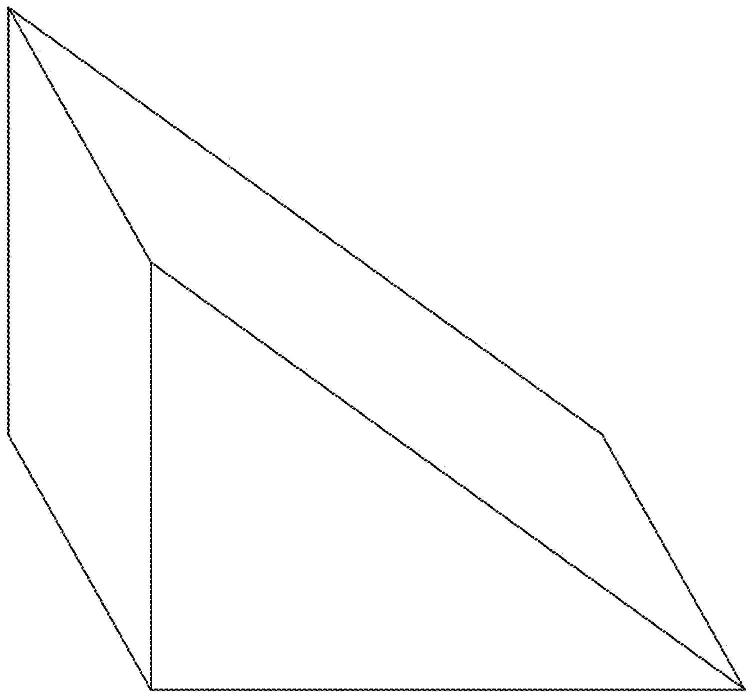
Figure 7E:
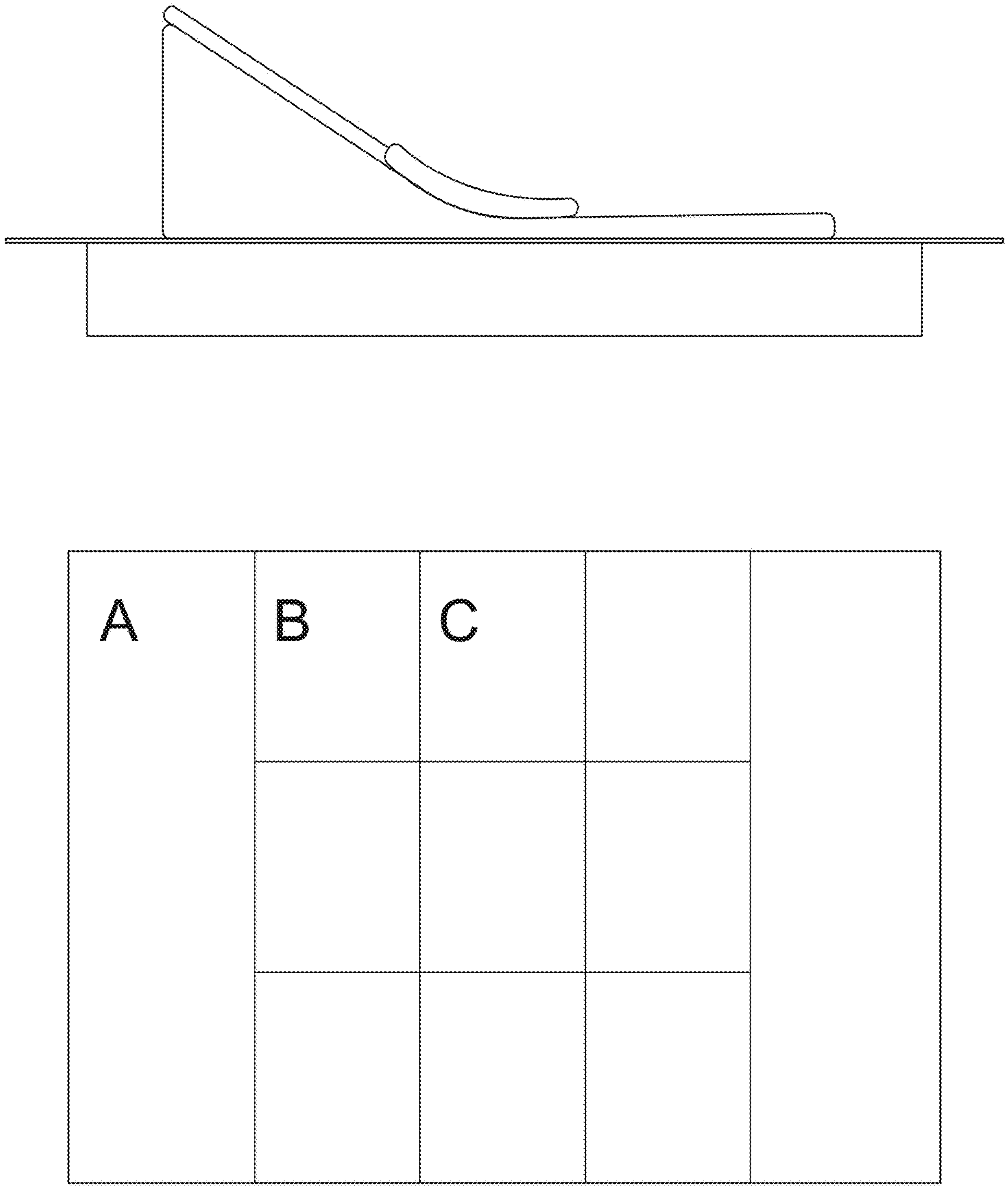

FIGS. 7D-7E further illustrate inserts which can be placed into lateral pockets for repositioning of the patient, which can be a very advantageous part of care in preventing pressure injuries and therefore of this product. Dimensions can be 7" in height, 15" width, and 20-26" in length, depending upon size of patient, but can be more or less. With the cushioning layer described in FIG. 7C, the height will be 8.5-9". The firmer wedge can hold a patient while in some cases adhering to the "Rule of 30 s", recommended by the NPUAP (National Pressure Injury Advisory Panel, 2014). This rule states that "the body is placed in a 30 degree laterally inclined position, when repositioned to either side . . . so that the individual'ships and shoulders are tilted 30 degrees from supine, and pillows or foam wedges are used to keep the individual properly positioned without pressure over the trochanter or sacrum." In some embodiments, two or three of such wedges may be needed for the product to laterally rotate patient. The repositioning wedges can be part of the product. The wedges can have dimensions of, for example, about 15 inches wide and between about 22 and about 26 inches long depending on patient size. The wedge can have a height of 7 inches. With the cushioning layer, this can add a height of 8.5 to 9 inches. The firmer wedge with these dimensions can hold a patient while adhering to the "Rule of 30" recommended by the NPUAP. This rule states that the body is placed in a 30 degree laterally inclined position when repositioned to either side so that the individual's hips and shoulders are tilted 30 degrees from supine. The pillows or foam wedges are used to keep the individual properly positioned without pressure. FIG. 7E is a cross-section of the cover device for prevention of pressure injuries for lateral rotation of the patient. The cushion extends entirely or partially the length of the device. The wedge for repositioning is under the trunk of the patient. The gel pad is positioned under the patient. The product can have pockets for retaining wedges. The product can have pockets for retaining gel or foam inserts.

Figure 8:
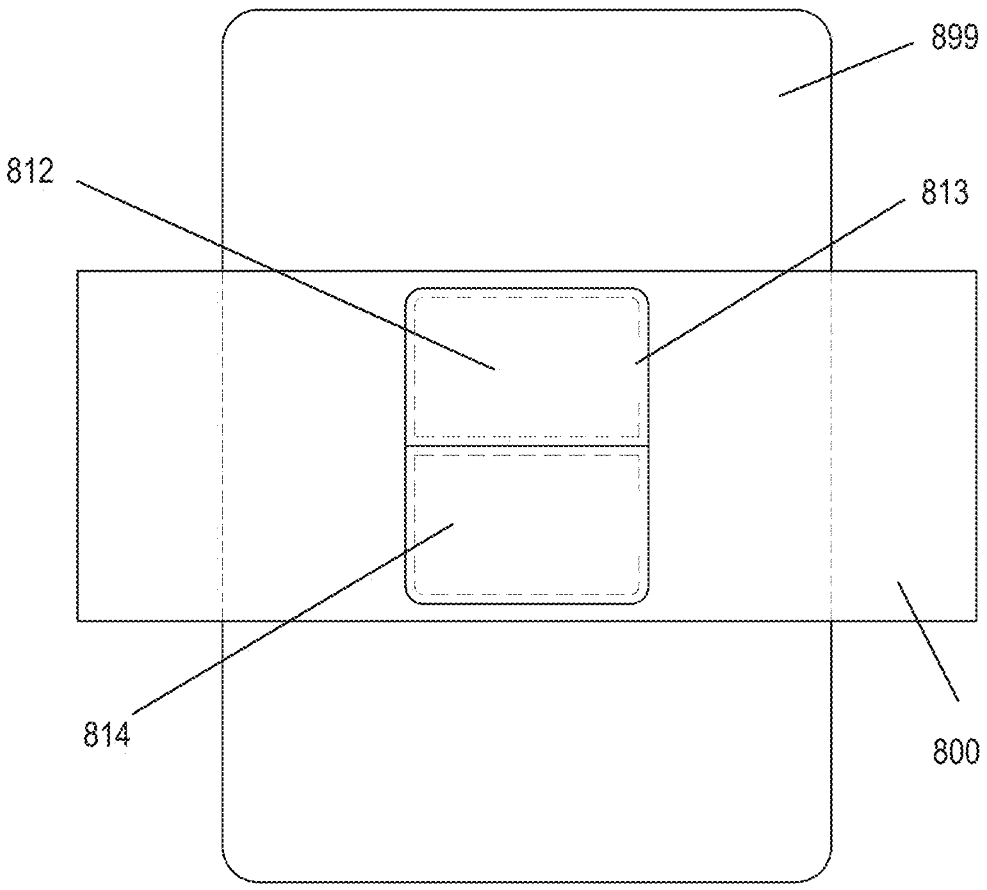
FIG. 8-8A illustrate another embodiment of a sheet, which can be a standard non-fitted draw sheet instead of a fitted sheet, and including a longitudinal axis that is transverse to the longitudinal axis of a mattress.
Figure 8A:
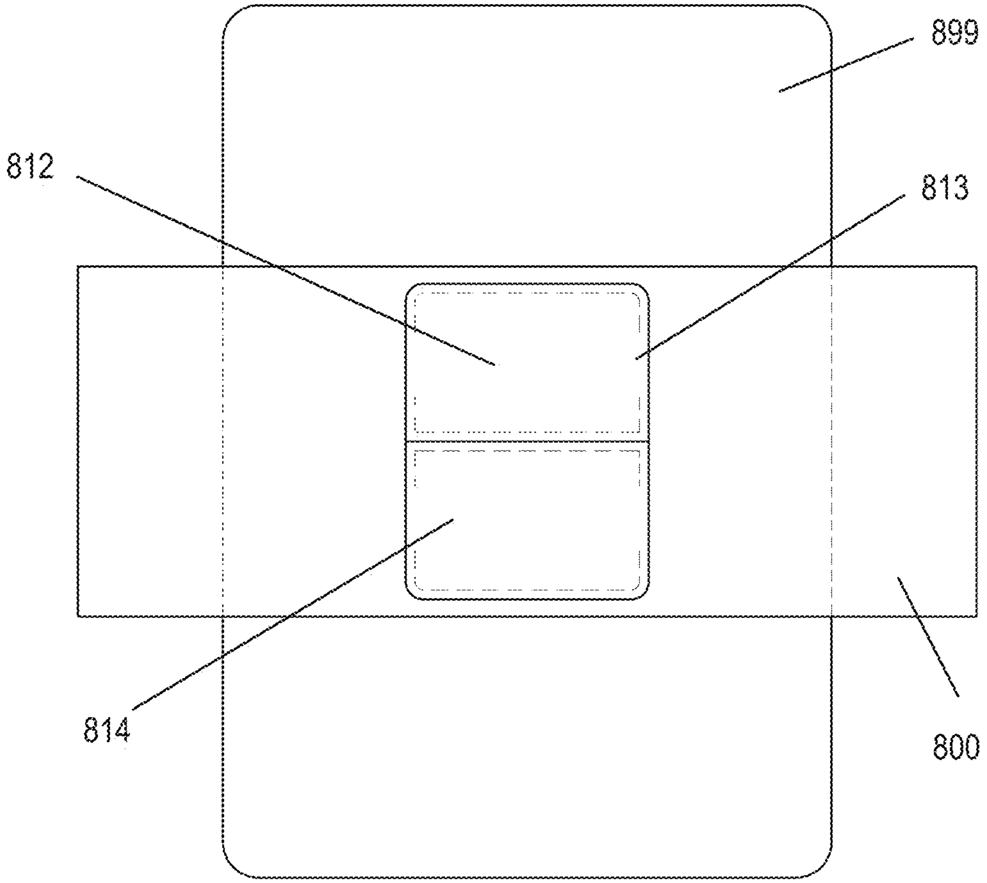

FIG. 8 illustrates another embodiment of a sheet 800, that can be a standard on-fitted draw sheet instead of a fitted sheet, and including a longitudinal axis that is transverse to the longitudinal axis of a mattress 899. The sheet 800 can include two connected pockets 812, 814 with openings 813 for an insert, such as a gel pad as previously described. In some embodiments, the sheet 800 can be wide enough to encompass 3, 4, 5, or more pockets across. FIG. 8A shows openings in the pockets. The openings can be on both sides of the pocket. The opening can be on one side of the pocket. The opening can be on only one side of the pocket. The pocket can have one or more openings. The pocket can have only one opening.

Figure 9:
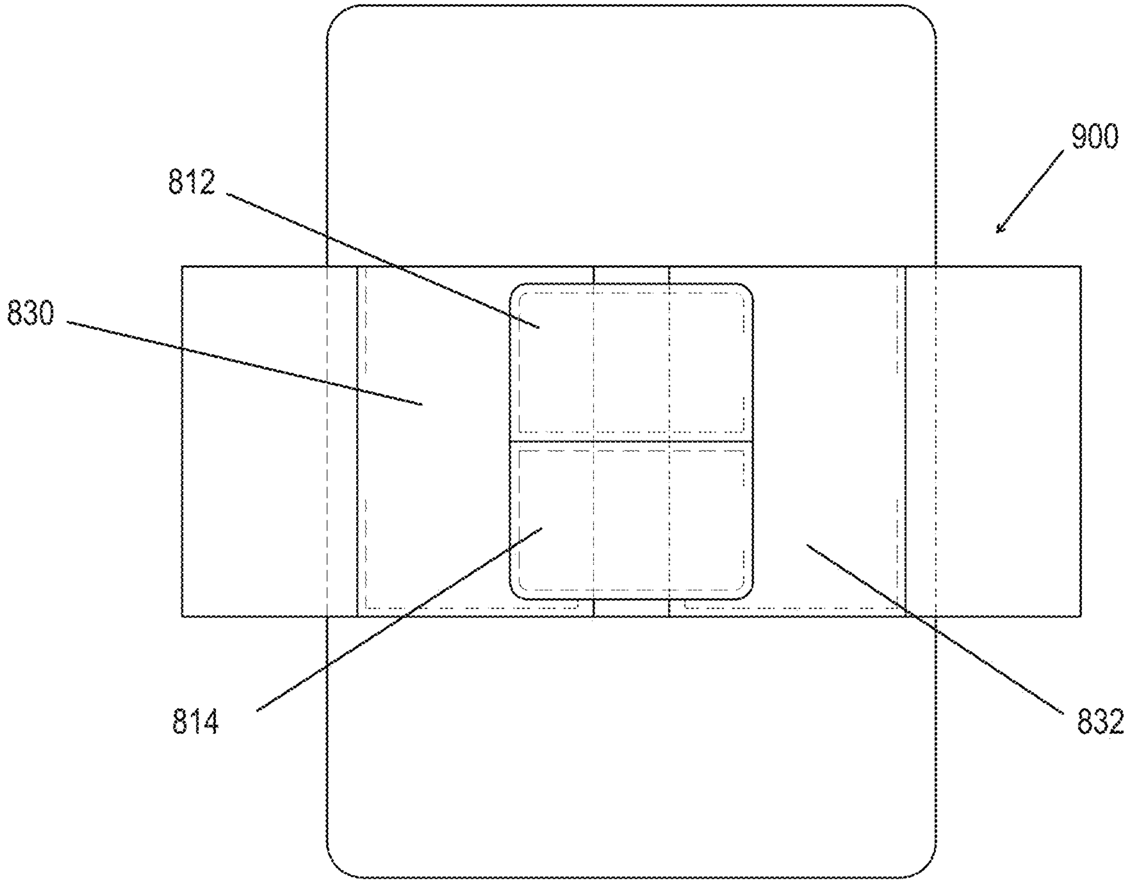
FIG. 9-9A illustrate another embodiment of a sheet similar to FIG. 8, except including a plurality of vertical as well as horizontal pockets that can be as previously described.
Figure 9A:
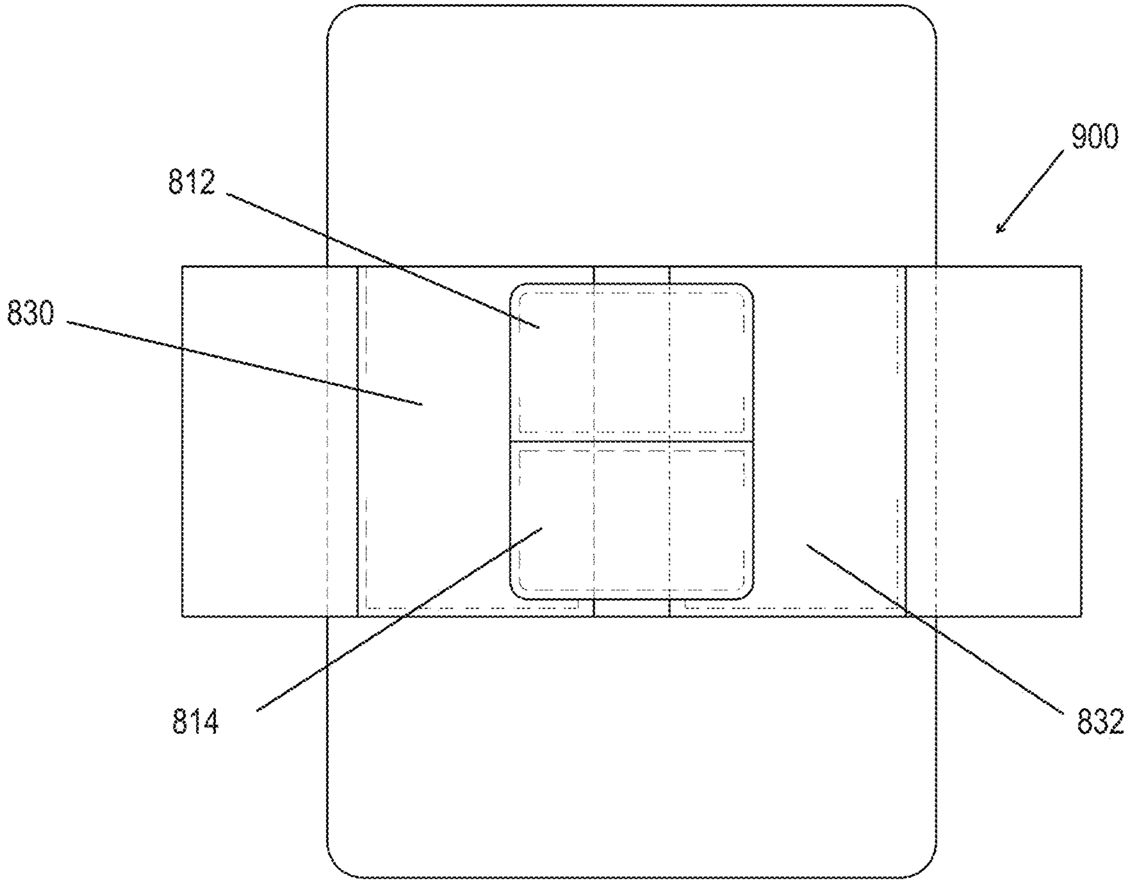

FIG. 9 illustrates another embodiment of a sheet 900 similar to FIG. 8, except including a plurality of vertical 830, 832 as well as horizontal 812, 814 pockets that can be as previously described. In some embodiments, the vertical pockets can be configured to accommodate inserts (e.g., wedges) to hold the patient's upper half at an about 30 degree or other desired angle relative to horizontal (e.g., completely supine). FIG. 9A shows openings in the pockets. The openings can be on both sides of the pocket. The opening can be on one side of the pocket. The opening can be on only one side of the pocket. The pocket can have one or more openings. The pocket can have only one opening.

Figure 10:
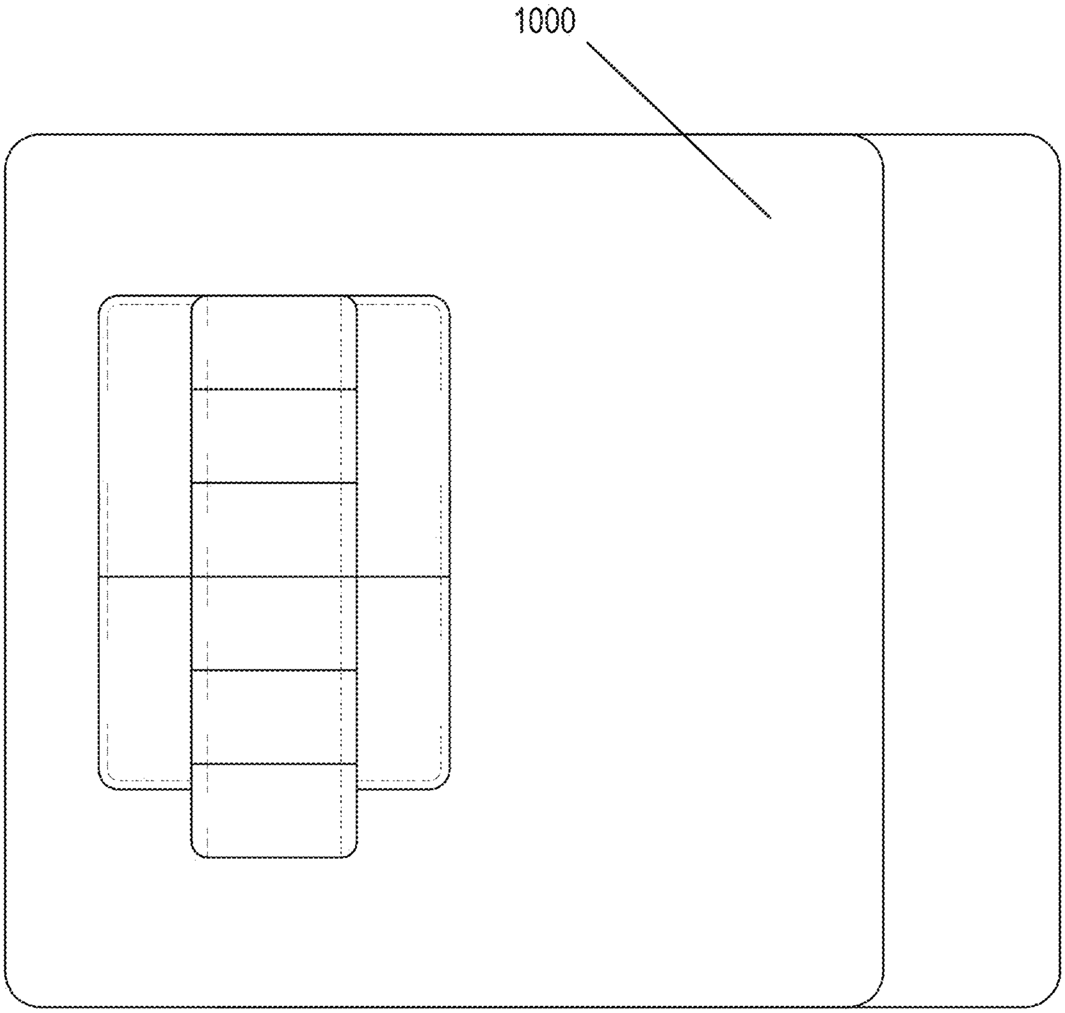
FIG. 10 illustrates another embodiment of a sheet similar to FIG. 5, except as a non-fitted sheet, and including a plurality of vertical as well as horizontal pockets that can be as previously described. In some embodiments, the sheet can be designed for home use.

FIG. 10 illustrates another embodiment of a sheet 1000 similar to FIG. 5, except configured as a non-fitted sheet, and including a plurality of vertical as well as horizontal pockets that can be as previously described. Fitted sheets can be utilized in other embodiments. In some embodiments, the sheet can be designed for home use on a larger-sized sheet, such as a full, queen, king, or California king sheet, for example, or smaller-sized sheets in other embodiments.

Figure 11:
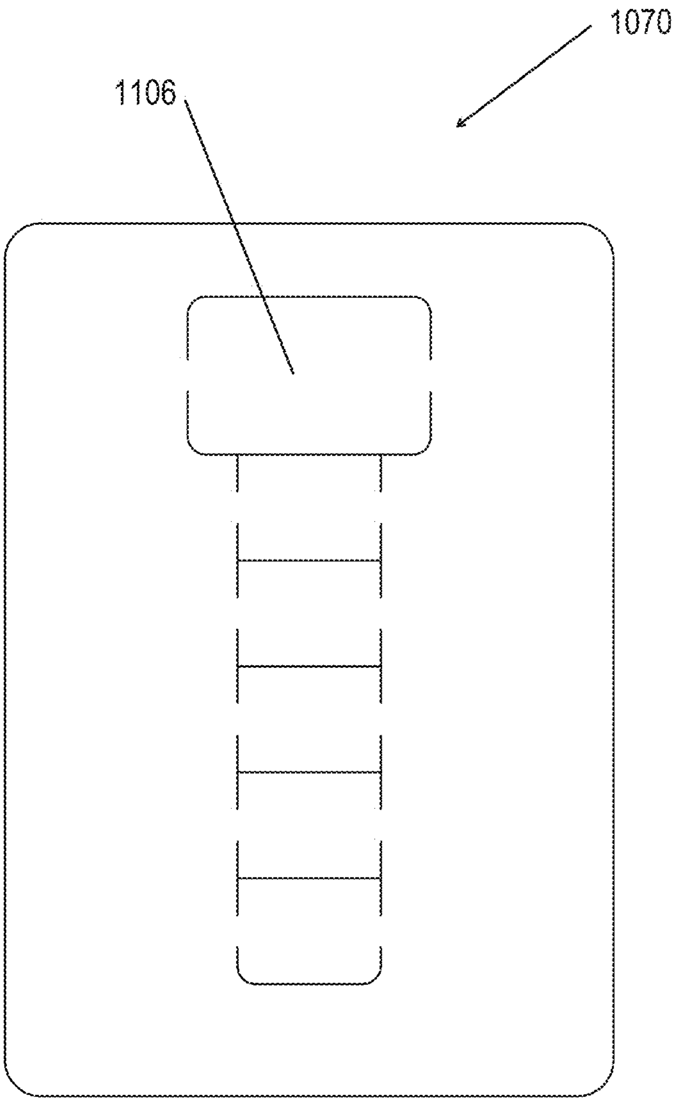
FIGS. 11-11B illustrate further embodiments of a sheet.
Figure 11A:
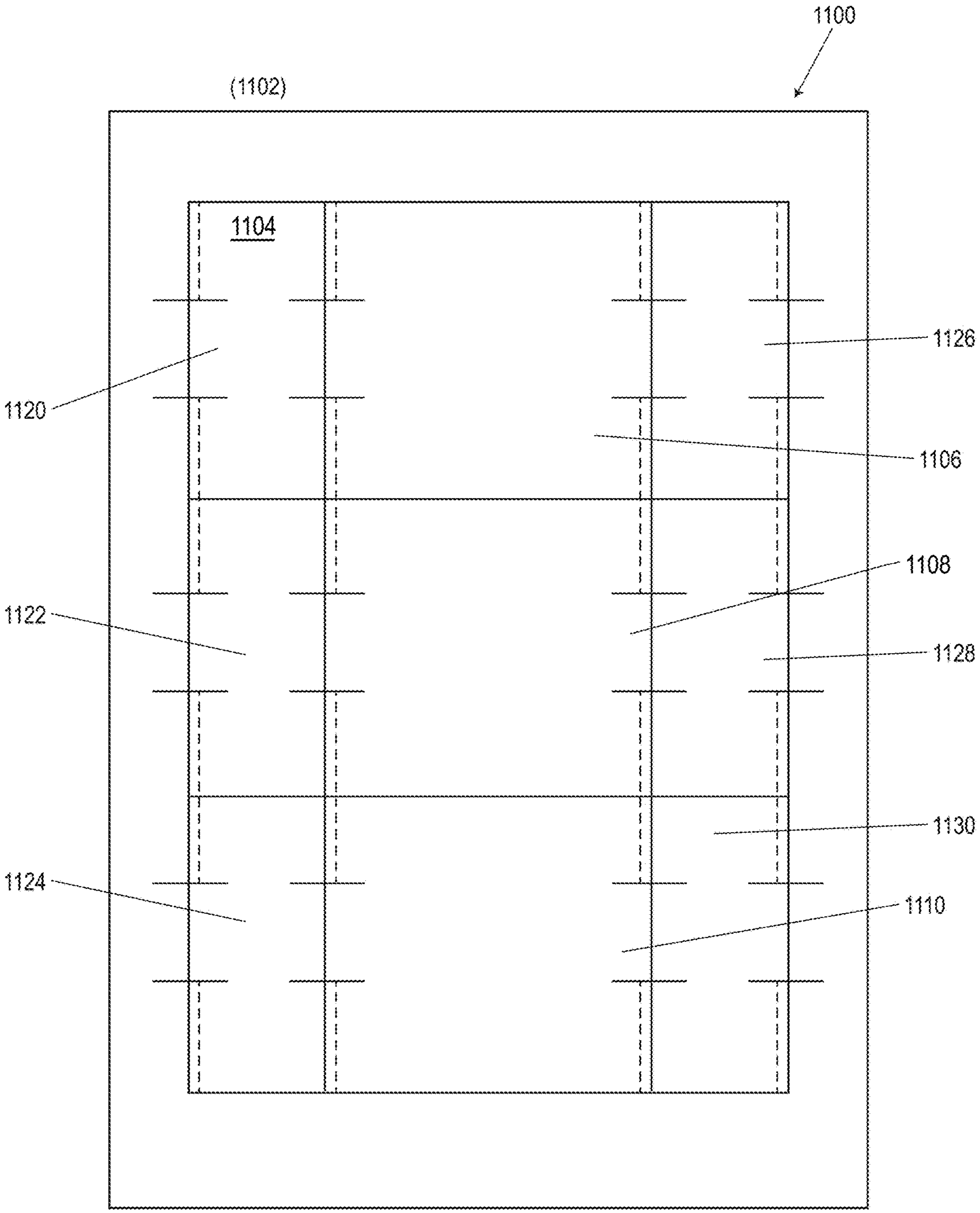
Figure 11B:
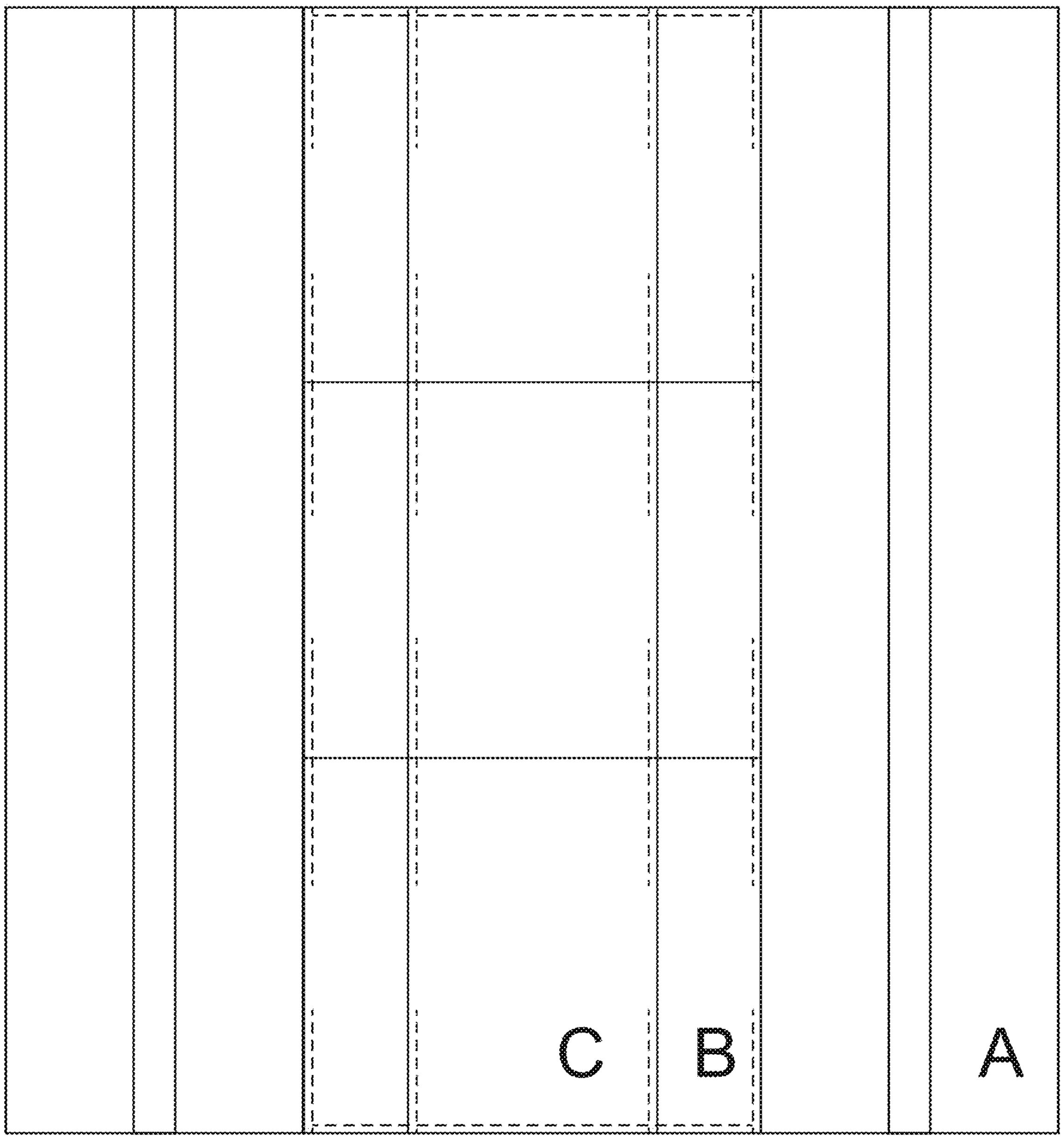

FIG. 11 illustrates an embodiment of a sheet 1070 with a first, proximal-most head pocket 1106 that can be larger in height, width, and/or length dimension with respect to the other pockets (e.g., 5 more distal pockets as shown). FIG. 11A illustrates another embodiment of a sheet 1100 that can include a bottom layer 1102 operably attached to a smaller top layer 1104 that can be made of, for example, the same material, or a different material, such as a stretch/compression/jersey fabric material. The top layer 1104 can include nine total pockets, including three horizontal pockets 1106, 1108, 1110, sized and configured to accommodate inserts as previously described. The horizontal pockets 1106, 1108, 1110 can be configured to provide support to the head and shoulders, sacrum and buttocks, and legs and feet, respectively. Lateral to each of the horizontal pockets 1106, 1108, 1110 can be vertical pockets 1120, 1122, 1124, 1126, 1128, 1130 (one on each side of each horizontal pocket) for a total of six vertical pockets. The vertical pockets can be configured for repositioning the patient. Each pocket can include openings on one or more sides as previously described. FIG. 11B illustrates an embodiment of a sheet that can include a bottom layer which is flat, and wider than standard twin sheets, which can measure 72-75" long×70" wide for example, more or less depending upon the size of the patient. There can be openings for retaining repositioning wedges. The opening can be on either side for the gel pad for patient comfort and pressure relief. There can be a sleeve for opening for a batten-like device to keep the sheet taut. This opening can be enclosed with Velcro, elastic, or a snap. In some embodiments, the device can be a pocketed topper using a flat sheet. As previously described in FIG. 11A, the top layer can include a total of 9 pockets, including 3 horizontal pockets, sized and configured to accommodate inserts as previously described. The horizontal pockets can be configured to provide support to the head and shoulders, sacrum and buttocks, and legs and feet, respectively. Lateral to each of the horizontal pockets can be vertical pockets as previously described, for repositioning the patient. In these configurations, the center and lateral pockets have openings on either side of the patient.

Figure 12:
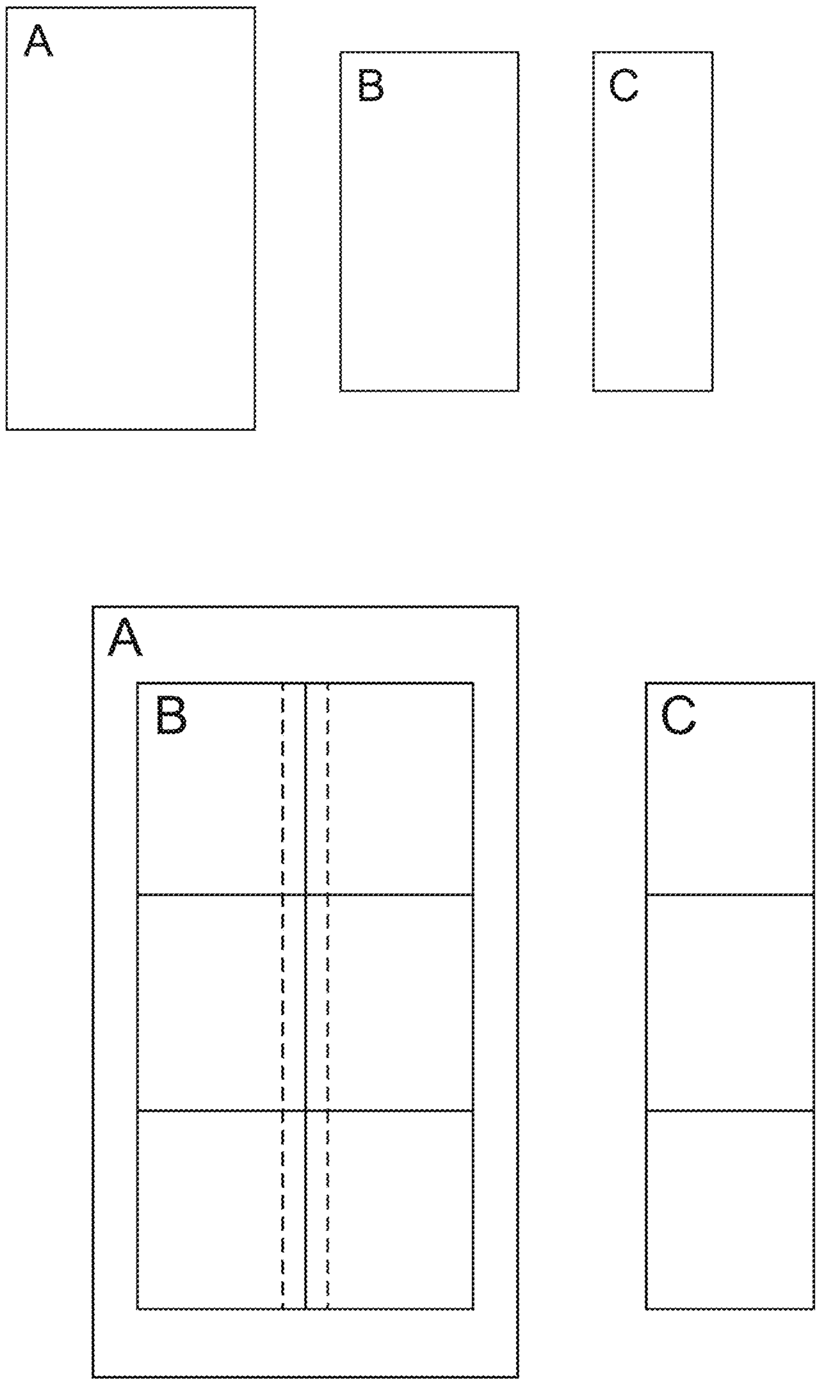
FIGS. 12-12D and 13A-13D illustrate embodiments of sheet manufacturing methods.
Figure 12A:
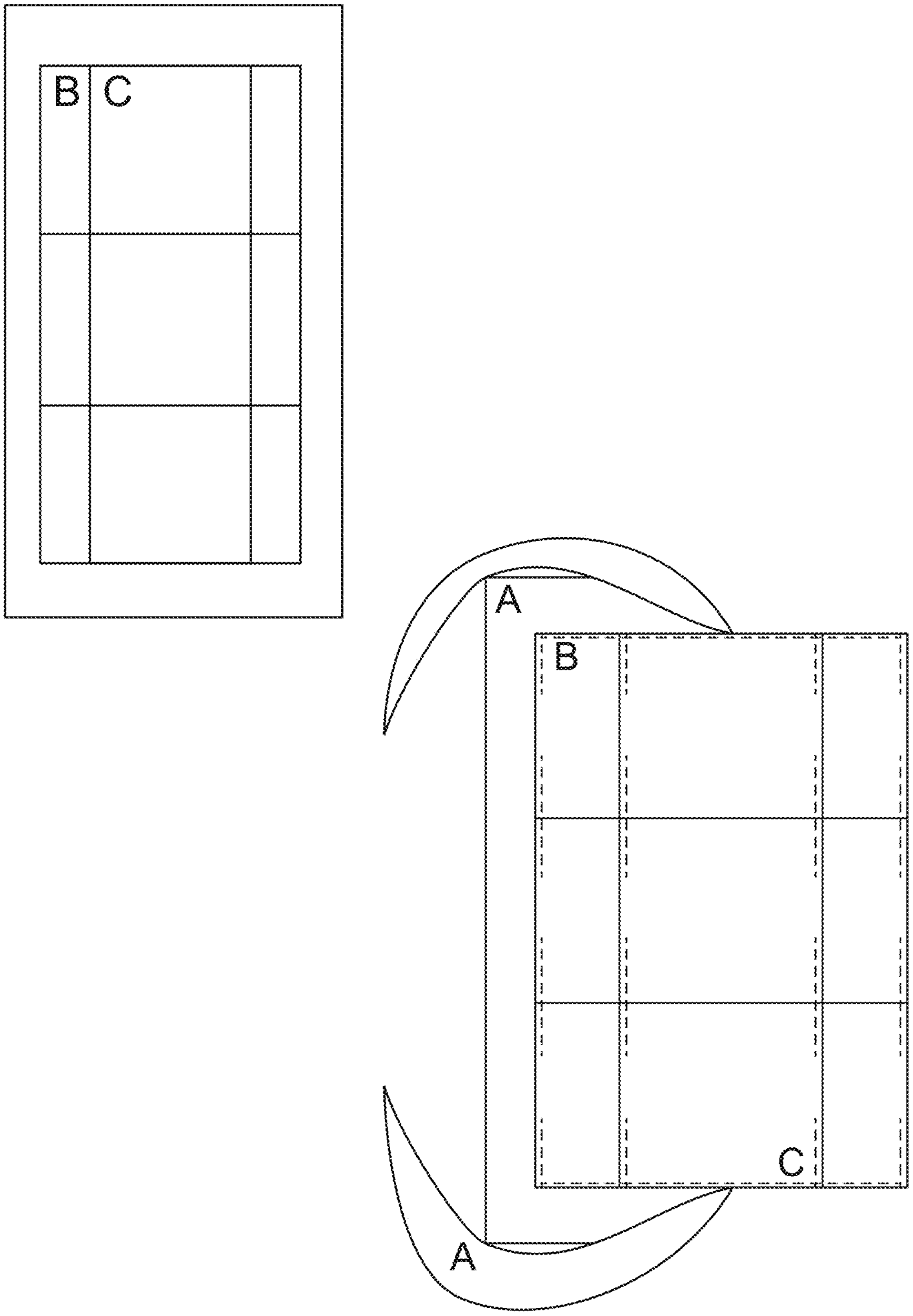
Figure 12B:
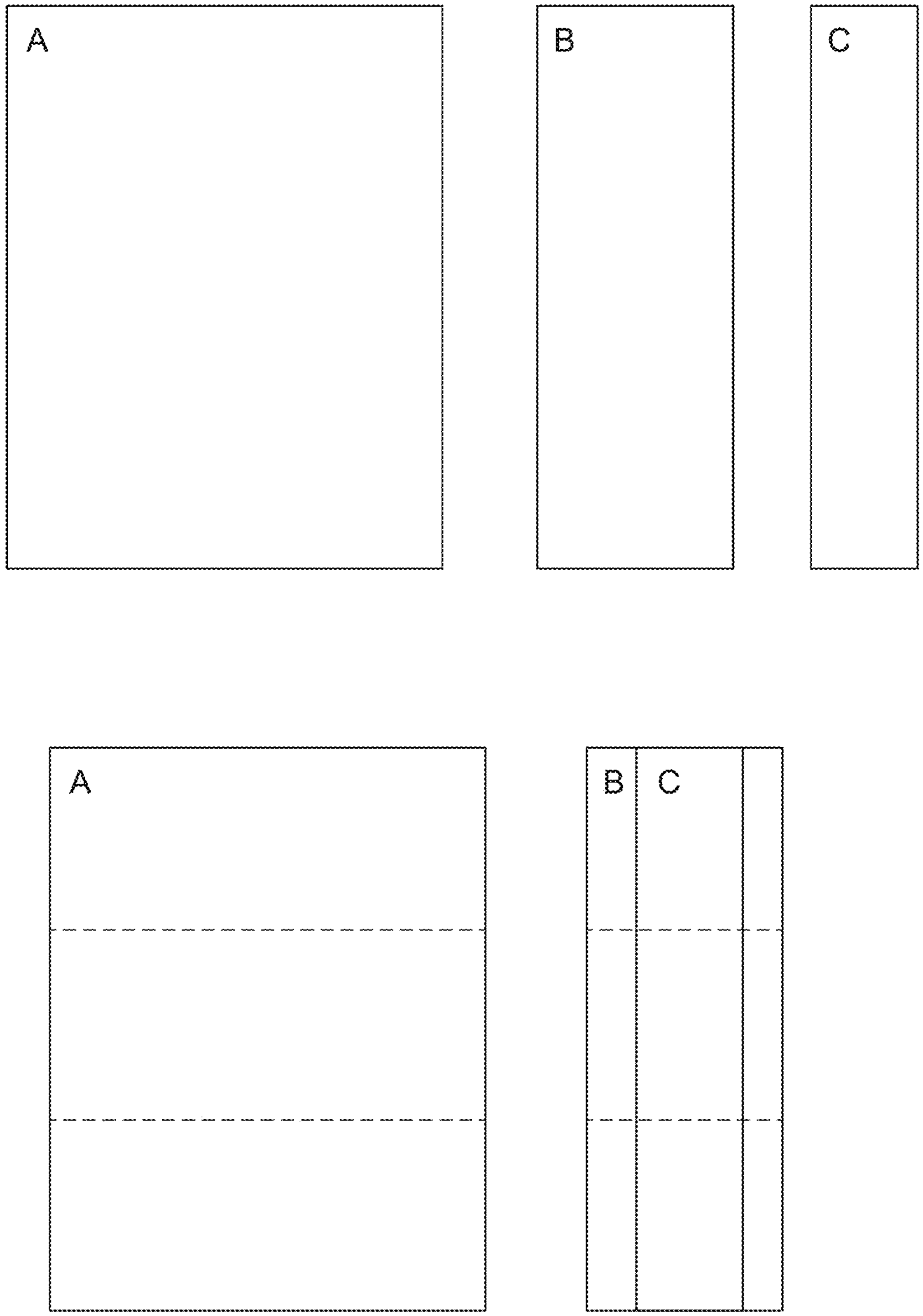
Figure 12C:
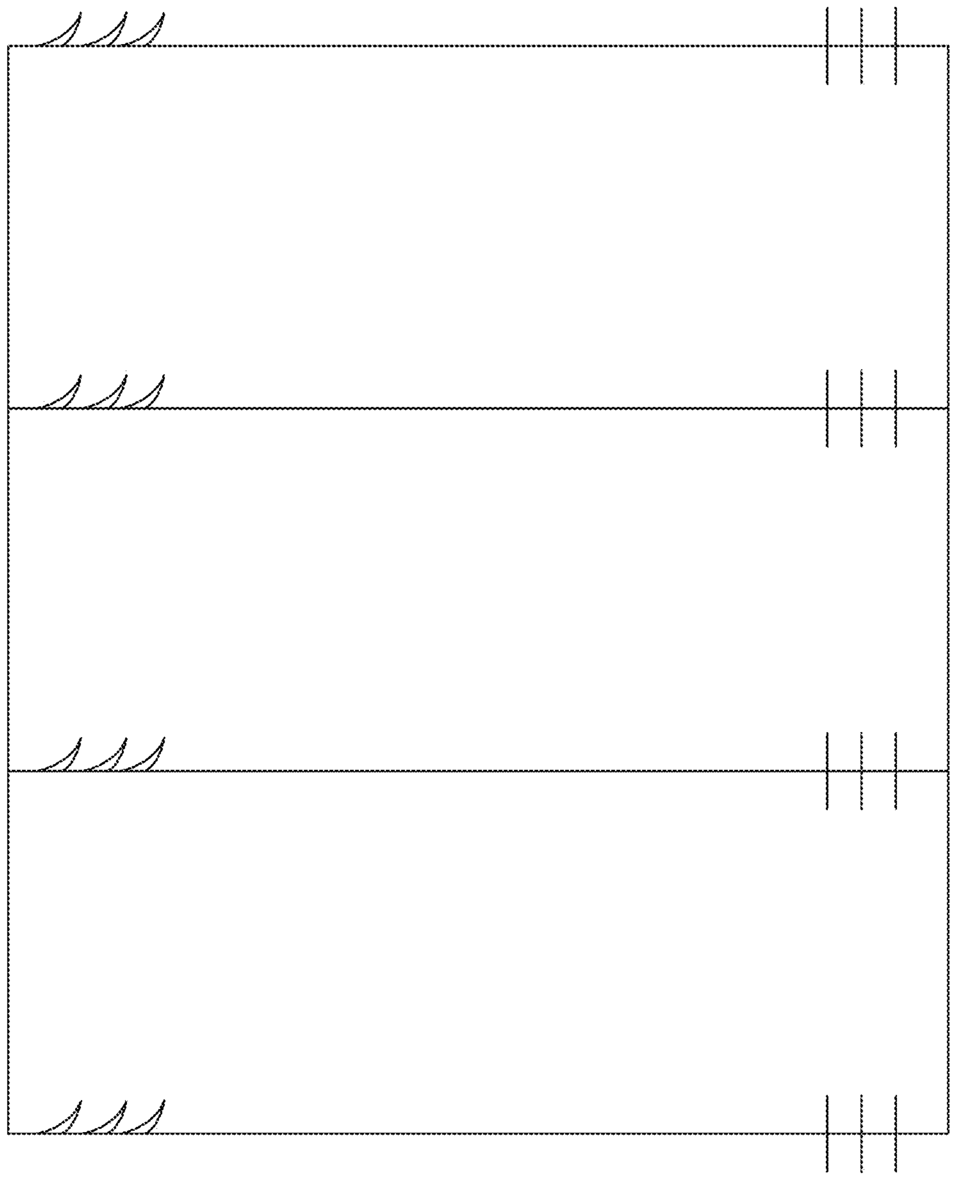
Figure 12D:
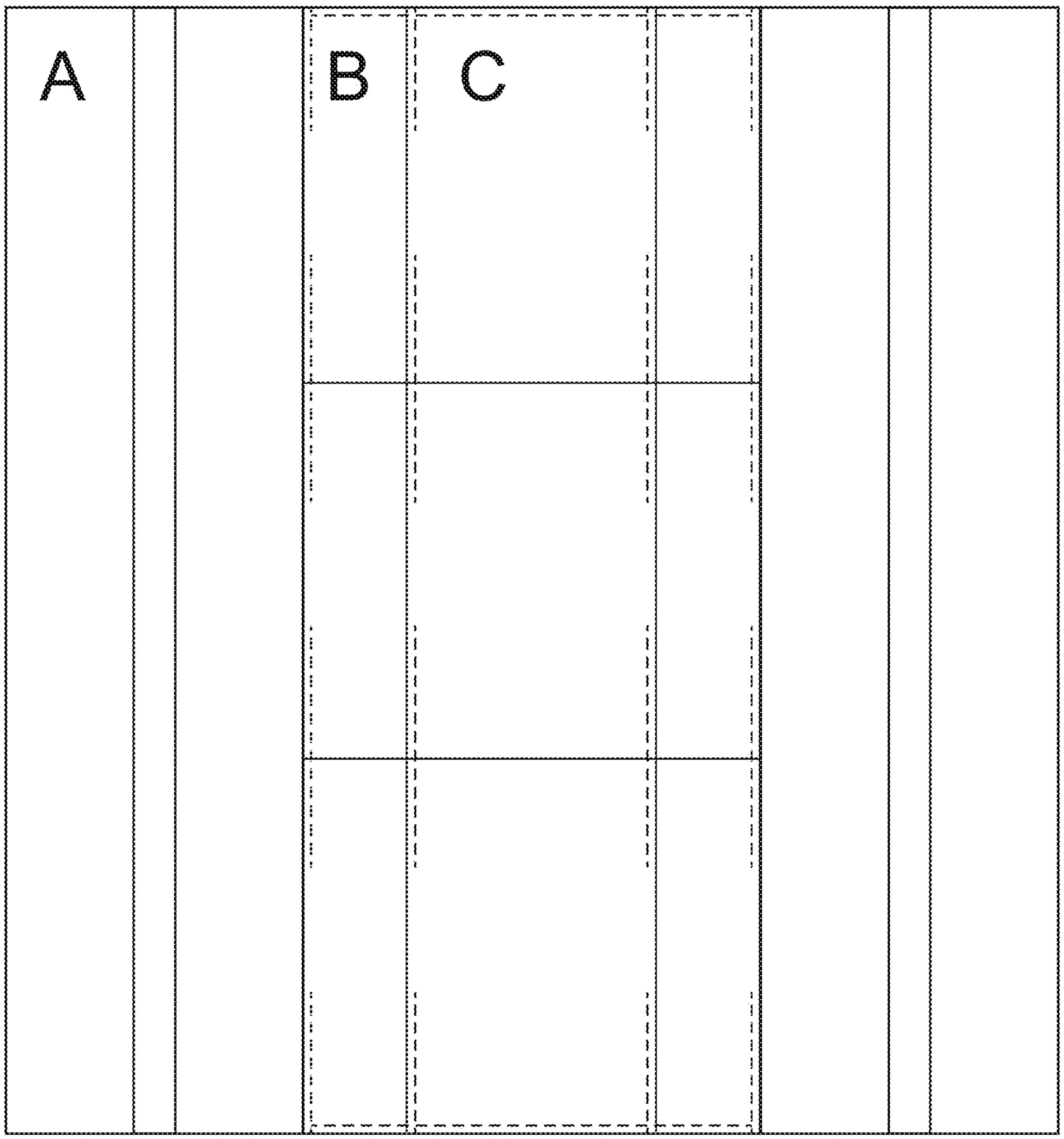
Figure 13A:
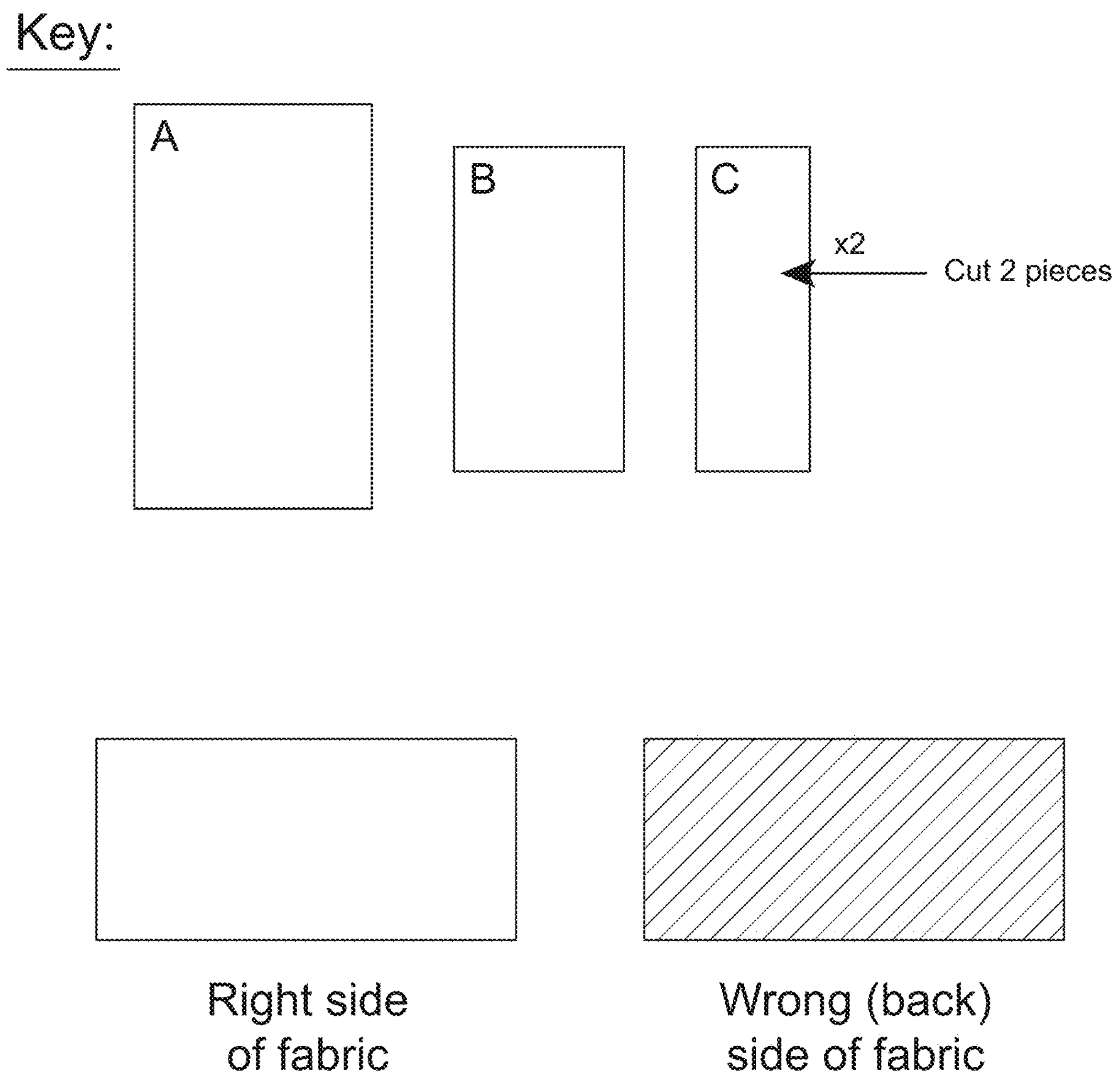
Figure 13B:
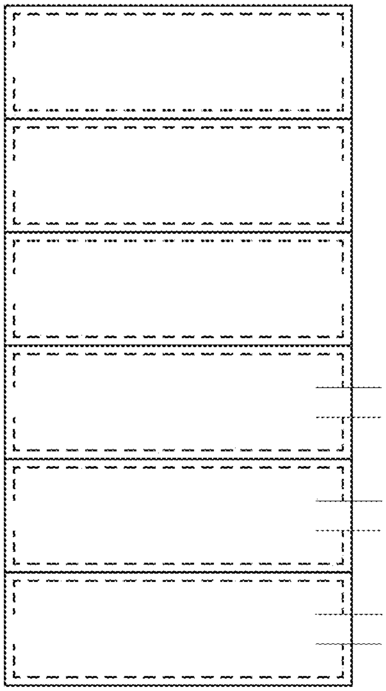
Figure 13B:
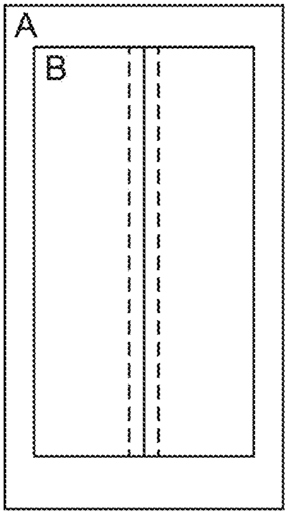
Figure 13C:
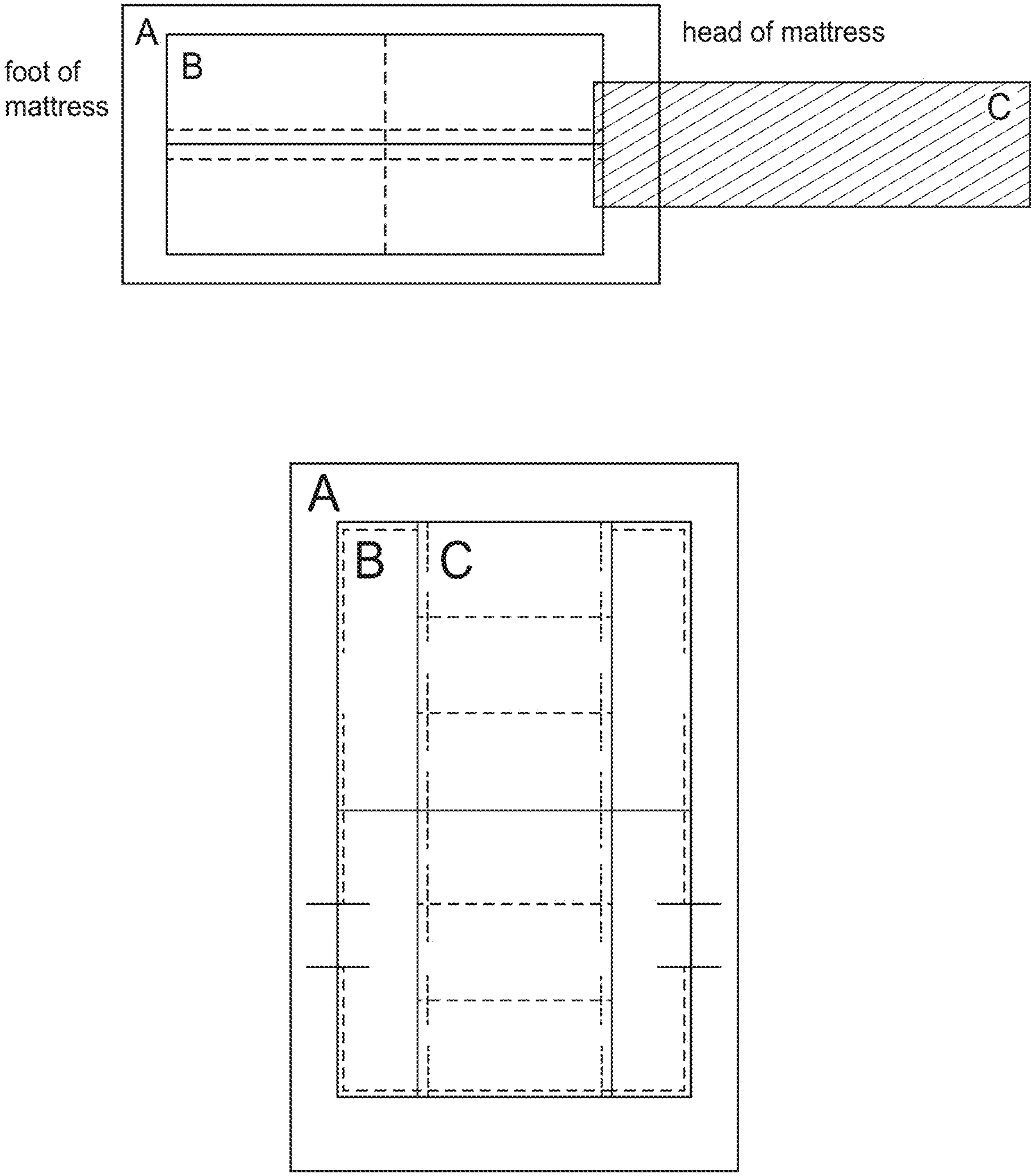
Figure 13D:
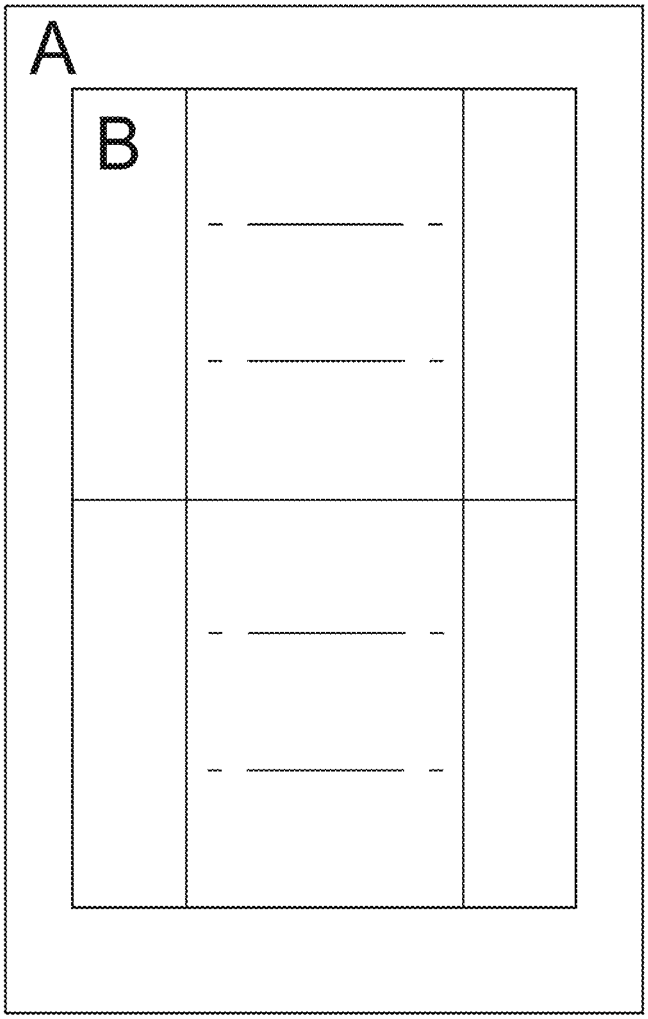

FIGS. 12-12D illustrate a method of manufacturing a sheet, according to some embodiments of the invention. The sheet could include nine pockets, or other numbers of pockets as disclosed herein. The method can include providing a bottom fitted twin sheet A, fabric for vertical sleeves for repositioning B, and fabric to create central horizontal pockets for insertion of gel foam pads C. Fabric B and fabric C can be of equal lengths in some cases. A and B can be first divided into equal fractions (e.g., thirds), and marked. Fabric B can be placed over sheet A aligning the centers of A and B, which are then marked. A desired amount, e.g., about 2 inches in some cases can be stitched on either side of center vertically from the top of fabric B to the bottom edge. Fabric C can then be placed over fabric B, aligning the centers. Next, as shown in FIG. 12A, A can be folded back on, e.g., behind itself. Horizontal pockets can be created by stitching Fabric C to Fabric B along vertical edges as shown, leaving a center portion (e.g., ⅓ in some cases) open of each sleeve. The process can be repeated on the other vertical edge of Fabric C. In some embodiments, additional or alternative enclosures can be created at this stage. Next, horizontal seams (e.g., 4 horizontal seams in some cases) can be stitched across Fabric B, such as along the top and lower edges, along marked lines (e.g., thirds) of Fabric B. Next, stitching can occur along the vertical edges of Fabric B, leaving a center portion (e.g., thirds) of pockets/sleeves open for the insertion of support wedges. In some embodiments, the center portion can include, or be no more than about the middle third (middle 33% to middle 67%), middle 25% to middle 75%, middle 40% to middle 60%, or other fractions either lengthwise and/or widthwise.

As shown in FIGS. 12B-12D, another method can include providing a bottom sheet which is a flat sheet A, fabric for vertical sleeves for repositioning B, and fabric to create central horizontal pockets for insertion of get foam pads C. All three of these fabrics in this embodiment can be of equal lengths, approximately 72-75" long, depending upon length of the patient. Fabric A can be 60-70" wide or more. Fabric B can be made of stretchy fabric. Fabric C can be made of CoolMax which is most therapeutic next to patient's skin. Width of fabric B can be 32" wide approximately. Width of fabric C can be 16-20", more or less, depending upon patient size. Fabric C can be pinned to Fabric B, aligning centers. Next, these can be divided into thirds horizontally, and marked, then stitched using a simple straight stitch. Next, sew using a serger stretch stitch to sew along top and bottom horizontal edges along C, then along vertical edges of C to create pocket enclosures by stitching along ⅓ of top and bottom of each of the three pockets. Another embodiment can utilize pleats on Fabric B as pictured in FIG. 12C. Finally, align centers of Fabric B/C pieces to the center of Fabric A; pin. Using straight stitch, sew horizontally at ⅓*s* markings to secure B/C to A. Sew using serger/stretch stitch to create side pockets along top and bottom edges of B, and also vertically along edge of B, as previously described in creating pockets in A: sew along upper and lower ⅓ of each pocket, leaving open center ⅓. All of the edges of Fabric A can be finished while folding over edge with a straight stitch. Lastly, to create sleeves (which can hold the batten-like strips to hold sheet taut), on vertical line approximately 8" from edge B towards outer edges, create a 1.5" fold (3" of fabric folded in half) and press. Stitch along edges of this sleeve to secure, and sew across top edge. On bottom edge, sew a strip of elastic, or Velcro, or place a snap, any of which can maintain security of a batten.

FIG. 12B shows the construction instructions for the flat design for a twin mattress or full mattress topper. Cut three pieces of fabric. Section A is 70 inches by 75 inches. Section A can be broadcloth sheet fabric for bottom layer. Section B can be 32 inches by 75 inches. Section B can be jersey knit for middle. Section C can be 16 to 18 inches by 75 inches. Section C can be CoolMax® fabric for center next to patient. Section C can be pinned to Section B aligning centers. This can be divided into equal thirds and marked. These markings can be stitched using a straight stitch. The sections can be sewn using a serger for a cover stitch, the stitch can be stretched as marked to form center pockets. There can be the option for construction of sleeve B for holding wedges. There can be a straight stitch to create pleat. The dimensions can be 38 to 40 inches by 75 inches. Instead of 32 inches, add extra 6 to 8 inches to allow creation of three or four 0.5 inch plates. Then make three to four 0.5 inch folds using 1 inch of fabric at both top and bottom of fabric and also at one-third markings. Iron the folds to create pleats. Straight stitch as marked to hold pleats. Place Section C over Section B and continue as previously instructed. FIG. 12D illustrates the center pocket for placing and securing gel foam pads and pillows and/or other pressure redistributing devices. The side pockets can be used to place and secure repositioning wedges as well as gel foam for increased comfort. Align Section B and Section C to center Section A and pin. Straight stitch horizontally to secure Section B to Section A at one-third markings. Sew using serger and stretch stitch to create side pockets on Section B. Create sleeve for tightening sheet with batten-like strips of plastic by folding 1.5 inch of fabric of Section A from top to bottom. Using straight stitch, sew along margin 1.5 inch from folded edge. Stitch to close across top. Sew strip of either elastic of Velcro to secure closure at bottom or place snaps.

FIGS. 13A-13D illustrate another method of manufacturing a sheet, according to some embodiments of the invention. The sheet could include 10 pockets, or other numbers of pockets as disclosed herein, such as 1, 2, 3, 4, 5, 6, 7, 8, 9, 10, 11, 12, 13, 14, 15, 16, 17, 18, 19, or 20 pockets or more or less, or ranges including any two of the foregoing values. The method can include providing a bottom twin sheet A, fabric for vertical sleeves B (e.g., 4 vertical sleeves, for repositioning), and fabric for a central portion to create horizontal sleeves/pockets C. The fabric C can be provided in two equal pieces. The two pieces of fabric C can be stitched together at their top and bottom horizontal edges. The piece C can then be divided into fractions (e.g., sixths) and the evenly spaced intervals marked. After basting or pinning, stitching can be performed over the markings to create the desired number of sleeves (e.g., six). The side edges can then be stitched, at only the upper and lower fraction, e.g., third of each sleeve, such that the center fraction, e.g., third remains open for gel pad or other insert placement. Fabric B can then be centered over sheet A, the centers aligned, marked as shown, and pinned or basted into place. A vertical portion, e.g., about 2 inches, can be stitched on either side of center. Next, on the top edge, the center of fabric C can be aligned with the center of fabric B, right sides together, which B extended away from sheet A. The pieces can be overlapped by a desired amount, such as about ¼ inches. Stitching along the top edge of B and C can be done next. A horizontal seam can then be stitched across the center of piece B (that appears vertical in this position) to secure fabric B to sheet A, and also to begin creating the desired number (e.g., 4) of vertical sleeves. Fabric C can then be pulled over to lie over fabric B. A horizontal seam can then be stitched across the center of C, over that sewn on B as previously described. This seam can also coincide with that between the third pocket and the fourth pocket. Stitching can then be performed around the perimeter of fabric B except for the center third of side pockets, leaving an opening for supportive pillows and wedges, and except the top border of fabric C. Lastly, fabric C can be secured to fabric B and sheet A with a desired amount, e.g., about 4 inches of horizontal stitching along lines between pockets on fabric C (only needed between pockets 1 and 2, 3 and 4, 4 and 5, and 5 and 6).

Figure 14:
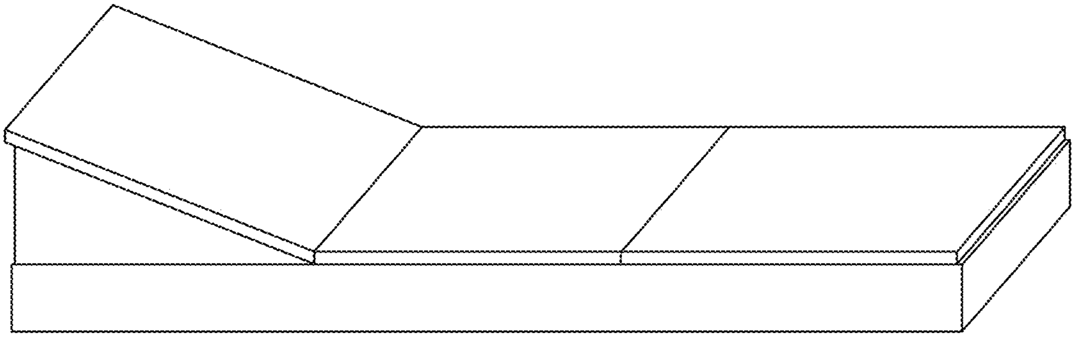
FIGS. 14 and 14A illustrate embodiments of sheet and FIG. 14B illustrate an embodiment of sheet manufacturing method.
Figure 14A:
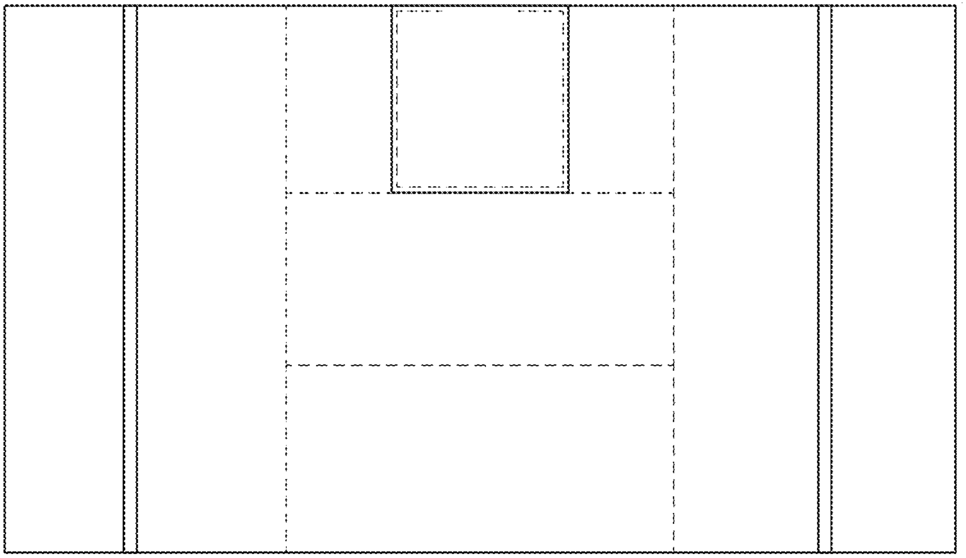

FIGS. 14-14A illustrate another embodiment of a sheet similar to FIG. 11B, except that it offers the option of a pocket created in the underside of the sheet to retain a wedge to elevate the head of the patient. This can be very helpful in repositioning as described hereinto redistribute weight and pressure. This can be helpful to adhere to the "Rule of 30 s", recommended by the NPUAP. It can be a very simple addition, and helpful for beds/mattresses lacking the capability to mechanically elevate the head. The wedge can be sized to be approximately 8" in height, 20" long, and 19" wide. This will fit in the pocket described. There can be a wedge inserted to elevate the head. There can be an opening of a pocket at top of sheet for the wedge. The wedge can have a height of 8 inches and a length of 20 inches. The sheet is shown on a mattress. FIG. 14A is the backside of the flat sheet. There is one additional pocket stitched on back to hold the head-elevating wedge. This sheet is the same as the nine-pocket sheet of FIG. 11B just with an added pocket for the head of the bed on the reverse side.

Figure 14B:
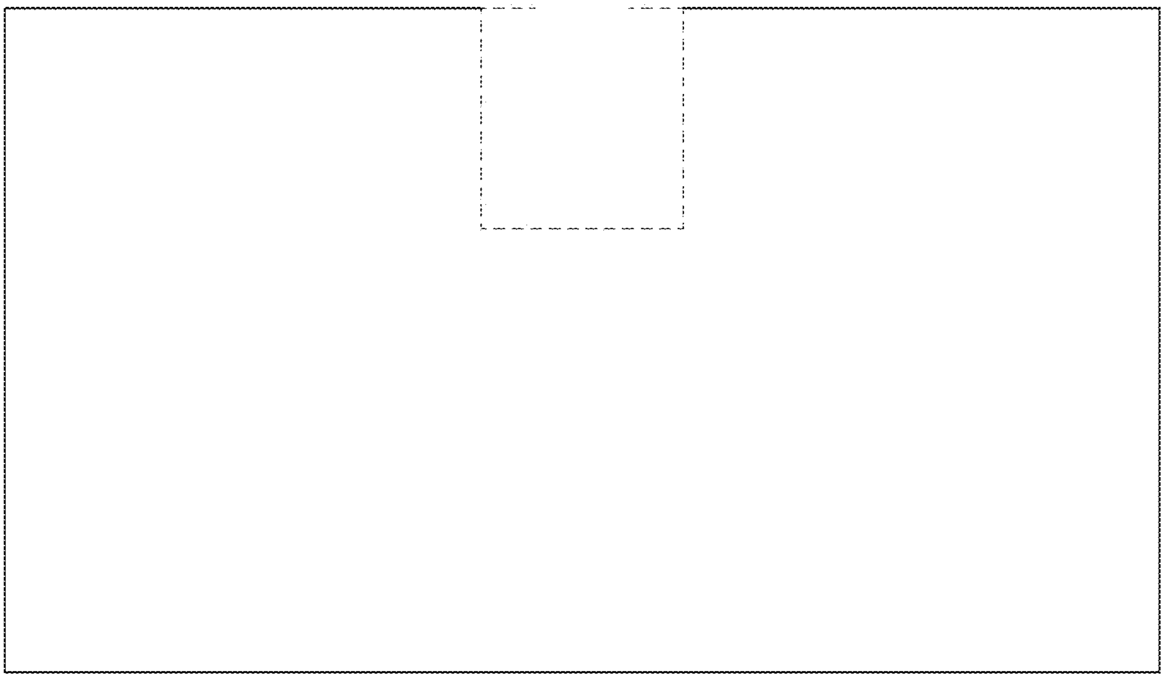

FIG. 14B illustrates another method of manufacturing a sheet, according to some embodiments of the invention. There is the possibility of adding a pocket that can elevate head of bed in mattresses/beds. The sheet could include 10 pockets, or other numbers of pockets as disclosed herein. The method can be the same as described herein, except for one additional pocket stitched onto reverse side of fabric prior to first step. One additional piece of stretch fabric, as used for B in previous embodiments, to be cut approximately 20" wide (the width of center C fabric)×22-25" long. Next, align center of this pocket D to the backside of center of Fabric A. Stitch using serger or stretch stitch around all edges excepting for top edge. Stitch 3-4" along this top edge starting at one side of pocket, then at the other side edge of pocket to leave an opening approximately 12-14" wide to place wedge described in FIG. 14. This pocket can be made larger to create room for making pleats, as in FIG. 12C, if needed. After these preliminary steps, continue with steps as described previously. FIG. 14B illustrates the construction of FIG. 14. First, add one additional piece of stretch fabric, e.g., jersey, same size as top third section of section C, approximately 20 inches wide and 22-25 inches long. Align the centers. Stitch using stretch serger stitch around all edges except for top edge. FIG. 14B shows the backside of the flat sheet A. This pocket will leave an opening for the wedges and leave retaining stitches to hold the wedge in place. Then continue with steps disclosed herein related to FIGS. 12B-12D.

Figure 15C:
FIGS. 15A-15P illustrate embodiments of a sheet.
Figure 15B:
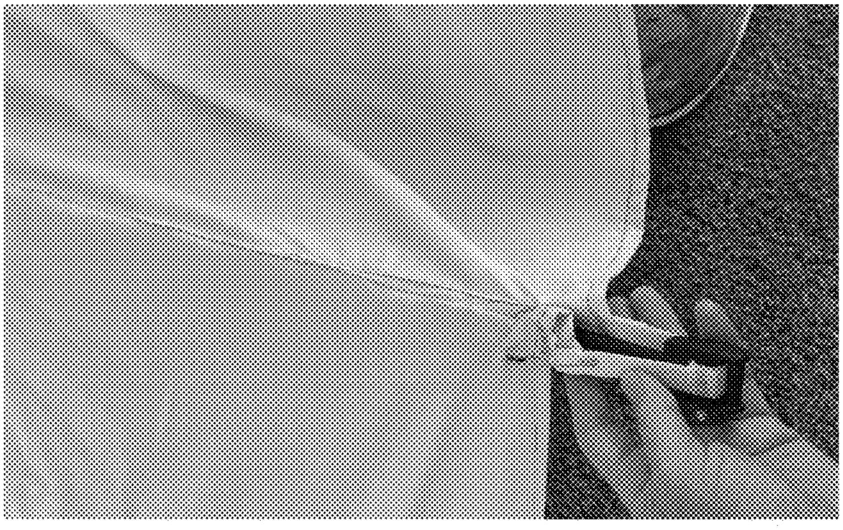
Figure 15A:
Figure 15E:
Figure 15D:
Figure 15F:
Figure 15G:
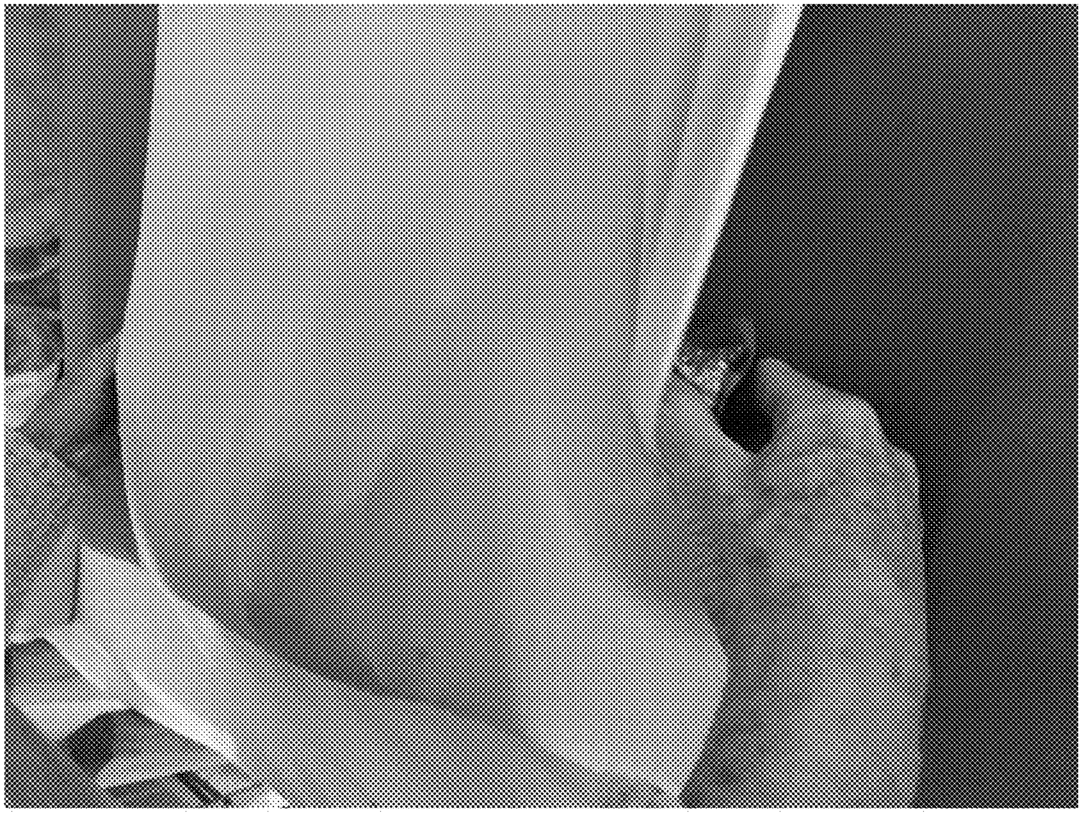
Figure 15H:
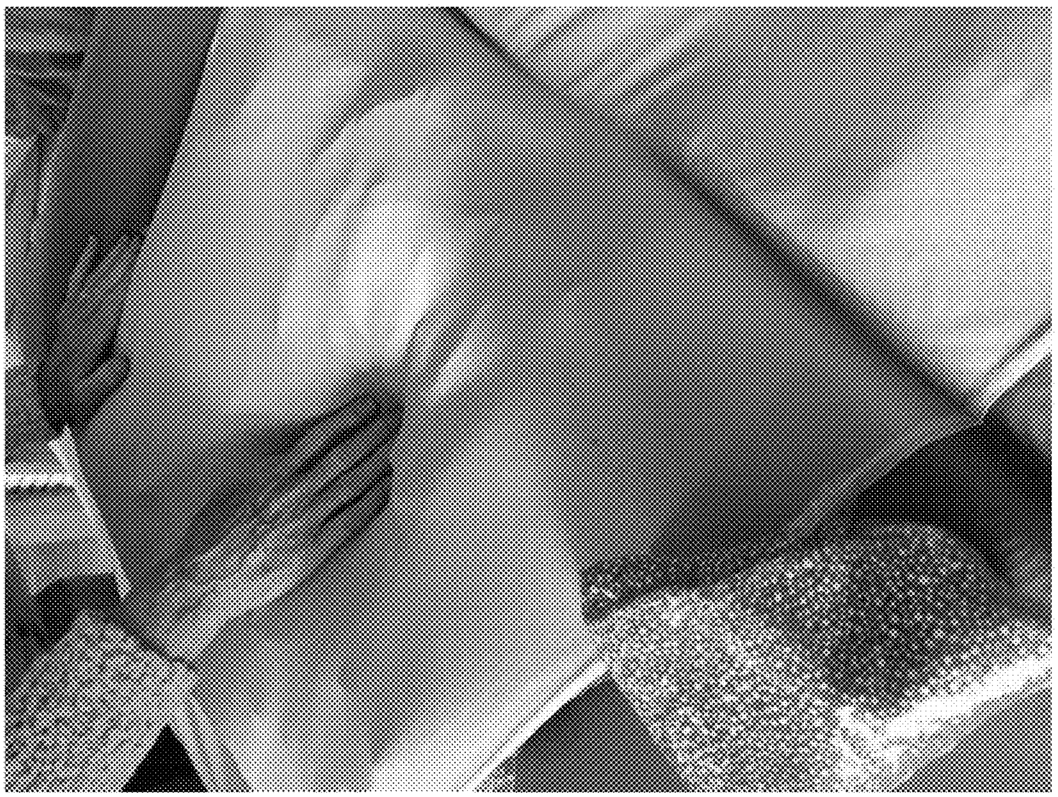
Figure 15I:
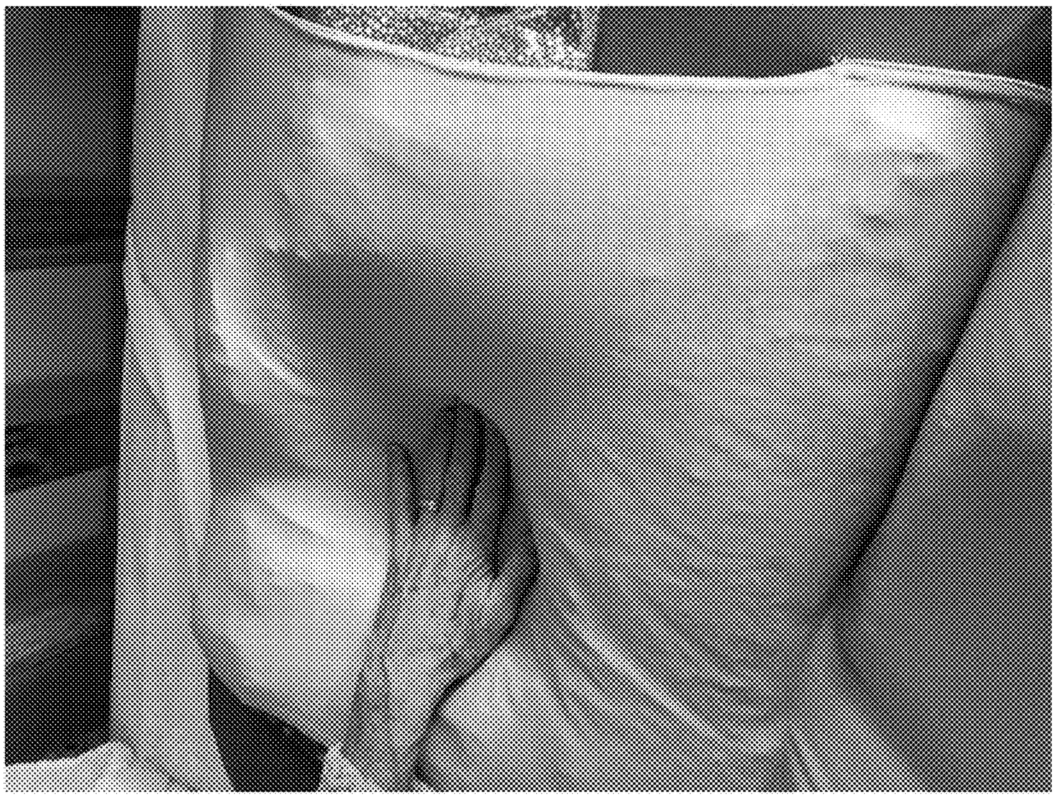
Figure 15J:
Figure 15K:
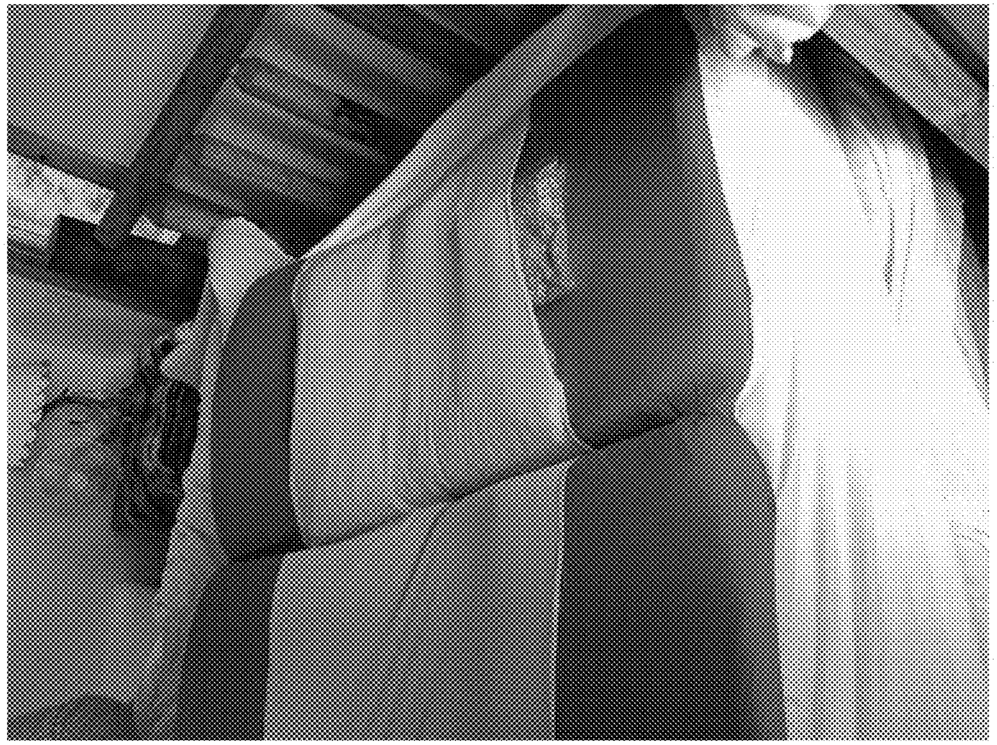
Figure 15M:
Figure 15L:
Figure 15N:
Figure 15O:
Figure 15P:

FIGS. 15A-15P illustrate photographs of embodiments of the device.

In some embodiments, the pockets can be made of the same material as the underlying sheet, or a different material. In some embodiments, the pockets can be made of one continuous piece (or several discontinuous pieces in other embodiments) of stretch wicking (which can also have inherent, or added antimicrobial features) that is flush with the bottom sheet but can accommodate a small gel pillow. In one embodiment, the center pocket material is about 18 to 20 inches wide to accommodate an average body type. In one embodiment, there is about 11.5 inches on either side of the center pocket material, of a standard 38-inch-wide twin mattress.

In some embodiments, the pockets can be attached to the underlying sheet via one or more complex stretch serger stitches, zigzag stitching, or simple straight stitching (which can advantageously lead to less friction in some cases.

In one non-limiting embodiment, all of the pockets are of same dimensions: 15"×11", with pockets being separated by stitching, and openings on each side formed with simple stitching as well, on ⅔ of each side, the center ⅓ open for insertion of gel pillow.

In some embodiments, pockets corresponding to the knee and/or lumbar sections can be made more narrow than other pockets in order to offer more support in these areas, as opposed to skin protection.

In a larger sized embodiment with six horizontal pockets, some of the pockets can measure approximately 18" to 20" wide by 11" tall, except the knee and lumbar pockets could be approximately 8 inches in width and/or height, which can be useful for a wedge for knees and smaller lumbar support, which could include gel pads as well.

In some embodiments, a smaller head pocket size can be utilized, measuring about 20.5"×15" as one non-limiting example. In some embodiments, the center pockets can be the same size, about 20 inches wide by 24 inches to 25 inches long, in some cases.

In some embodiments, an extra layer can be present over the upper layer used to create the pockets, e.g., fabric layer, in order to create separate body pillows for gel independent of vertical side sleeves for support wedges. The side/vertical sleeves can include one single piece of fabric for both pockets over the sheet and maintain the integrity of the individual pockets since these will be beneath the center fabric of pockets/sleeves.

Figure 16A:
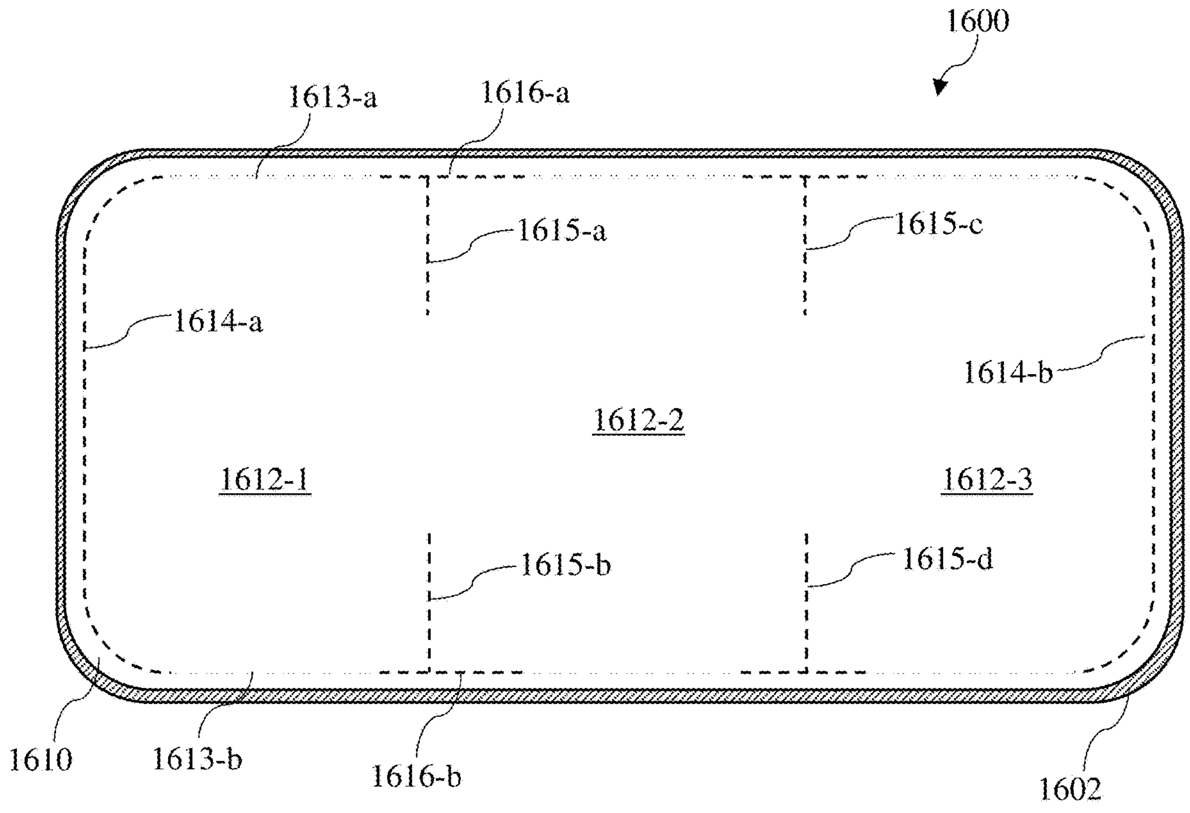
FIGS. 16A-B illustrate another embodiment of a bed sheet comprising pockets for inserts.
Figure 16B:
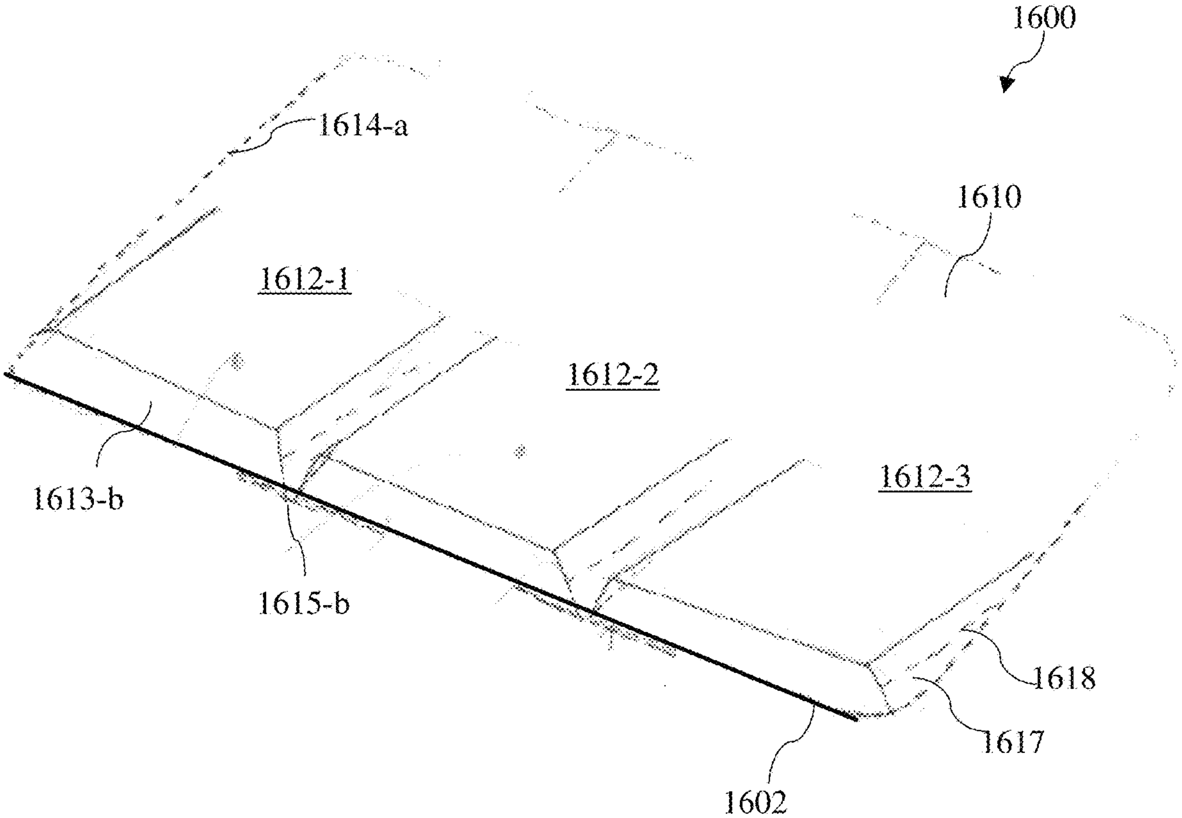

FIGS. 16A-16B illustrate another embodiment of a sheet system 1600. The bottom layer 1602 may have a second layer 1610 affixed to it by seams 1614*a-b*, 1615*a-d*, and 1616*a-b*. The second layer 1610 may be formed from a single piece of material. The second layer 1610 may have a surface area that is substantially coextensive with an intended underlying mattress top. The seams collectively may both attach the second layer 1610 to the bottom layer 1602 and define pockets 1612 between the bottom and second layers. For example, the pocket 1612-1 may be defined by the end seam 1614-*a*, partial interior seams 1615-*a* and 1615-*b*, and portions of optional partial side seams 1616-*a* and 1616-*b*.

Each pocket 1612 may have one or two side openings 1613 to allow for the insertion and removal of inserts for cushioning and positioning a patient lying on the sheet system 1600. For example, the pocket 1612-1 may have side openings 1613-*a* and 1613-*b*. The partial interior seams 1615 do not extend across the entire width of the second layer 1610. The partial interior seams 1615 may, for example, extend between about 3-5 inches from the edge, e.g., 3.5, 4, or 4.7 inches. In some embodiments, the partial interior seams 1615 may extend between about ¼ to ⅓ the width of the second layer 1610. Because the internal seams extend only partly across the width of the second layer, there is no seaming in the middle of the second layer where the patient typically lies. This creates a stitch-free middle zone in the second layer. This removes a potential point of friction or irritation for the patient. Two adjacent pockets may therefore define a continuous interior cavity in the space between where the partial interior seams end in the central portion of the sheet system. The stitch-free zone may span between about 30% to 90% of the width of the second layer. For example, on a 39-inch-wide twin or twin XL bed sheet, the stitch-free middle zone may be between about 20 inches and 33 inches. On a 54-inch-wide full bed sheet, the stitch-free middle zone may be between about 20 inches and 48 inches. On a 27-inch-wide crib mattress, the stitch-free middle zone may be between about 12 inches and 21 inches.

The side openings to the pockets allow easier access to the inserts for a caregiver, who, ideally, repositions the patient from side to side every 2-3 hours. Having side access on both sides of the sheet improves the ability of the caregiver to change, remove or insert cushions or wedges from either side of the bed, and without having to remove the patient from the bed, which may be difficult.

As shown in FIG. 16B, the pockets 1612 may include a side panel, e.g., side panel 1617, that can fold flat against the bottom later when the pocket is not holding an insert. The outer edge of the pocket can expand to receive an insert. The side panel 1617 may be formed, for example, by one or more pleats 1618 in the fabric of the second layer, as described, for example, in reference to FIG. 12C. Alternatively, the side panel 1617 may be a separate triangular shaped piece of fabric attached one side at the seam 1615 or 1614, and on another side to the second layer, with the third side framing unattached and framing the opening to the pocket.

In another embodiment, the fabric of the second layer 1610 may be stretchable to allow the second layer to stretch over an inserted cushion or wedge while still holding the insert in place without using pleats in the pockets. The stretchable fabric may be resiliently stretchable, i.e., elastic. Fewer or more pockets may also be included in the sheet system.

Tensioning and Securing Systems

In the bed sheet systems described above, fitted sheets are useful in securing the sheet system to the mattress but may be limited in their ability to remain taut across the surface of the mattress. Mattresses vary in thickness, and fitted sheets that are capable of fitting over a thick mattress may not fit tautly when used on a thinner mattress. In a healthcare setting, taut-fitting sheets that do not slide or shift excessively are desirable to limit friction and sheer, which in turn, may limit skin irritation and breakdown.

Figure 17A:
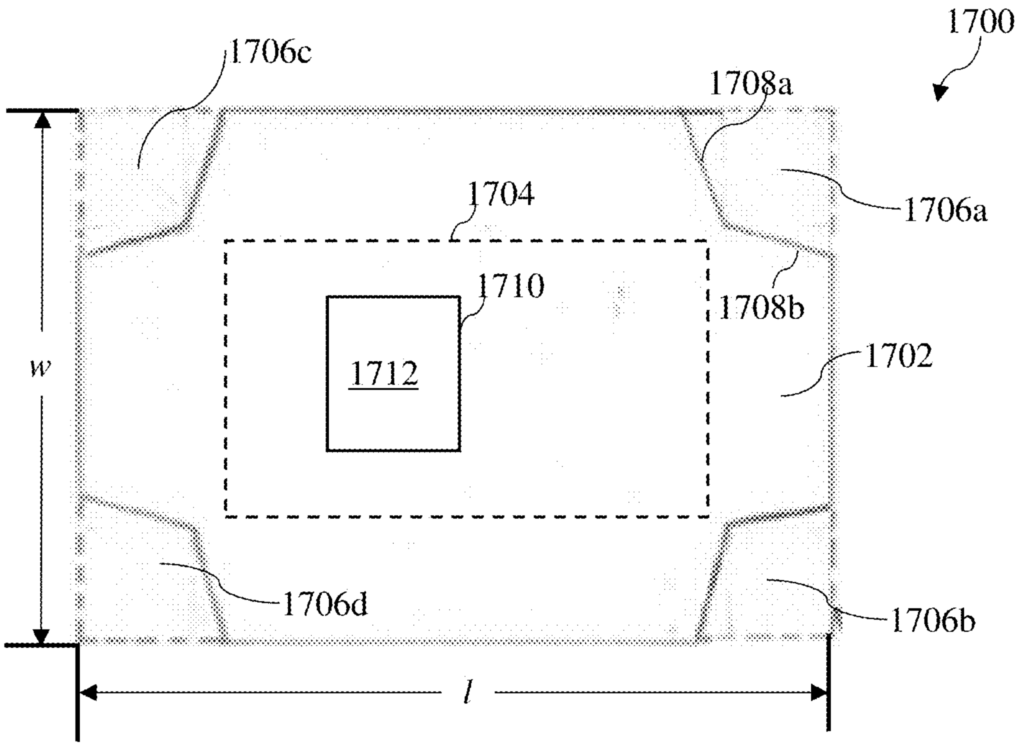
FIGS. 17A-C illustrate an embodiment of a bed sheet comprising means for securing and tensioning the bed sheet on a mattress.
Figure 17B:
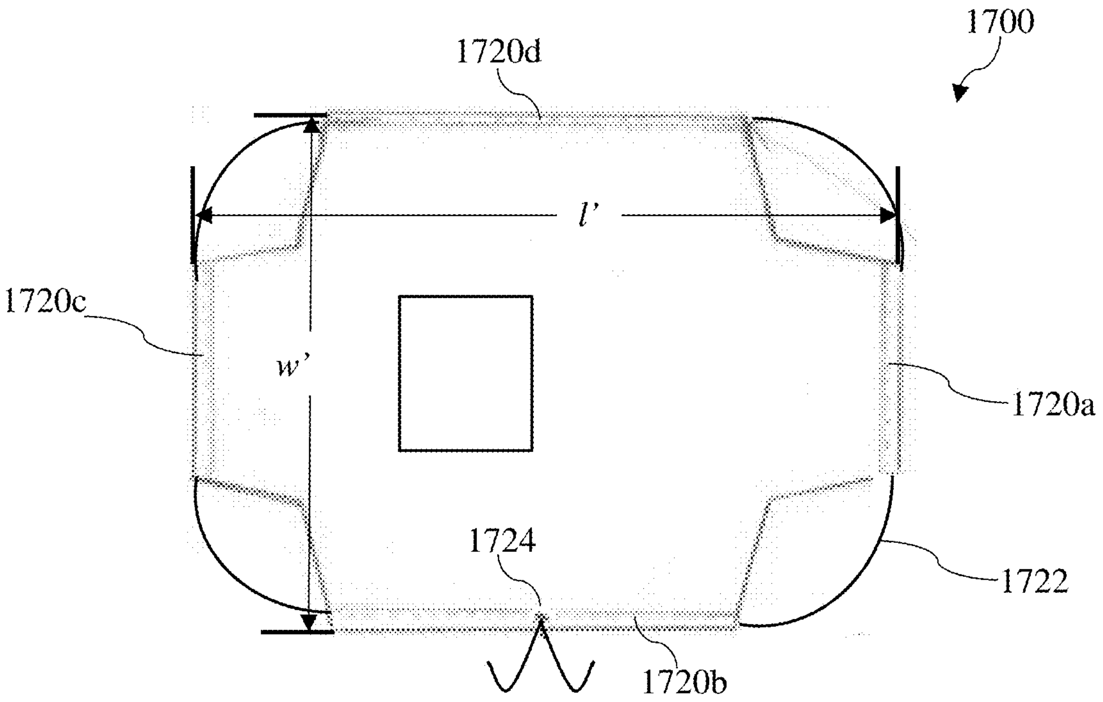
Figure 17C:
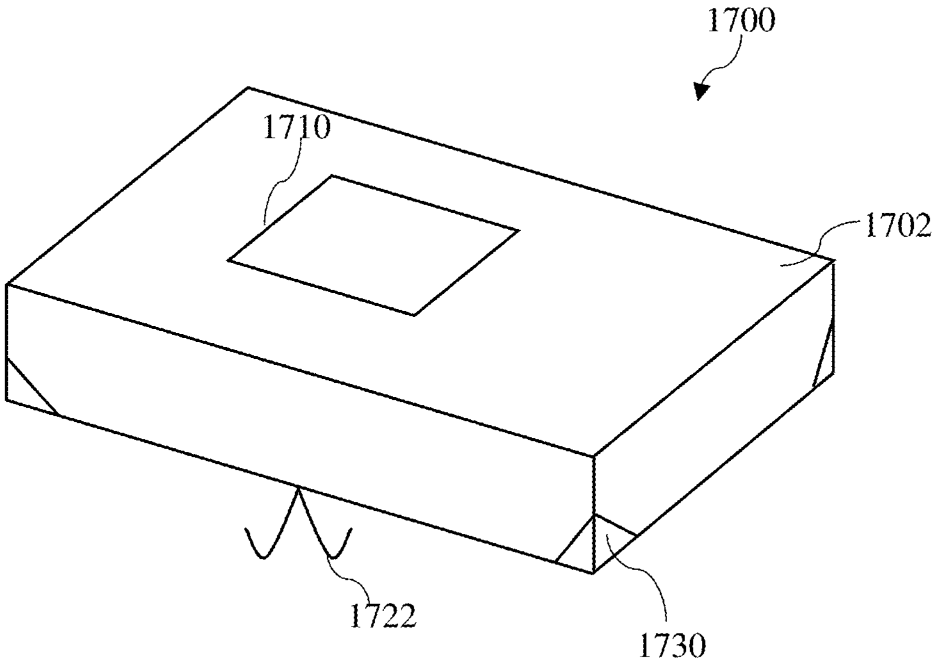

Accordingly, the first layer of the disclosed bed sheet systems may include a tensioning system to secure the first layer to a mattress and to hold the first layer taut on the mattress. FIGS. 17A-C illustrate an embodiment of a bed sheet system that includes a first system 1700 for securing and tensioning the bed sheet on a mattress. As shown in FIG. 17A, the system 1700 includes a flat sheet 1702 that may correspond to a first layer of a system for preventing or ameliorating pressure injuries of a patient. The flat sheet 1702 may be a generally rectangular piece of fabric having a length l and a width w. The length l and width w may be selected to be longer than the length and width of an intended mattress surface, e.g., a mattress having a size illustrated by dotted line 1704. For example, the length l may be at least the length of the mattress plus two times the height or thickness of the mattress such that, when centered on the mattress, the sheet 1702 covers the mattress surface and drapes over the mattress to cover the mattress sides at the head and the foot of the mattress. Similarly, the width w may be at least the width of the mattress plus two times the height of the mattress such that, when centered on the mattress, the sheet 1702 covers the surface and drapes over the mattress to cover the sides of the mattress.

The sheet 1702 may have its corners 1706A, 1706B, 1706C, and 1706D removed. For example, corner 1704*a* may be removed by cutting along lines 1708*a* and 1708*b*. The angle formed by the lines 1708*a* and 1708*b* may be a right angle or may be larger than 90 degrees. The lengths of lines 1708*a* and 1708*b* may be the same or may differ from each other.

The sheet 1702 may include one or more additional layers 1710 affixed to the sheet 1702 to form at least one pocket, e.g., pocket 1712. Any arrangement and number of pockets and layers may be included, for example, any of the embodiments illustrated herein.

As shown in FIG. 17B, the edges of the side of sheet 1702 may be folded over and affixed to the sheet 1702 to form channels 1720*a*, 1720*b*, 1720*c*, and 1720*d*. Affixing the edges may include sewing, gluing, or fusing an edge to the sheet. Folding the edges over to form the channels effectively shortens the length and width of the sheet 1702 to length l' and width w', where length l' is less than length l and width w' is less than width w.

The tensioning system 1700 may include a tensioning strap in the form of a drawstring 1722 that may be threaded through each of the channels. In one embodiment, one of the channels, e.g., channel 1720*b*, may include an opening to allow the ends of the drawstring to pass into and out of the channel. In another embodiment, the ends of the drawstring may be positioned in one of the corner areas. The drawstring 1722 may be optionally threaded through a cord lock, buckle, or other mechanism to prevent the ends from slipping out of a channel and to allow the drawstring to be tensioned. The drawstring 1722 may be made of an elastic material, e.g., natural or synthetic rubber, LYCRA, or other elastic fibers. The drawstring 1722 may be made of fibers that are not elastic, but constructed to be stretchable, e.g., by weaving or knitting. The drawstring 1722 may have minimal or no stretch or elasticity. The drawstring can be any cord or cable construct that serves to tension and secure a sheet to a bed or other object.

As shown in FIG. 17C, the sheet 1702 may be placed over a mattress 1730. The channels 1720 may be positioned below the bottom surface of the mattress 1730. When the drawstring 1722 is pulled through the opening 1724, the edges of the sheet 1702 are drawn towards each other and cause the sheet 1702 to be pulled taut on the surface of the mattress. The ends of the drawstring 1722 may be tied, knotted, and/or locked to maintain tension on the drawstring. In this manner, the surface of the sheet is tensioned in both length and width dimensions, reducing wrinkling, folding and/or bunching of the surface. The sheet material for sheet 1702 may be selected from fabrics that have little to no elasticity such that, when tensioned, the sheet material does not stretch.

Figure 18A:
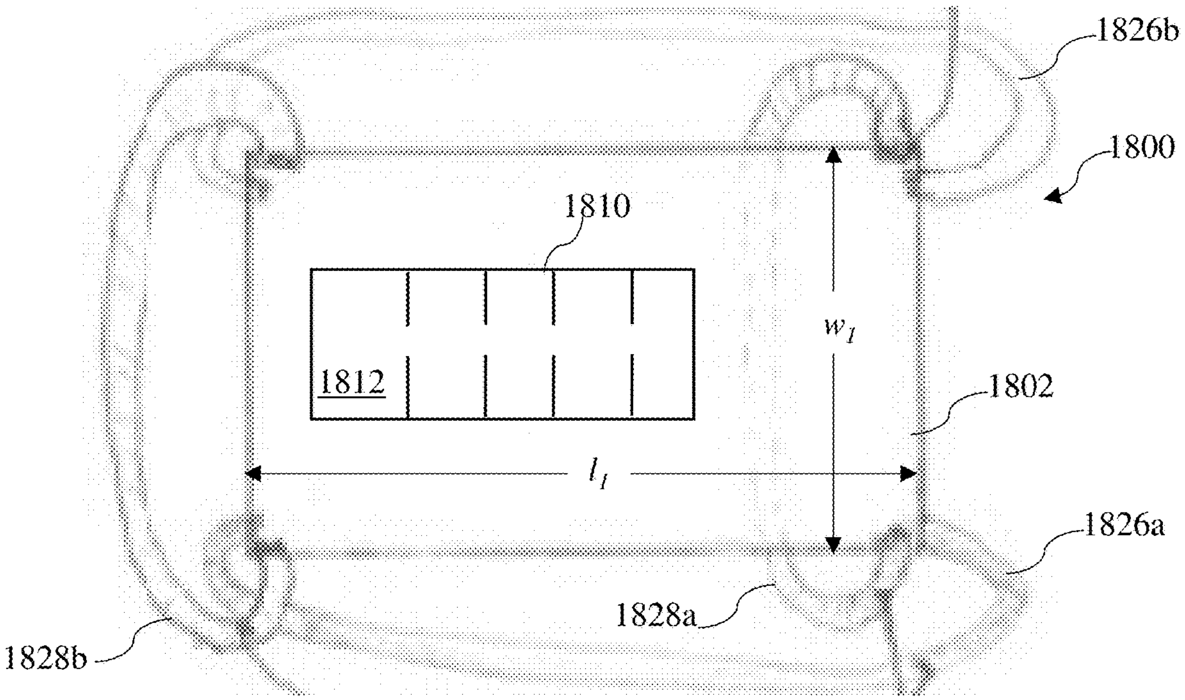
FIG. 18A-B illustrate an embodiment of a bed sheet comprising a second means for securing and tensioning the bed sheet on a mattress.
Figure 18B:
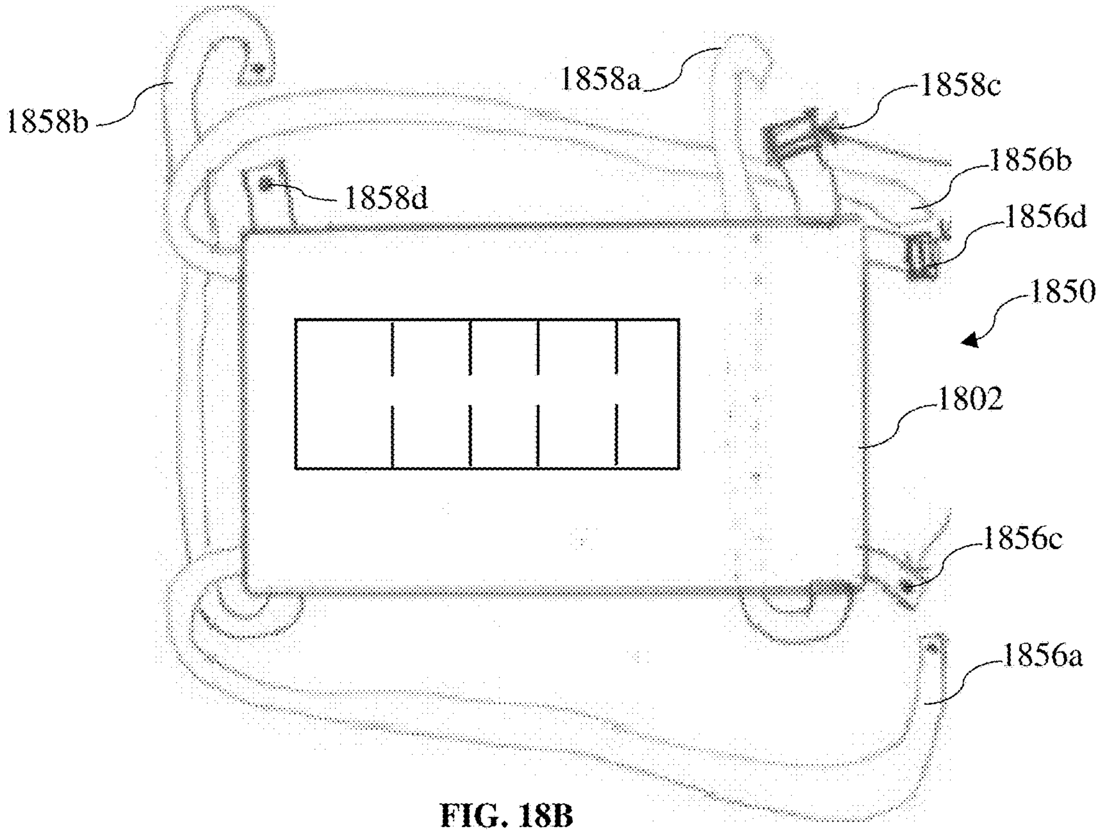

FIGS. 18A-B illustrate another embodiment of a bed sheet system that includes a second tensioning system 1800 for securing and tensioning the bed sheet on a mattress. As shown in FIG. 18A, the system 1800 includes a flat sheet 1802 that may correspond to a first layer of a system for preventing or ameliorating pressure injuries of a patient. The sheet 1802 may include one or more additional layers 1810 affixed to the sheet 1802 to form one or more pockets, e.g., pocket 1812. Any arrangement of pockets and layers may be included, for example, any of the embodiments illustrated herein.

The flat sheet 1802 may be a generally rectangular piece of fabric having a length $l_1$ and a width $w_1$. The length $l_1$ and width $w_1$ may be selected to be no larger than the dimensions of an intended mattress surface. The dimensions of the sheet 1802 may be smaller than the intended mattress surface, or may cover the intended mattress surface with little to no overhang of the sheet 1802 when placed on the intended mattress. In an embodiment, closely matching the dimensions of the sheet 1802 to the intended mattress, may make positioning the pocket(s) 1812 and layer(s) 1810 in a therapeutically effective location on the mattress easier. A close match may generally refer to a difference in dimension of less than about 2 inches, e.g., less than 1.5 inches, 1 inch, or 0.5 inches.

In another embodiment, the dimensions of the sheet 1802 may be smaller than the intended mattress surface, and may match or be larger than the dimensions of the additional layer 1810. For example, a dimension of the sheet 1802 may be larger than the same dimension of the additional layer 1810 by about 10 inches, e.g., 1, 2.5, 3, 4, 5, 6, 7, 8, 9, or 9.5 inches. As shown in FIG. 18A, the system 1800 may include at least two pairs of tensioning straps. The tensioning straps 1826*a* and 1826*b* may be affixed at their respective ends to opposite longitudinal sides of the sheet 1802, e.g., at the head and foot sides of the sheet 1802. The tensioning straps 1826*a* and 1826*b* may be configured to wrap around and under the intended mattress along its longer dimension. The tensioning straps 1828*a* and 1828*b* may be affixed at their respective ends to opposite lateral sides of the sheet 1802 and may be configured to wrap around the and under the intended mattress along its shorter dimension.

The tensioning straps 1826 and 1828 may be made of an elastic material such that, when wrapped around and under a mattress, the straps are elastically tensioned. The elastic tension is in turn applied to the sheet 1802, holding the sheet taut on the mattress surface in both the lateral and longitudinal dimensions. The sheet material for sheet 1802 may be selected from fabrics that have little to no elasticity such that, when tensioned, the sheet material does not stretch. The tensioning straps can be any cord or cable construct that serves to tension and secure a sheet to a bed or other object.

The tensioning straps may be affixed to the sheet 1802 by sewing, gluing, fusing or other permanent attachment methods. The tensioning straps may alternatively be affixed to the sheet with a removable attachment method, such as with buttons, snaps, hook-and-eye closures, or any other method that can remain attached under the elastic tension.

FIG. 18B illustrates an alternative to the tensioning straps of system 1800. System 1850 shows at least two pairs of tensioning straps in a similar arrangement to those shown in FIG. 18A. Instead of being a single piece, an individual tensioning strap comprises two pieces that are removably fixable to each other to complete the strap. For example, one end of strap **1856*a* may be affixed to one longitudinal end of the sheet 1802 and the other end of strap 1856*a* may have one half of a snap closure affixed to it. One end of strap 1856*c* may be affixed to the opposite longitudinal end of the sheet with respect to strap 1856*a*. The strap 1856*c* may have the other half of the snap closure affixed to it, such that when the straps 1856*a* and 1856*c*** are snapped together, a continuous strap is formed that can be wrapped around and under the intended mattress.

Alternatively, instead of a snap closure, a buckle could be used, as shown, for example, on straps **1858*a* and 1858*c*. One end of strap 1858*a* may be affixed to one lateral side of the sheet 1802 and the other end of strap 1858*a* may be loose. One end of strap 1858*c* may be affixed to the opposite lateral side of the sheet with respect to strap 1858*a*. The strap 1858*c* may have a buckle affixed to it, such that when the loose end of strap 1858*a* is threaded through the buckle on strap 1858*c***, a continuous strap is formed that can be wrapped around and under the intended mattress.

The tensioning straps 1856, 1858 may be elastic, or may be relatively inelastic, such as in seatbelt webbing or carrying straps on bags and backpacks.

Other closure means include hook-and-loop fasteners and any other attachment mechanisms, known or later discovered, may be used to attach the two pieces of straps in system 1850.

More tensioning straps may be used. For example, 2, 3, or 4 straps can be used to tension the longitudinal dimension of the sheet, and 2, 3, 4, 5, 6, 7, or 8 straps can be used to tension the lateral dimension of the sheet.

Figure 19A:
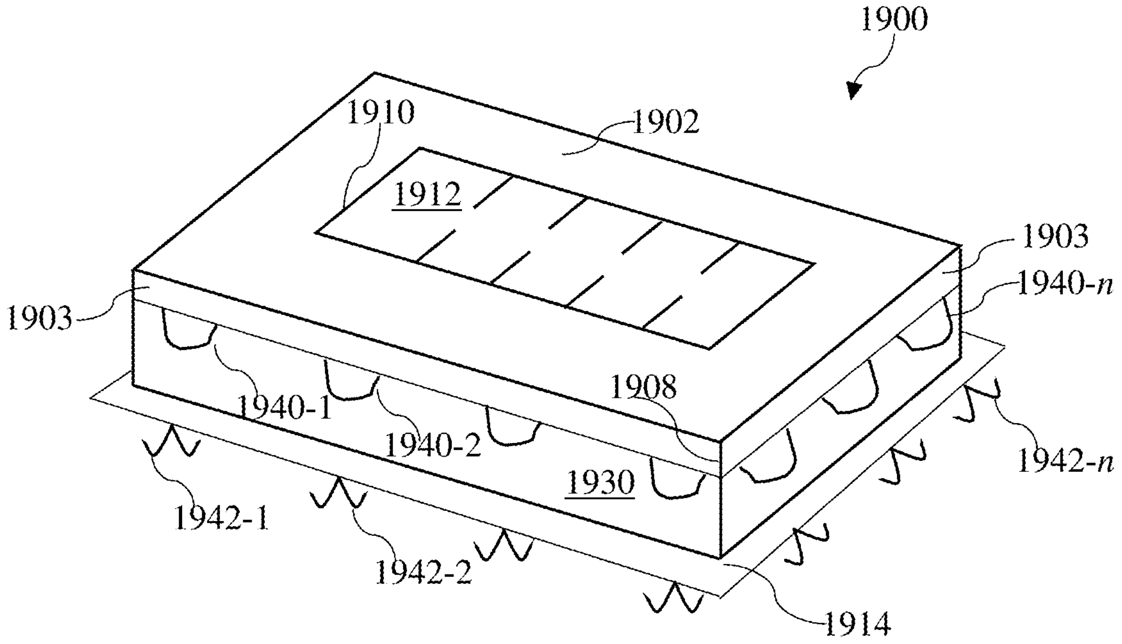
FIG. 19A-B illustrate an embodiment of a bed sheet comprising a third means for securing and tensioning the bed sheet on a mattress.
Figure 19B:
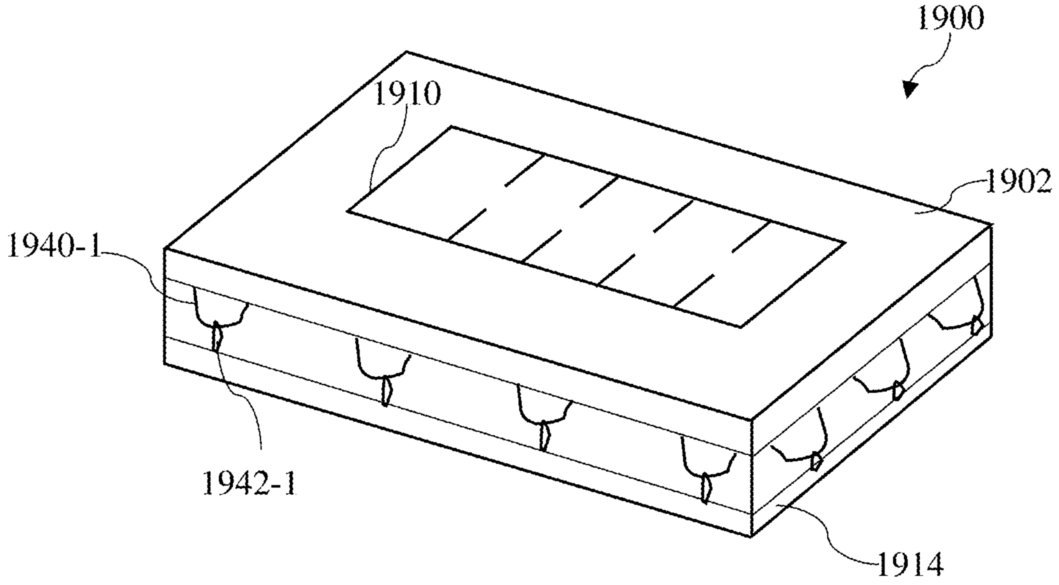

FIGS. 19A-B illustrate still another embodiment of a bed sheet system that includes a third tensioning system 1900 for securing and tensioning the bed sheet on a mattress. As shown in FIG. 19A, the system 1900 includes a top sheet 1902 that may correspond to a first layer of a system for preventing or ameliorating pressure injuries of a patient. The sheet 1902 may include one or more additional layers 1910 affixed to the sheet 1902 to form one or more pockets, e.g., pocket 1912. Any arrangement of pockets and layers may be included, for example, any of the embodiments illustrated herein.

The top sheet 1902 may be constructed as a fitted sheet, for example, with sides 1903 overhanging the top surface of a mattress 1930, where the sides are attached at the corners, e.g., corner 1908. Unlike a conventional fitted sheet however, the sides 1903 may not extend from the top surface to the entire depth of the mattress, for example, the sides 1903 may overhang the mattress by less than 100% of the mattress depth, e.g., 90%, 80%, 60%, 45%, 30%, or 15%.

A plurality of handles 1940 may be affixed to the edges of the top sheet 1802 around all four sides of the top sheet 1902. Each handle, e.g., handles 1940-1, 1940-2 to **1940-*n*, may be made of any of a variety of materials, including but not limited to, woven straps, nylon webbing, woven or braided roping, or a combination thereof. In some embodiments, the handles 1940 may include a rigid portion, e.g., a plastic or metal handle, provided that the rigid material can be securely attached to the top sheet 1902**.

A bottom sheet 1914 may be placed under the mattress 1930. The bottom sheet 1914 may be a flat sheet or a flat sheet with sides attached at corners as on sheet 1902. The bottom sheet 1914 may have a plurality of tensioning straps in the form of tying elements 1942 attached along its sides, e.g., tying elements 1942-1, 1942-2, . . . **1942-*n*. The number of tying elements 1942 may match the number of handles 1940. More or fewer tying elements 1942 than handles 1940 may be used. The positioning of the tying elements 1942 may correspond to the positioning of the handles 1940** such that a plurality of tying elements can each be attached to a respective handle.

To secure and tension the system 1900, a tying element 1942 may be tied to, looped around, or otherwise removably attached to a handle 1940 as shown, for example, in FIG. 19B. For example, tying element 1942-1 may be tied to handle 1940-1. When so attached, the tying element and the handle exert a tensioning force on the top sheet 1902 and the bottom sheet 1914.

When the handles 1940 are not attached to the tying elements 1942, the handles 1940 can be used by a caregiver to lift one side of the top sheet 1902. This can assist the caregiver in gently rolling a patient on the top sheet 1902 to one side without having to touch the patient directly. The lifted sheet also provides a distributed lifting force on the patient's entire body rather than only at the two points provided by a caregiver's hands.

Figure 20:
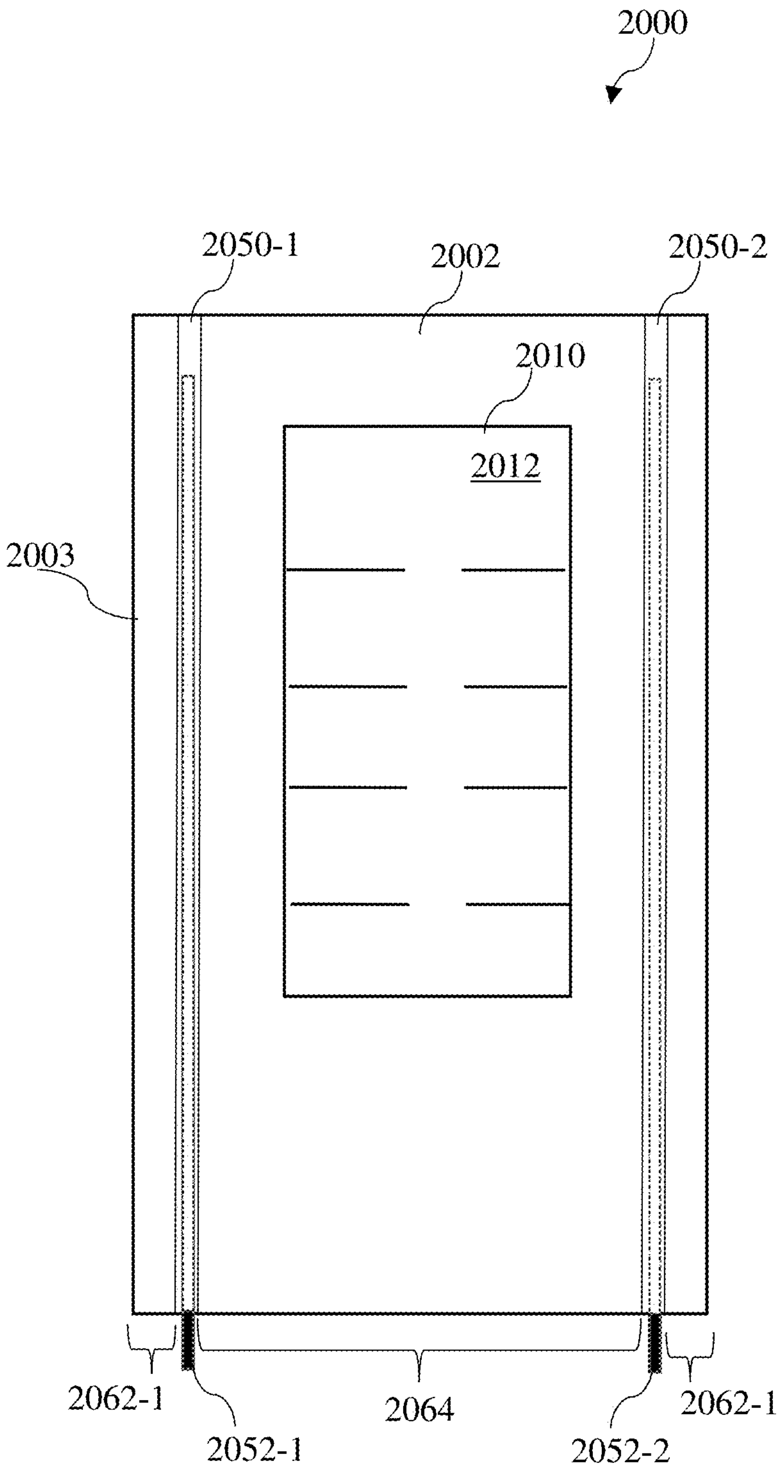
FIG. 20 illustrates an embodiment of a bed sheet comprising a fourth means for tensioning the bed sheet on a mattress.

FIG. 20 illustrates still another embodiment of a bed sheet system that includes a fourth tensioning system 2000 for securing and tensioning the bed sheet on a mattress. As shown in FIG. 20, the system 2000 includes a top sheet 2002 that may correspond to a first layer of a system for preventing or ameliorating pressure injuries of a patient. The sheet 2002 may include one or more additional layers 2010 affixed to the sheet 2002 to form one or more pockets, e.g., pocket 2012. Any arrangement of pockets and layers may be included, for example, any of the embodiments illustrated herein. The top sheet 2002 may be coextensive with the top surface of the mattress or bed surface on which it is placed.

The system 2000 may include one or more sleeves 2050, e.g., sleeves 2050-1, 2050-2 that extend along the length of the top sheet 2002. The sleeves may be formed by attaching the same piece of material used to form the layer 2010, or with separate pieces of material attached to the top sheet 2002. Each sleeve may be closed along three of its four sides. Each sleeve may be openable at one end to receive a batten 2052. Sleeve 2050-1 may receive batten 2052-1 and sleeve 2050-2 may receive batten 2052-1.

A batten may be an elongate stiff piece of material such as wood, metal, or plastic that, when inserted into a sleeve and secured at the sleeve's open end, tensions the top sheet 2002 to reduce the sheet's tendency to bunch or wrinkle. The battens shown are disposed alongside opposing margin areas 2062-1 and 2062-2 of a sheet. For example, margin area 2062-1 corresponds to the area of the sheet 2002 between the sleeve 2050-1 and a perimeter 2003 of the top sheet 2002. Preferably, the margins are areas outside a zone 2064 intended for a patient to lie on. The zone 2064 may be defined as the area between the sleeves 2050-1 and 2050-2. Suitable battens will have a length of at least 50% the length of the portion of the top sheet 2002 that is coextensive with the top surface of a mattress, and may have a length between 50% and 100% of that length of the top sheet, e.g., 60%, 75%, 85%, 90% or 95%. The surface 2064 between the margins 2062-1 and 2062-2 may have a width that is between 50% and 90% of the width of the portion of the top sheet 2002 within the perimeter 2003.

A batten 2052 may be secured in a sleeve 2050 with an openable closure, for example, a snap, a button, or a hook-and-loop closure. The opening in the sleeve may be fitted with a strip of elastic or a drawstring that pulls the opening closed but stretches or releases to allow the batten to be inserted and removed. The sleeve may include an interior pocket that the end of the batten can fit into to prevent the batten from sliding out and to maintain the tension along the sheet.

The sleeves 2050 may be disposed away from the longitudinal center line of the top sheet so that a patient on the sheet will not contact the sleeves or overlie them. In some embodiments, e.g., where the openings of the pockets are not positioned near the edges of the top sheet, the sleeves 2050 may be disposed between the pocket openings and the longitudinal edges of the top sheet. In other embodiments where the pocket openings are disposed at or near the edges of the top sheet, the sleeves may be formed below the pockets and away from the center line.

While two longitudinal sleeves and battens are illustrated, more or fewer sleeves and battens may be used. Horizontally oriented sleeves may also be used to tension the sheet along its width.

Various other modifications, adaptations, and alternative designs are of course possible in light of the above teachings. Therefore, it should be understood at this time that within the scope of the appended claims the invention may be practiced otherwise than as specifically described herein. It is contemplated that various combinations or subcombinations of the specific features and aspects of the embodiments disclosed above may be made and still fall within one or more of the inventions. Further, the disclosure herein of any particular feature, aspect, method, property, characteristic, quality, attribute, element, or the like in connection with an embodiment can be used in all other embodiments set forth herein. Accordingly, it should be understood that various features and aspects of the disclosed embodiments can be combined with or substituted for one another in order to form varying modes of the disclosed inventions. Thus, it is intended that the scope of the present inventions herein disclosed should not be limited by the particular disclosed embodiments described above. Moreover, while the invention is susceptible to various modifications, and alternative forms, specific examples thereof have been shown in the drawings and are herein described in detail. It should be understood, however, that the invention is not to be limited to the particular forms or methods disclosed, but to the contrary, the invention is to cover all modifications, equivalents, and alternatives falling within the spirit and scope of the various embodiments described and the appended claims. Any methods disclosed herein need not be performed in the order recited. The methods disclosed herein include certain actions taken by a practitioner; however, they can also include any third-party instruction of those actions, either expressly or by implication. For example, actions such as "accessing a vertebral body" includes "instructing the accessing of a vertebral body." The ranges disclosed herein also encompass any and all overlap, sub-ranges, and combinations thereof. Language such as "up to," "at least," "greater than," "less than," "between," and the like includes the number recited. Numbers preceded by a term such as "approximately", "about", and "substantially" as used herein include the recited numbers (e.g., about 10%=10%), and also represent an amount close to the stated amount that still performs a desired function or achieves a desired result. For example, the terms "approximately", "about", and "substantially" may refer to an amount that is within less than 10% of, within less than 5% of, within less than 1% of, within less than 0.1% of, and within less than 0.01% of the stated amount.

What is claimed is:

1. A method for preventing or ameliorating pressure injuries of a patient, comprising:

providing a system comprising a first layer comprising a sheet having a sheet length, a sheet width, and a center line extending along the longitudinal axis of the sheet, and a second layer, affixed to the first layer, and longitudinally aligned with the center line, wherein the first layer and the second layer form a first plurality of pockets disposed over the center line, each respective pocket comprising at least one opening, the pockets being configured to receive and retain a wedge-shaped insert, wherein when the system is arranged over the surface of a bed, the first layer lies between the surface of the bed and the second layer such that the at least one opening is above the first layer and wherein the first plurality of pockets is not spaced apart along the longitudinal axis, and the first plurality of pockets being oriented along a lateral side of the system and configured to receive and orient the wedge-shaped insert so it is parallel to the center line and with the wedge tapering downwardly toward the center line;

inserting a wedged-shaped insert of 6" to 12" high through the at least one opening into one of the first plurality of pockets, the wedge-shaped insert being configured to hold the patient's upper half at 30 degree or other desired angle relative to a horizontal, completely supine patient position, and wherein the first plurality of pockets are positioned relative to a bony prominence of the anatomy of the patient;

wherein the first plurality of pockets between the first and second layers are formed using widthwise partial seams that do not extend across the entire width of the second layer, thereby leaving no seams in the middle of the second layer where the patient typically lies; and securing the first layer to a mattress and tensioning the second layer.

2. A system for preventing or ameliorating pressure injuries of a patient, comprising:

a first sheet layer, a second sheet layer, affixed to the first layer, and longitudinally aligned with a vertical center line of the first layer;

the first layer and the second layer forming a first plurality of at least three pockets axially arranged to one another along the center line, wherein when the system is arranged over the surface of a bed, the first layer lies between the surface of the bed and the second layer;

the second layer having first and second opposing lateral edges that are parallel to the centerline and configured to be disposed along respective lateral edges of a bed of a size the system is intended to fit;

the first plurality of pockets being arranged along a first of the opposing lateral edges and extending from the first lateral edge towards the center line, each of the first plurality of pockets having at least one opening at the first lateral edge, each of the first plurality of pockets being configured to receive and orient a wedge-shaped insert so that the wedge-shaped insert tapers downwardly from the opening towards the center line;

wherein the first plurality of pockets are arranged such that when the system is arranged over the surface of a bed and fitted with the wedge-shaped inserts in the pockets, there is a middle zone in the system for raising one side of a patient and holding at least the patient's upper body half at a 30 degree or other desired angle relative to a horizontal, completely supine patient position; and wherein the first plurality of pockets between the first and second layers are formed using widthwise partial seams that do not extend across the entire width of the second layer, thereby leaving no seams in the middle zone.

3. The system of claim 2 wherein at least the second layer comprises a moisture wicking material.

4. The system of claim 2 wherein at least the second layer comprises an elastically stretchable material.

5. The system of claim 2 wherein the first plurality of pockets has at least 3 pockets.

6. The system of claim 2 wherein the first plurality of pockets are spaced along the full length of the second layer.

7. The system of claim 2 wherein the first plurality of pockets has at least three pockets.

8. A system for preventing or ameliorating pressure injuries of a patient, comprising: a first sheet layer, a second sheet layer, affixed to the first layer, and longitudinally aligned with a vertical center line of the first layer; the first layer and the second layer forming a first plurality of at least three pockets axially arranged to one another along the center line, wherein when the system is arranged over the surface of a bed, the first layer lies between the surface of the bed and the second layer; the second layer having first and second opposing lateral edges that are parallel to the centerline and configured to be disposed along respective lateral edges of a bed of a size the system is intended to fit; the first plurality of pockets being arranged along a first of the opposing lateral edges and extending from the first lateral edge towards the center line, each of the first plurality of pockets having at least one opening at the first lateral edge, each of the first plurality of pockets being configured to receive and orient a wedge-shaped insert so that the wedge-shaped insert tapers downwardly from the opening towards the center line; wherein the first plurality of pockets are arranged such that when the system is arranged over the surface of a bed and fitted with the wedge-shaped inserts in the pockets, there is a middle zone in the system for raising one side of a patient and holding at least the patient's upper body half at a 30 degree or other desired angle relative to a horizontal, completely supine patient position; wherein the first plurality of pockets between the first and second layers are formed using widthwise partial seams that do not extend across the entire width of the second layer, thereby leaving no seams in the middle zone; and wherein the seams extend widthwise from the first lateral edge no more than between ¼ to ⅓ the width of the second layer to form the pocket openings for the first plurality of pockets.

9. The system of claim 8 further comprising a second plurality of pockets arranged along the second of the opposing lateral edges.

10. A system for preventing or ameliorating pressure injuries of a patient, comprising: a first sheet layer, a second sheet layer, affixed to the first layer, and longitudinally aligned with a vertical center line of the first layer; the first layer and the second layer forming a first plurality of at least three pockets axially arranged to one another along the center line, wherein when the system is arranged over the surface of a bed, the first layer lies between the surface of the bed and the second layer; the second layer having first and second opposing lateral edges that are parallel to the centerline and configured to be disposed along respective lateral edges of a bed of a size the system is intended to fit; the first plurality of pockets being arranged along a first of the opposing lateral edges and extending from the first lateral edge towards the center line, each of the first plurality of pockets having at least one opening at the first lateral edge, each of the first plurality of pockets being configured to receive and orient a wedge-shaped insert so that the wedge-shaped insert tapers downwardly from the opening towards the center line; wherein each of the first plurality of pockets are arranged such that when the system is arranged over the surface of a bed and fitted with the wedge-shaped inserts in the first plurality of pockets, there is a middle zone in the system for raising one side of a patient and holding at least the patient's upper body half at a 30 degree or other desired angle relative to a horizontal, completely supine patient position; wherein each of the first plurality of pockets between the first and second layers are formed using widthwise partial seams that do not extend across the entire width of the second layer, thereby leaving no seams in the middle zone; and wherein, the seams extend widthwise no more than 5 inches from the first lateral edge of the second layer to form the pocket openings for the first plurality of pockets.

11. The system of claim 10 further comprising a second plurality of pockets arranged along the second of the opposing lateral edges.

* * * * *